(12) United States Patent
Onodera

(10) Patent No.: US 8,495,090 B2
(45) Date of Patent: Jul. 23, 2013

(54) STORAGE MEDIUM CONTAINING PARALLEL PROCESS CONTROL PROGRAM, PARALLEL PROCESSS CONTROL SYSTEM, AND PARALLEL PROCESS CONTROL METHOD

(75) Inventor: Satoshi Onodera, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1148 days.

(21) Appl. No.: 12/029,824

(22) Filed: Feb. 12, 2008

(65) Prior Publication Data
US 2008/0192653 A1 Aug. 14, 2008

(30) Foreign Application Priority Data

Feb. 14, 2007 (JP) .................................. 2007-033973

(51) Int. Cl.
*G06F 7/00* (2006.01)
*G06F 17/00* (2006.01)
(52) U.S. Cl.
USPC ...................... 707/770; 706/10; 700/2; 700/3

(58) Field of Classification Search
None
See application file for complete search history.

(56) References Cited

U.S. PATENT DOCUMENTS

| | | | | |
|---|---|---|---|---|
| 5,369,778 A | * | 11/1994 | San Soucie et al. | ... 707/999.103 |
| 6,256,621 B1 | * | 7/2001 | Tsuchida et al. | ....... 707/999.007 |
| 7,499,907 B2 | * | 3/2009 | Brown et al. | ........... 707/999.003 |
| 7,693,844 B1 | * | 4/2010 | Bobbitt et al. | ............. 707/999.1 |

FOREIGN PATENT DOCUMENTS

| | | |
|---|---|---|
| JP | A 2004-310651 | 11/2004 |
| JP | A 2005-346563 | 12/2005 |
| JP | A 2006-146864 | 6/2006 |

* cited by examiner

*Primary Examiner* — Fred I Ehichioya
*Assistant Examiner* — Jau-Shya Meng
(74) *Attorney, Agent, or Firm* — Greer, Burns & Crain, Ltd.

(57) ABSTRACT

An efficient parallel process can be performed in a distributed manner by an original master node set in a highest-layer sub-cluster and one or more lower-layer master nodes set in respective lower-layer sub-clusters.

10 Claims, 44 Drawing Sheets

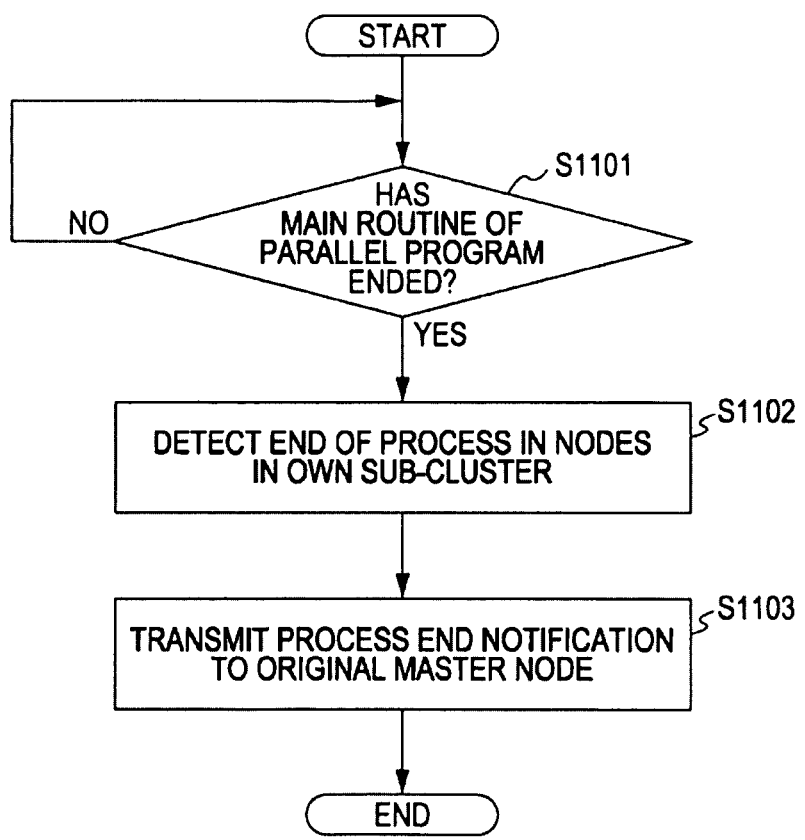

DETECT INSTRUCTIONS

|  | TOTAL | FIRST GROUP | SECOND GROUP | THIRD GROUP |
|---|---|---|---|---|
| NUMBER OF DATA SETS | 10 | 2 | 3 | 5 |

FIG. 17

(A) search_mysubcluster()
 - SEARCH FOR USABLE NODES IN OWN SUB-CLUSTER (B) search_nextsubcluster()
 - SEARCH FOR USABLE NODES
   IN NEXT LOWER-LAYER SUB-CLUSTER (C) assign_data()
 - ASSIGN DATA TO USABLE CPU IN OWN SUB-CLUSTER (D) transfer_data()
 - TRANSFER NECESSARY DATA TO MASTER NODE
   IN NEXT LOWER-LAYER SUB-CLUSTER

FIRST SUB-CLUSTER → FIRST SUB-CLUSTER

SECOND SUB-CLUSTER → SECOND SUB-CLUSTER

THIRD SUB-CLUSTER → THIRD SUB-CLUSTER

SIXTH SUB-CLUSTER → SIXTH SUB-CLUSTER

FIG. 22

(A) search_mysubcluster()
 - SEARCH FOR USABLE NODES IN OWN SUB-CLUSTER (B) search_nextsubcluster()
 - SEARCH FOR USABLE NODES
   IN NEXT LOWER-LAYER SUB-CLUSTER (C) assign_data()
 - ASSIGN DATA TO USABLE CPU IN OWN SUB-CLUSTER (D) transfer_data()
 - TRANSFER NECESSARY DATA TO MASTER NODE
   IN NEXT LOWER-LAYER SUB-CLUSTER (E) search_CPU()
 - DETECT HIGH-SPEED CPU IN OWN SUB-CLUSTER
   (classA > classB > classC)

FIG. 26

(A) search_mysubcluster()
 - SEARCH FOR USABLE NODES IN OWN SUB-CLUSTER (B) search_nextsubcluster()
 - SEARCH FOR USABLE NODES
   IN NEXT LOWER-LAYER SUB-CLUSTER (C) assign_data()
 - ASSIGN DATA TO USABLE CPU IN OWN SUB-CLUSTER (D) transfer_data()
 - TRANSFER NECESSARY DATA TO MASTER NODE
   IN NEXT LOWER-LAYER SUB-CLUSTER (E) search_CPU()
 - DETECT HIGH-SPEED CPU IN OWN SUB-CLUSTER
   (classA > classB > classC)

(F) search_network()
 - SEARCH PERFORMANCE OF NETWORK
   TO NEXT LOWER-LAYER SUB-CLUSTER

FIRST SUB-CLUSTER → FIRST SUB-CLUSTER

THIRD SUB-CLUSTER → THIRD SUB-CLUSTER

SECOND SUB-CLUSTER → SECOND SUB-CLUSTER

FOURTH SUB-CLUSTER → FOURTH SUB-CLUSTER

FIG. 29

(A) search_mysubcluster()
 - SEARCH FOR USABLE NODES IN OWN SUB-CLUSTER (B) search_nextsubcluster()
 - SEARCH FOR USABLE NODES
   IN NEXT LOWER-LAYER SUB-CLUSTER (C) assign_data()
 - ASSIGN DATA TO USABLE CPU IN OWN SUB-CLUSTER (D) transfer_data()
 - TRANSFER NECESSARY DATA TO MASTER NODE
   IN NEXT LOWER-LAYER SUB-CLUSTER (E) search_CPU()
 - DETECT HIGH-SPEED CPU IN OWN SUB-CLUSTER
   (classA > classB > classC)

(F) search_network()
 - SEARCH PERFORMANCE OF NETWORK
   TO NEXT LOWER-LAYER SUB-CLUSTER (G) report_status()
 - RECORD MPI JOB EXECUTION HISTORY
   IN MASTER NODE IN OWN SUB-CLUSTER

US 8,495,090 B2

STORAGE MEDIUM CONTAINING PARALLEL PROCESS CONTROL PROGRAM, PARALLEL PROCESSS CONTROL SYSTEM, AND PARALLEL PROCESS CONTROL METHOD

BACKGROUND OF THE INVENTION

1. Field of the Invention

The present invention relates to a storage medium containing a parallel process control program, a parallel process control system, and a parallel process control method.

2. Description of the Related Art

Hitherto, in a distributed-memory-type parallel computing system, a parallel process is performed by executing a given process in a plurality of processors in accordance with parallel programming using a data communication method, such as an MPI (message passing interface), in order to shorten the processing time.

Typically, in a parallel program using the MPI or the like, nodes to be used are statically registered in a list in advance. For example, in a calculation requiring N nodes, the registered nodes are sequentially used from the top of the list. In this case, "1" node serves as a master node and "N−1" nodes serve as slave nodes.

The master node performs "calculation" and "entire control", whereas the slave nodes perform only "calculation". Basically, the master node performs preprocessing before executing a main routine of the parallel program, that is, starts the slave nodes and establishes communication between the master node and each of the slave nodes. After performing the preprocessing on all the "N−1" nodes, the master node starts execution by synchronizing the program. Furthermore, the master node performs post-processing after execution of the main routine, that is, closes the processes of all the slave nodes and closes the process of the master node, so as to end the entire process.

SUMMARY OF THE INVENTION

In the above-described related art, one master node performs entire control including preprocessing and post-processing. Thus, an increase in nodes required for calculation causes an increase in processing cost of the master node, which causes a problem that the performance of the parallel process degrades.

Also, in the above-described related art, a process is performed by statically assigning data sets to nodes. In such a case, a processing load concentrates on one node and a calculation cost increases, or a communication cost increases due to data communication among the nodes. This causes degradation in performance of the parallel process disadvantageously.

FIGS. 36A to 36C illustrate a problem in the related art. For example, as illustrated in FIG. 36A, assume that ten data sets (A to J) having a uniform size are provided and that those data sets are grouped into a first group (A and B), a second group (C, D, and E), and a third group (F, G, H, I, and J). Also, assume that data communication is performed only within each group during calculation. In other words, data communication is not performed between groups (e.g., between data set A and data set C).

When the data sets are assigned in view of a communication cost, each of groups between which data communication is not performed can be assigned to one node. That is, as illustrated in FIG. 36B, each of the first to third groups is assigned to one node. In this case, communication is not performed between the nodes, but the calculation cost in the node to which the third group is assigned is higher than that in the nodes to which first and second groups are assigned. Accordingly, the node to which the third group is assigned degrades entire performance.

When the data sets are assigned in view of a calculation cost, the ten data sets (A to J) having a uniform size can be evenly assigned to ten nodes. That is, as illustrated in FIG. 36C, the ten data sets A to J having a uniform size are assigned in order. In this case, no significant bias occurs in calculation cost among the nodes. However, since the data sets in the same group are assigned to different nodes, communication among the nodes occurs. The communication cost is not so high if communication is performed between the nodes in the same switch, but the communication cost is high if communication is performed between different switches. As illustrated in FIG. 36C, the data sets in the first group (A and B) and the data sets in the second group (C, D, and E) are assigned to the nodes in the same switch, respectively, and thus the communication cost is not so high. However, if communication is performed between data set F and any of data sets G to J in the third group, the cost thereof is high, which degrades the entire performance.

The present invention has been made to solve the problems of the above-described related art, and an object of the present invention is to provide a parallel process control program, a parallel process control system, and a parallel process control method enabling an efficient parallel process.

BRIEF DESCRIPTION OF THE DRAWINGS

FIG. 11 illustrates a procedure of post-processing performed by the lower-layer master node according to the first embodiment;

FIG. 17 illustrates a dynamically assigning command according to the second embodiment;

FIG. 22 illustrates a dynamically assigning unit according to the third embodiment;

FIG. 26 illustrates a dynamically assigning unit according to the fourth embodiment;

FIG. 29 illustrates a dynamically assigning unit according to the fifth embodiment;

DESCRIPTION OF THE PREFERRED EMBODIMENTS

Hereinafter, a parallel process control program, a parallel process control system, and a parallel process control method according to the present invention are described in detail with reference to the attached drawings. In this specification, descriptions are given about cases where nodes including the parallel process control program according to the present invention are applied to a parallel process system with reference to embodiments. Hereinafter, a configuration and a procedure of a process of the node according to a first embodiment and advantages of the first embodiment are described. Then, the nodes according to a second embodiment, a third embodiment, a fourth embodiment, a fifth embodiment, a sixth embodiment, and a seventh embodiment are described in order. Finally, another embodiment is described.

<First Embodiment>
<Overview and Feature of Node According to First Embodiment>

First, a main feature of a node according to the first embodiment is described with reference to FIGS. 1 and 2A to 2C. FIGS. 1 and 2A to 2C illustrate an overview and a feature of the node according to the first embodiment.

Figure 1:
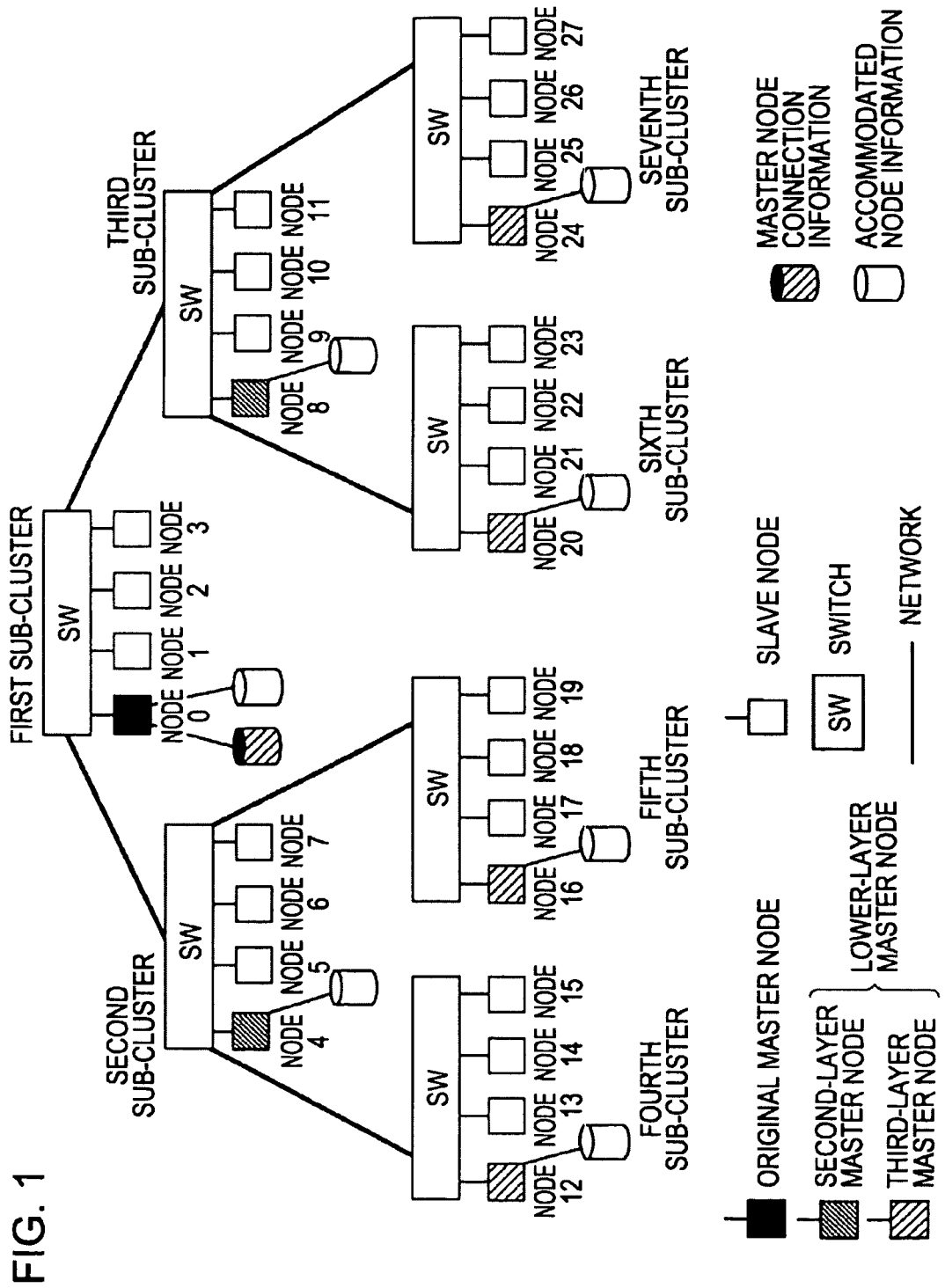
FIG. 1 illustrates an overview and a feature of a node according to a first embodiment.

The node according to the first embodiment controls a parallel process in a parallel process system including sub-clusters, each including a plurality of nodes, connected in a tree structure. For example, the node according to the first embodiment controls a parallel process executed by a parallel program when the parallel program is executed in the parallel process system. As illustrated in FIG. 1, the parallel process system includes three layers of sub-clusters connected via a network in a tree structure. Each sub-cluster includes four nodes mutually connected via a switch.

The parallel process system illustrated in FIG. 1 has the following configuration. In a first sub-cluster located in the highest layer (first layer) of the tree structure, nodes 0 to 3 are mutually connected via a switch. In second and third sub-clusters located in a second layer of the tree structure, nodes 4 to 7 and nodes 8 to 11 are mutually connected via a switch, respectively. In fourth, fifth, sixth, and seventh sub-clusters located in a third layer of the tree structure, nodes 12 to 15, nodes 16 to 19, nodes 20 to 23, and nodes 24 to 27 are mutually connected via a switch, respectively.

The present invention is mainly featured by enabling an efficient parallel process. This main feature is briefly described below. When the node according to the first embodiment is set as a master node of each sub-cluster, the node holds accommodated node information, which is information to uniquely identify the master node and all slave nodes controlled by the master node accommodated in the sub-cluster.

More specifically, as illustrated in FIG. 1, when node 0 is set as a master node of the first sub-cluster, node 0 as a master node holds accommodated node information (e.g., IP addresses) to uniquely identify node 0 and nodes 1 to 3 as slave nodes controlled by node 0 accommodated in the first sub-cluster. Also, when node 4 is set as a master node of the second sub-cluster, node 4 as a master node holds accommodated node information (e.g., IP addresses) to uniquely identify node 4 and nodes 5 to 7 as slave nodes controlled by node 4 accommodated in the second sub-cluster. Likewise, node 8 set as a master node of the third sub-cluster, node 12 set as a master node of the fourth sub-cluster, node 16 set as a master node of the fifth sub-cluster, node 20 set as a master node of the sixth sub-cluster, and node 24 set as a master node of the seventh sub-cluster hold accommodated node information.

The master node performs calculation and control during execution of the parallel program, whereas the slave node performs only calculation during execution of the parallel program.

When the node according to the first embodiment is set as an original master node in the highest-layer sub-cluster of the tree structure, the node holds master node connection information, which is information about connection between the original master node and lower-layer master nodes set in lower-layer sub-clusters. The "original master node" corresponds to the "highest-layer master node" described in claims.

As illustrated in FIG. 1, node 0, which is set as the master node of the first sub-cluster in the highest layer (first layer) of the tree structure, holds information about connection between node 0 and the lower-layer master nodes (nodes 4, 8, 12, 16, 20, and 24) set in the lower-layer sub-clusters (master node connection information). Specifically, the master node connection information held by node 0 serving as the original master node indicates the following: two sub-clusters controlled by nodes 4 and 8, which are second-layer master nodes, are connected below the first sub-cluster in the highest layer of the tree structure (in the second layer of the tree structure); two sub-clusters controlled by nodes 12 and 16, which are third-layer master nodes, are connected below node 4, which is a second-layer master node (in the third layer of the tree structure); and two sub-clusters controlled by nodes 20 and 24, which are third-layer master nodes, are connected below node 8, which is a second-layer master node (in the third layer of the tree structure).

Figure 2A:
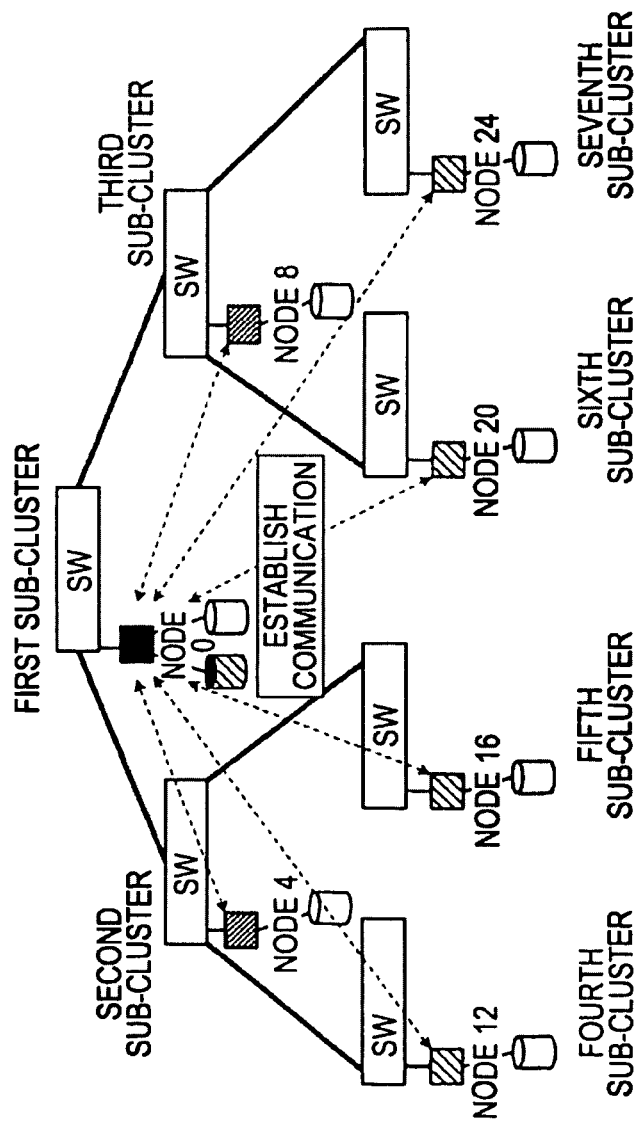
FIGS. 2A, 2B, and 2C illustrate the overview and feature of the node according to the first embodiment.
Figure 2B:
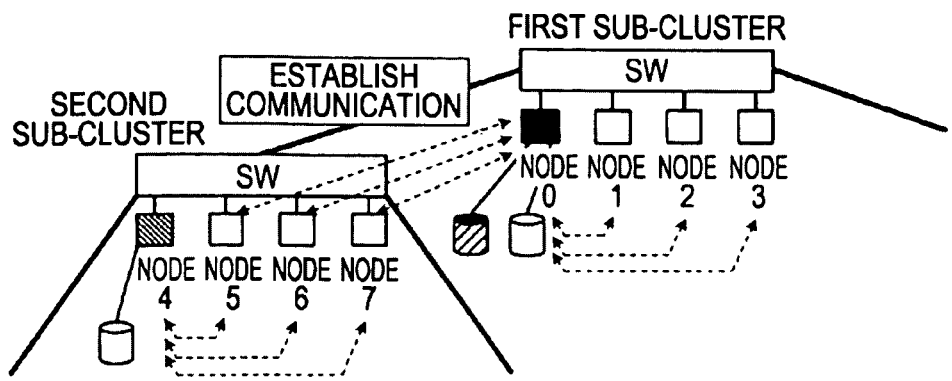

When the node according to the first embodiment is set as the original master node, the node performs preprocessing before execution of the parallel program. That is, the node establishes communication with all the slave nodes accommodated in the highest-layer sub-cluster by referring to the accommodated node information held therein and establishes communication with the respective lower-layer master nodes by referring to the master node connection information. That is, as illustrated in FIG. 2B, node 0 serving as the original master node establishes communication with the slave nodes (nodes 1 to 3) accommodated in the first sub-cluster by referring to the accommodated node information held therein. Also, as illustrated in FIG. 2A, node 0 establishes communication with the respective lower-layer master nodes (nodes 4, 8, 12, 16, 20, and 24) by referring to the master node connection information.

When the node according to the first embodiment is set as a lower-layer master node, the node performs preprocessing before execution of the parallel program. That is, after communication with the original master node has been established, the node establishes communication between the slave nodes accommodated in their own sub-cluster and the original master node by referring to the accommodated node information held therein. For example, as illustrated in FIG. 2B, node 4 serving as a second-layer master node among lower-layer master nodes establishes communication between the slave nodes (nodes 5 to 7) accommodated in the second sub-cluster and the original master node by referring to the accommodated node information held therein.

Also, in the third to seventh sub-clusters, each of the lower-layer master nodes (nodes 8, 12, 16, 20, and 24) establishes communication between the slave nodes accommodated in the own sub-cluster and the original master node, as node 4.

Figure 2C:
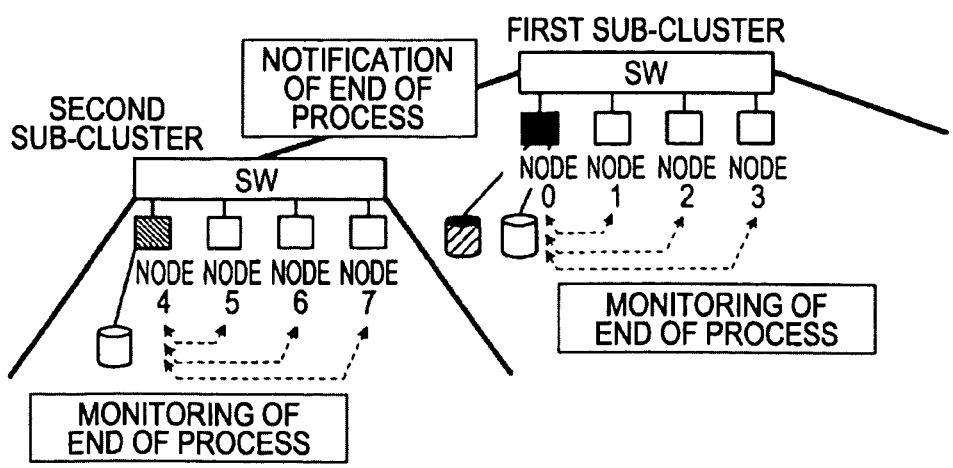

When the node according to the first embodiment is set as the original master node, the node performs post-processing after execution of the parallel program. That is, the node detects end of process in all the nodes accommodated in the highest-layer sub-cluster. More specifically, as illustrated in FIG. 2C, node 0 serving as the original master node monitors whether calculation in all the nodes (including node 0) accommodated in the first sub-cluster has ended and detects the end.

When the node according to the first embodiment is set as a lower-layer master node, the node detects the end of process in all the nodes accommodated in the lower-layer sub-cluster and notifies the original master node of the end of process. For example, as illustrated in FIG. 2C, node 4 serving as a second-layer master node among the lower-layer master nodes monitors whether calculation in the nodes (including node 4) accommodated in the second sub-cluster has ended, detects the end, and notifies the original master node of the end. Likewise, in the third to seventh sub-clusters, each of the lower-layer master nodes (nodes 8, 12, 16, 20, and 24) monitors whether calculation in the nodes accommodated in their own sub-cluster has ended, detects the end, and notifies the original master node of the end, as with node 4.

When the node according to the first embodiment is set as the original master node, the node detects process end notifications from all the lower-layer master nodes and then ends communication. That is, node 0 serving as the original master node receives the process end notification illustrated in FIG. 2C from each of the lower-layer master nodes, and then ends communication that was established in the preprocessing.

Accordingly, the node according to the first embodiment can perform the preprocessing and post-processing, which are conventionally performed by one master node, in a distributed manner by the original master node set in the highest-layer sub-cluster and the lower-layer master nodes set in the respective lower-layer sub-clusters. Accordingly, an efficient parallel process can be performed along the above-described main feature.

<Configuration of Original Master Node According to First Embodiment>

Figure 3:
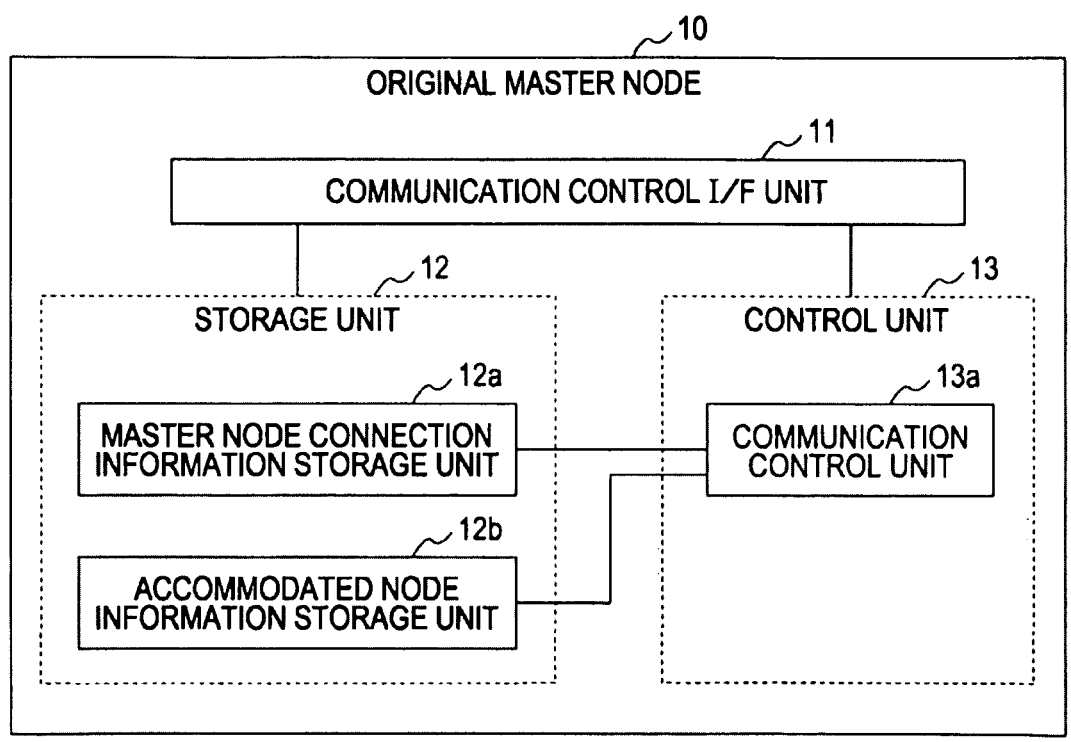
FIG. 3 is a block diagram illustrating a configuration of an original master node according to the first embodiment.
Figure 5:
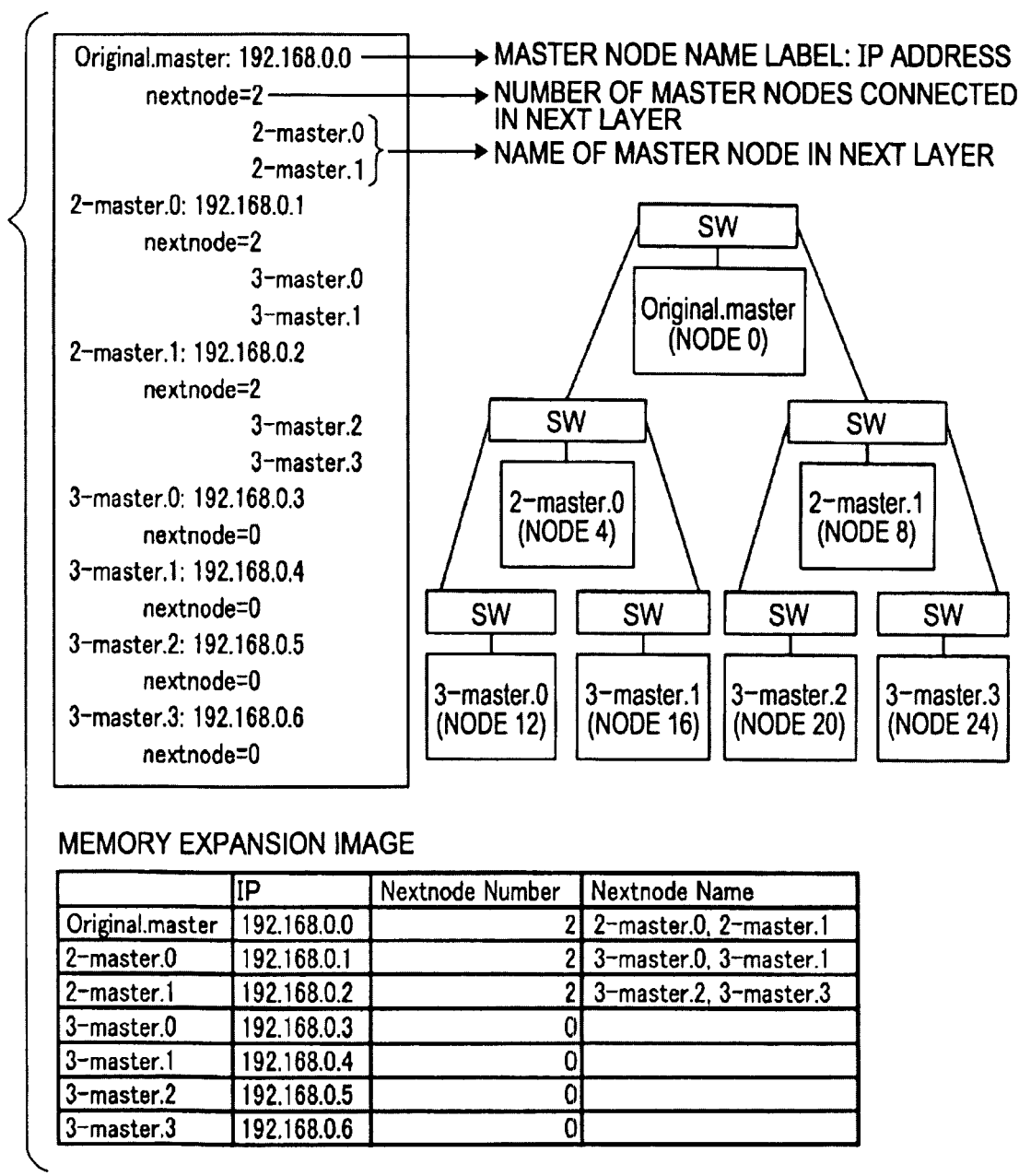
FIG. 5 illustrates a master node connection information storage unit according to the first embodiment.
Figure 6:
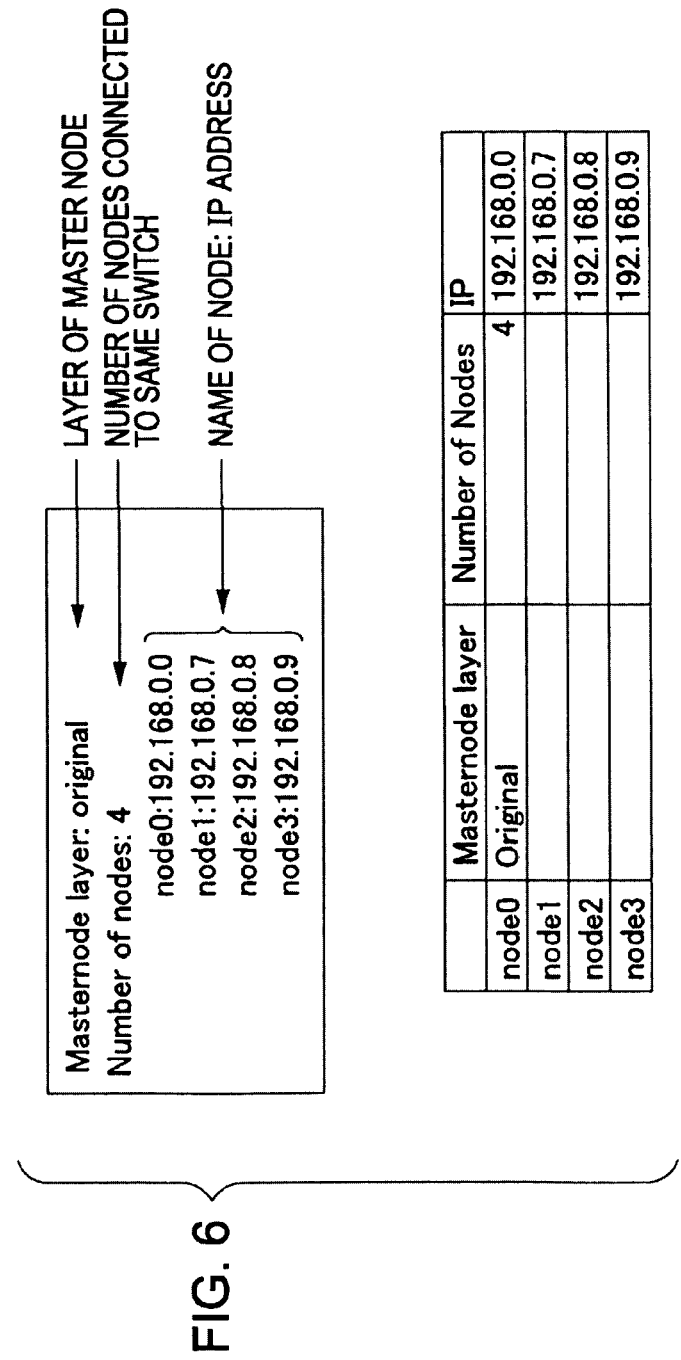
FIG. 6 illustrates an accommodated node information storage unit of the original master node according to the first embodiment.

Hereinafter, the original master node according to the first embodiment is described with reference to FIGS. 3, 5, and 6. FIG. 3 is a block diagram illustrating a configuration of the original master node according to the first embodiment, FIG. 5 illustrates a master node connection information storage unit according to the first embodiment, and FIG. 6 illustrates an accommodated node information storage unit of the original master node according to the first embodiment.

As illustrated in FIG. 3, the original master node 10 according to the first embodiment includes a communication control I/F unit 11, a storage unit 12, and a control unit 13.

The communication control I/F unit 11 controls transfer of data transmitted/received via a network and controls data transfer between the storage unit 12 and the control unit 13. Specifically, the communication control I/F unit 11 receives a parallel program reading notification and a process end notification and transfers those notifications to the control unit 13, or transfers a request for establishing communication from the control unit 13.

The storage unit 12 stores data to be used in various processes performed by the control unit 13. Particularly, as elements closely related to the present invention, the storage unit 12 includes a master node connection information storage unit 12a and an accommodated node information storage unit 12b, as illustrated in FIG. 3. The master node connection information storage unit 12a corresponds to the "master node connection information holding procedure" described in claims, and the accommodated node information storage unit 12b corresponds to the "accommodated node information holding procedure" described in the claims.

The master node connection information storage unit 12a holds and stores master node connection information, which is information about the connection between the original master node and the lower-layer master nodes set in the lower-layer sub-clusters.

More specifically, as illustrated in FIG. 5, the master node connection information storage unit 12a holds master node connection information indicating: node 0 set as the original master node 10 connects to two second-layer master nodes "node 4: 2-master.0" and "node 8: 2-master.1"; the second-layer master node "node 4: 2-master.0" connects to two third-layer master nodes "node 12: 3-master.0" and "node 16: 3-master.1"; and the second-layer master node "node 8: 2-master.1" connects to two third-layer master nodes "node 20: 3-master.2" and "node 24: 3-master.3". Also, the master node connection information storage unit 12a holds and stores IP addresses as information to uniquely identify the respective master nodes in the network.

The accommodated node information storage unit 12b holds and stores accommodated node information, which is information to uniquely identify the master node and all the slave nodes controlled by the master node accommodated in the highest-layer sub-cluster.

Specifically, as illustrated in FIG. 6, the accommodated node information storage unit 12b stores information about the four nodes accommodated in the first sub-cluster (the sub-cluster in the highest layer of the tree structure) including node 0 set as the original master node 10 and the slave nodes (nodes 1 to 3) controlled by node 0, while associating the information with IP addresses to uniquely identify the nodes in the network.

The control unit 13 executes various processes based on data transferred from the communication control I/F unit 11 and includes a communication control unit 13a as an element closely related to the present invention, as illustrated in FIG. 3. The communication control unit 13a corresponds to the "highest-layer master node communication control procedure" described in the claims.

As preprocessing before execution of the parallel program, the communication control unit 13a establishes communication with all of the slave nodes accommodated in the highest-layer sub-cluster by referring to the accommodated node information stored in the accommodated node information storage unit 12b, and also establishes communication with the respective lower-layer master nodes by referring to the master node connection information stored in the master node connection information storage unit 12a. More specifically, the communication control unit 13a establishes communication with the slave node (nodes 1 to 3) accommodated in the first sub-cluster by referring to the accommodated node information illustrated in FIG. 6 (see FIG. 2B). Also, the communication control unit 13a establishes communication with the lower-layer master nodes (nodes 4, 8, 12, 16, 20, and 24) by referring to the master node connection information illustrated in FIG. 5 (see FIG. 2A).

Also, the communication control unit 13a detects establishment of communication with all the slave nodes controlled by the lower-layer master nodes via the lower-layer master nodes.

As post-processing after execution of the parallel program, the communication control unit 13a detects end of process in all of the nodes accommodated in the highest-layer sub-cluster. More specifically, the communication control unit 13a monitors whether calculation in all of the nodes accommodated in the first sub-cluster has ended and detects the end by referring to the accommodated node information illustrated in FIG. 6 (see FIG. 2C).

Then, the communication control unit 13a detects process end notifications from all of the lower-layer master nodes and then ends communication. More specifically, if the communication control unit 13a receives process end notifications from all the lower-layer master nodes included in the master node connection information illustrated in FIG. 5, the communication control unit 13a ends communication with all of the nodes that was established in the preprocessing.

<Configuration of Lower-Layer Master Node According to the First Embodiment>

Figure 4:
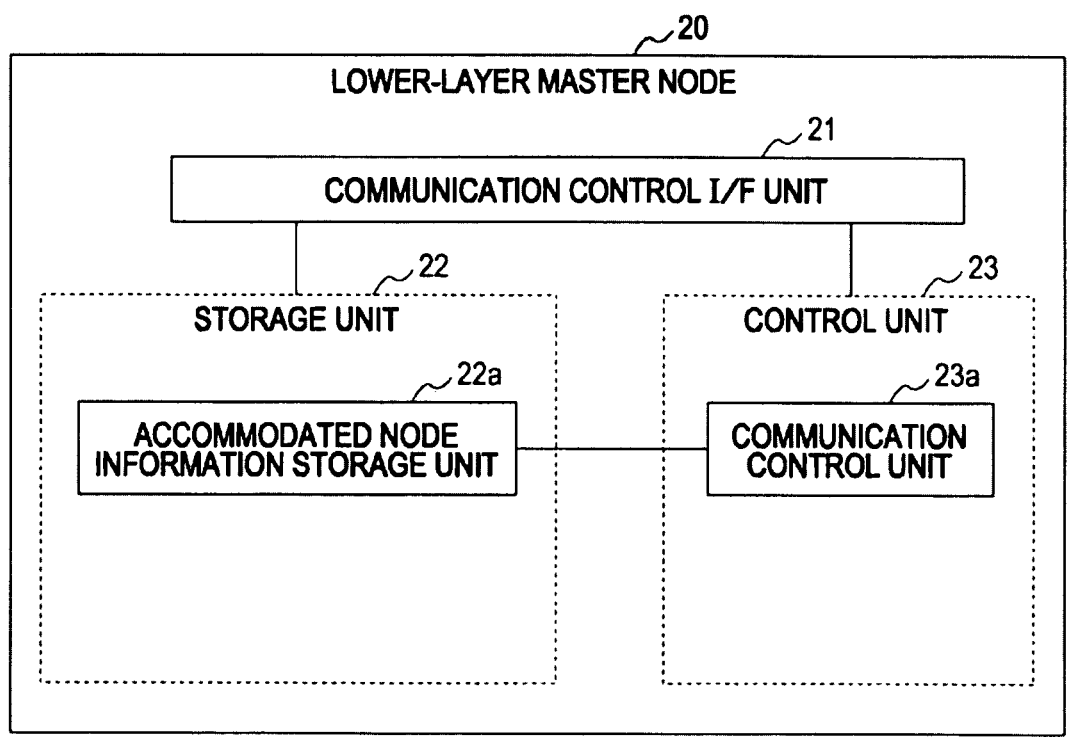
FIG. 4 is a block diagram illustrating a configuration of a lower-layer master node according to the first embodiment.
Figure 7:
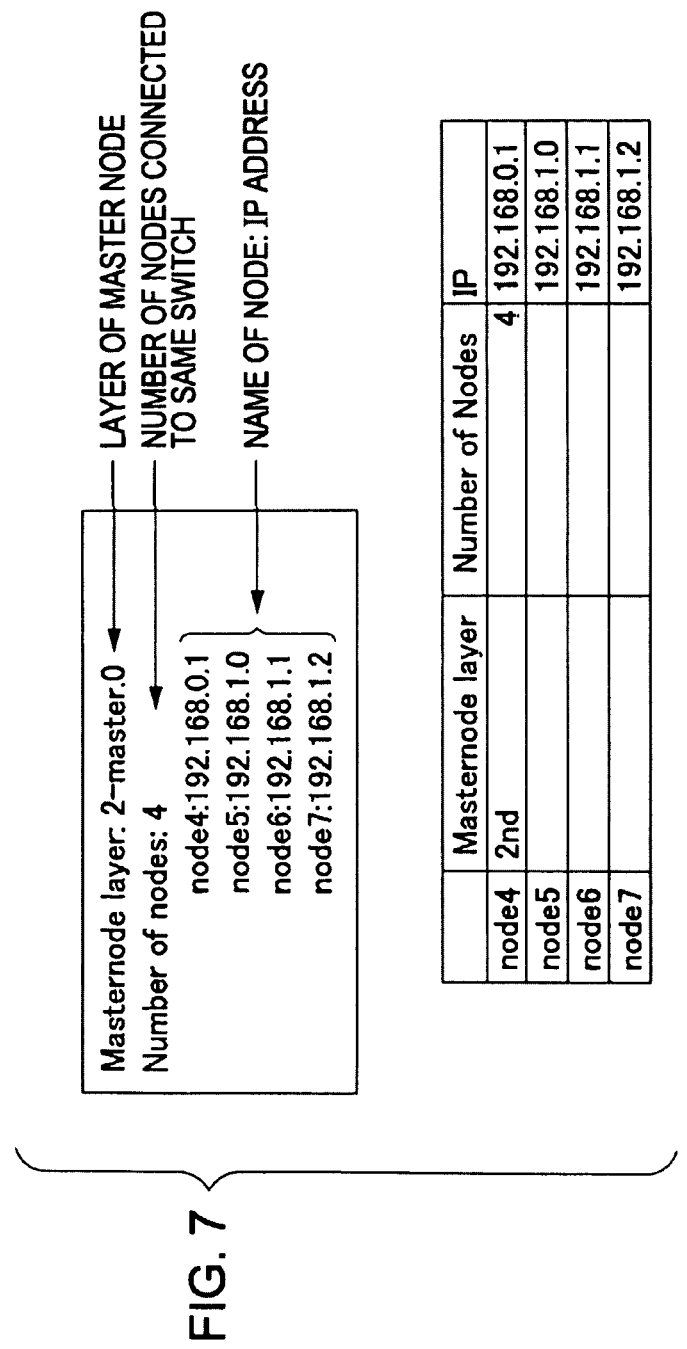
FIG. 7 illustrates an accommodated node information storage unit of the lower-layer master node according to the first embodiment.

Next, the lower-layer master node according to the first embodiment is described with reference to FIGS. 4 and 7. FIG. 4 is a block diagram illustrating a configuration of the lower-layer master node according to the first embodiment, and FIG. 7 illustrates an accommodated node information storage unit of the lower-layer master node according to the first embodiment.

As illustrated in FIG. 4, the lower-layer master node 20 according to the first embodiment includes a communication control I/F unit 21, a storage unit 22, and a control unit 23.

The communication control I/F unit 21 controls transfer of data transmitted/received via the network and controls data transfer between the storage unit 22 and the control unit 23. Specifically, the communication control I/F unit 21 receives a request for establishing communication from the original master node 10 and transfers the request to the control unit 23, or transfers a process end notification received from the control unit 23 to the original master node 10.

The storage unit 22 stores data to be used in various processes performed by the control unit 23. Particularly, as an element closely related to the present invention, the storage unit 22 includes an accommodated node information storage unit 22a, as illustrated in FIG. 4. The accommodated node information storage unit 22a corresponds to the "accommodated node information holding procedure" described in the claims.

The accommodated node information storage unit 22a holds and stores accommodated node information, which is information to uniquely identify the master node and all of the slave nodes controlled by the master node accommodated in the lower-layer sub-cluster.

For example, as illustrated in FIG. 7, the accommodated node information storage unit 22a stores information about the four nodes accommodated in the second-sub-cluster (the sub-cluster in the second layer of the tree structure) including node 4 set as the lower-layer master node 20 and the slave nodes (node 5 to 7) controlled by node 4, while associating the information with IP addresses to uniquely identify the four nodes in the network.

The control unit 23 executes various processes based on data transferred from the communication control I/F unit 21 and includes a communication control unit 23a as an element closely related to the present invention, as illustrated in FIG. 4. The communication control unit 23a corresponds to the "lower-layer master node communication control procedure" described in the claims.

After communication between the original master node 10 and the lower-layer master node 20 has been established, the communication control unit 23a establishes communication between the original master node and the slave nodes accommodated in their own sub-cluster by referring to the accommodated node information stored in the accommodated node information storage unit 22a, as preprocessing before execution of the parallel program. For example, the communication control unit 23a of node 4 serving as a second-layer master node establishes communication between the original master node and the slave nodes (nodes 5 to 7) accommodated in the second sub-cluster by referring to the accommodated node information illustrated in FIG. 7 (see FIG. 2B).

Also, the communication control unit 23a detects end of process in all the accommodated nodes and notifies the original master node 10 of the end of process, as post-processing after execution of the parallel program. For example, the communication control unit 23a of node 4 serving as a second-layer master node monitors whether calculation in the nodes accommodated in the second sub-cluster has ended and detects the end by referring to the accommodated node information illustrated in FIG. 7, and notifies the original master node 10 of the end of process (see FIG. 2C).

<Procedure of Process Performed by Original Master Node According to the First Embodiment>

Figure 8:
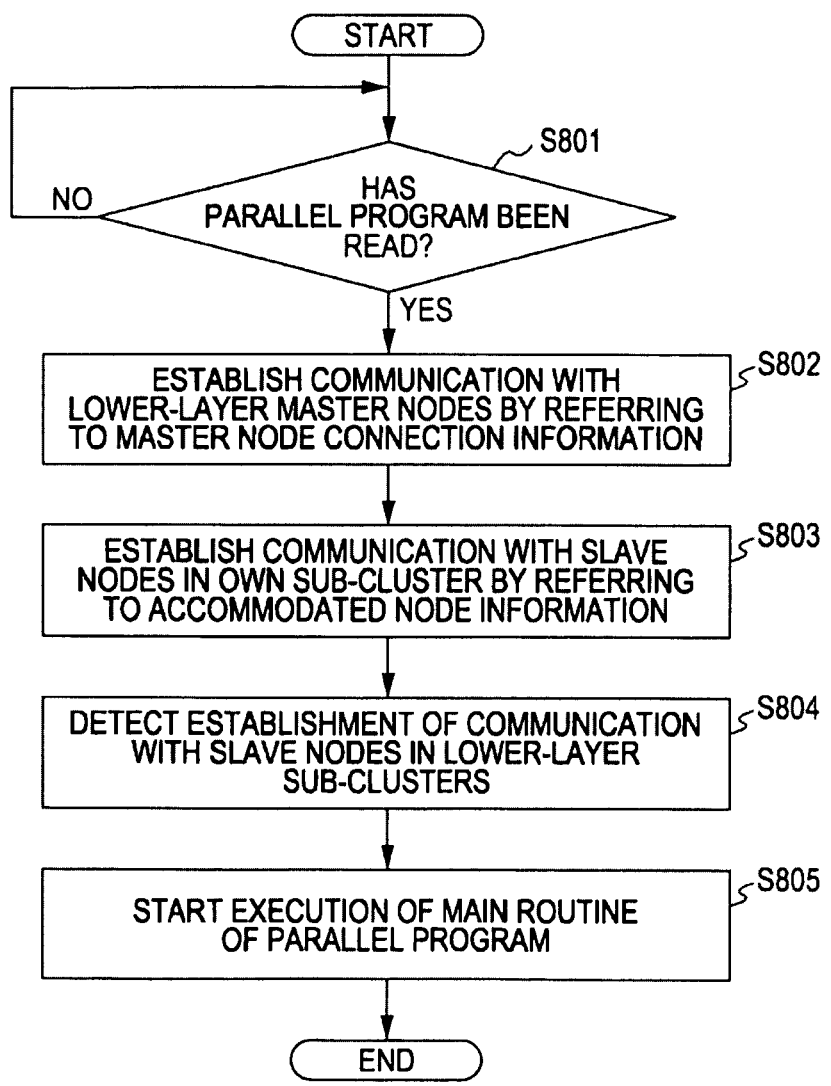
FIG. 8 illustrates a procedure of preprocessing performed by the original master node according to the first embodiment.
Figure 10:
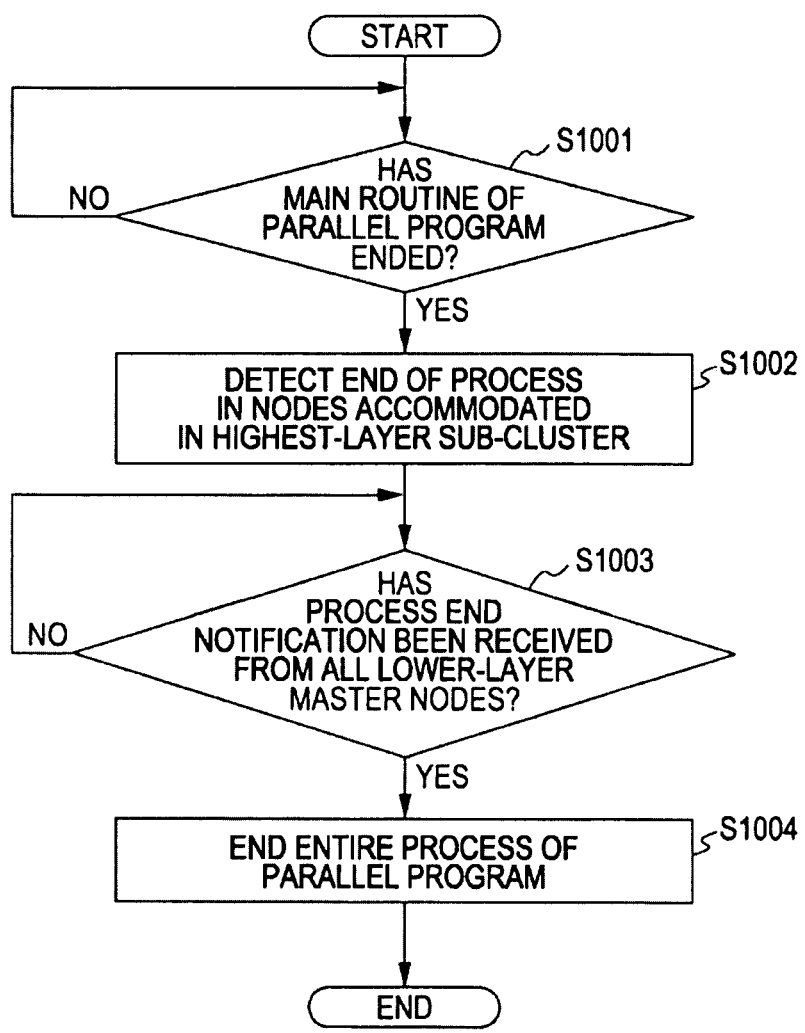
FIG. 10 illustrates a procedure of post-processing performed by the original master node according to the first embodiment.

Hereinafter, a process performed by the original master node according to the first embodiment is described with reference to FIGS. 8 and 10. FIG. 8 illustrates a procedure of preprocessing performed by the original master node according to the first embodiment, and FIG. 10 illustrates a procedure of post-processing performed by the original master node according to the first embodiment.

<Procedure of Preprocessing Performed by Original Master Node According to First Embodiment>

After the parallel program has been read in the parallel process system (YES in step S801), the original master node 10 according to the first embodiment establishes communication with the lower-layer master nodes by referring to the master node connection information (step S802). More specifically, the communication control unit 13a establishes communication with the lower-layer master nodes (nodes 4, 8, 12, 16, 20, and 24) by referring to the master node connection information stored in the master node connection information storage unit 12a illustrated in FIG. 5 (see FIG. 2A).

Then, the communication control unit 13a establishes communication with the slave nodes in the own sub-cluster by referring to the accommodated node information (step S803). More specifically, the communication control unit 13a establishes communication with the slave nodes (nodes 1 to 3) accommodated in the first sub-cluster by referring to the accommodated node information stored in the accommodated node information storage unit 12b illustrated in FIG. 6 (see FIG. 2B).

Then, the communication control unit 13a detects establishment of communication with all of the slave nodes controlled by the lower-layer master node 20 via the lower-layer master node 20 (step S804). For example, the communication control unit 13a detects establishment of communication with all of the slave nodes (nodes 5 to 7) via node 4, which is set as the lower-layer master node 20.

Then, the original master node 10 according to the first embodiment starts execution of the main routine of the parallel program (step S805) and ends the process.

<Procedure of Post-Processing Performed by Original Master Node According to First Embodiment>

After the main routine of the parallel program has ended in the parallel process system (YES in step S1001), the original master node 10 according to the first embodiment detects end of process in all of the nodes accommodated in the highest-layer sub-cluster (step S1002). More specifically, the communication control unit 13a monitors whether calculation in all of the nodes accommodated in the first sub-cluster has ended and detects the end by referring to the accommodated node information illustrated in FIG. 6 (see FIG. 2C).

Then, after receiving process end notifications from all the lower-layer master nodes (YES in step S1003), the communication control unit 13a ends the entire process of the parallel program (step S1004) and ends the post-processing. More specifically, if the communication control unit 13a receives process end notifications from all the lower-layer master nodes included in the master node connection information illustrated in FIG. 6, the communication control unit 13a ends the communication with all the nodes, which was established in the preprocessing.

<Procedure of Process Performed by Lower-Layer Master Node According to First Embodiment>

Figure 9:
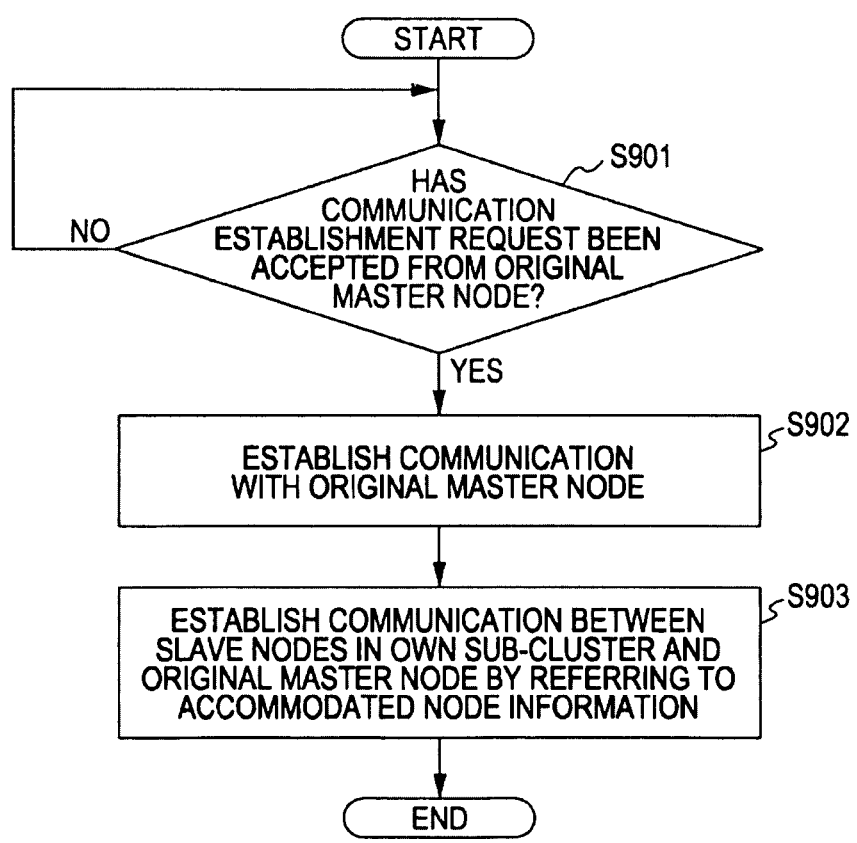
FIG. 9 illustrates a procedure of preprocessing performed by the lower-layer master node according to the first embodiment.

Next, a process performed by the lower-layer master node according to the first embodiment is described with reference to FIGS. 9 and 11. FIG. 9 illustrates a procedure of preprocessing performed by the lower-layer master node according to the first embodiment, and FIG. 11 illustrates a procedure of post-processing performed by the lower-layer master node according to the first embodiment.

<Procedure of Preprocessing Performed by Lower-Layer Master Node According to First Embodiment>

After accepting a communication establishment request from the original master node 10 (YES in step S901), the lower-layer master node 20 according to the first embodiment establishes communication with the original master node 10 (step S902).

Then, the communication control unit 23a establishes communication between the slave nodes in their own sub-cluster and the original master node by referring to the accommodated node information (step S903), and then ends the preprocessing. For example, the communication control unit 23a of node 4 serving as a second-layer master node establishes communication between the slave nodes (nodes 5 to 7) accommodated in the second sub-cluster and the original master node by referring to the accommodated node information illustrated in FIG. 7 (see FIG. 2B).

<Procedure of Post-Processing Performed by Lower-Layer Master Node According to First Embodiment>

After the main routine of the parallel program has ended (YES in step S1101), the communication control unit 23a of the lower-layer master node 20 according to the first embodiment detects end of process in the nodes in their own sub-cluster (step S1102). For example, the communication control unit 23a of node 4 serving as a second-layer master node monitors whether calculation in the nodes accommodated in the second sub-cluster has ended and detects the end by referring to the accommodated node information illustrated in FIG. 7.

Then, the communication control unit 23a transmits a process end notification to the original master node 10 (step S1103) and ends the post-processing.

<Advantages of First Embodiment>

As described above, according to the first embodiment, when the node is set as a master node of a sub-cluster, the node holds accommodated node information, which is information to uniquely identify the master node and all the slave nodes controlled by the master node accommodated in the sub-cluster. When the node is set as the original master node 10 in the highest-layer sub-cluster of the tree structure, the node holds master node connection information, which is information about the connection between the original master node and the lower-layer master nodes 20. The original master node 10 establishes communication with all of the slave nodes accommodated in the highest-layer sub-cluster by referring to the accommodated node information held therein, and also establishes communication with the respective lower-layer master nodes 20 by referring to the master node connection information, as preprocessing of the parallel process. Also, the original master node 10 detects end of process in all the nodes accommodated in the highest-layer sub-cluster and detects process end notifications from all the lower-layer master nodes 20 so as to end communication, as post-processing of the parallel process. On the other hand, after communication with the original master node 10 has been established, the lower-layer master node 20 establishes communication between the slave nodes accommodated in the lower-layer sub-cluster and the original master node 10 by referring to the accommodated node information held therein, as preprocessing of the parallel process. Also, the lower-layer master node 20 detects end of process in all the nodes accommodated in the lower-layer sub-cluster and notifies the original master node 10 of the end of process, as post-processing of the parallel process. Accordingly, the preprocessing and the post-processing, which are conventionally performed by one master node, can be performed in a distributed manner by the highest-layer master node set in the highest-layer sub-cluster and the lower-layer master nodes set in the respective lower-layer sub-clusters, so that an efficient parallel process can be performed.

<Second Embodiment>

In the above-described first embodiment, the preprocessing and the post-processing are performed in a distributed manner by the original master node and the lower-layer master nodes. In the second embodiment, assignment of data sets to be used in the parallel program is performed in a distributed manner by the original master node and the lower-layer master nodes.

<Overview and Feature of Node According to Second Embodiment>

First, a main feature of the node according to the second embodiment is described with reference to FIGS. 12A to 12C and 13A to 13C. FIGS. 12A to 12C and 13A to 13C illustrate an overview and a feature of the node according to the second embodiment.

Figures 12A, 12B:
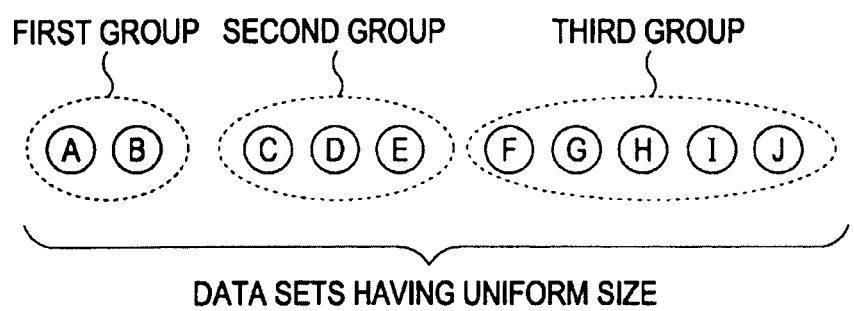
FIGS. 12A, 12B, and 12C illustrate an overview and a feature of a node according to a second embodiment.

As illustrated in FIG. 12A, assume that ten data sets (A to J) having a uniform size are provided as data sets to be used in the parallel process and that those data sets are grouped into a first group (A and B), a second group (C, D, and E), and a third group (F, G, H, I, and J). During execution of calculation, data communication is performed only within each group, in other words, data communication is not performed between groups (e.g., between data set A and data set C).

Figure 12C:
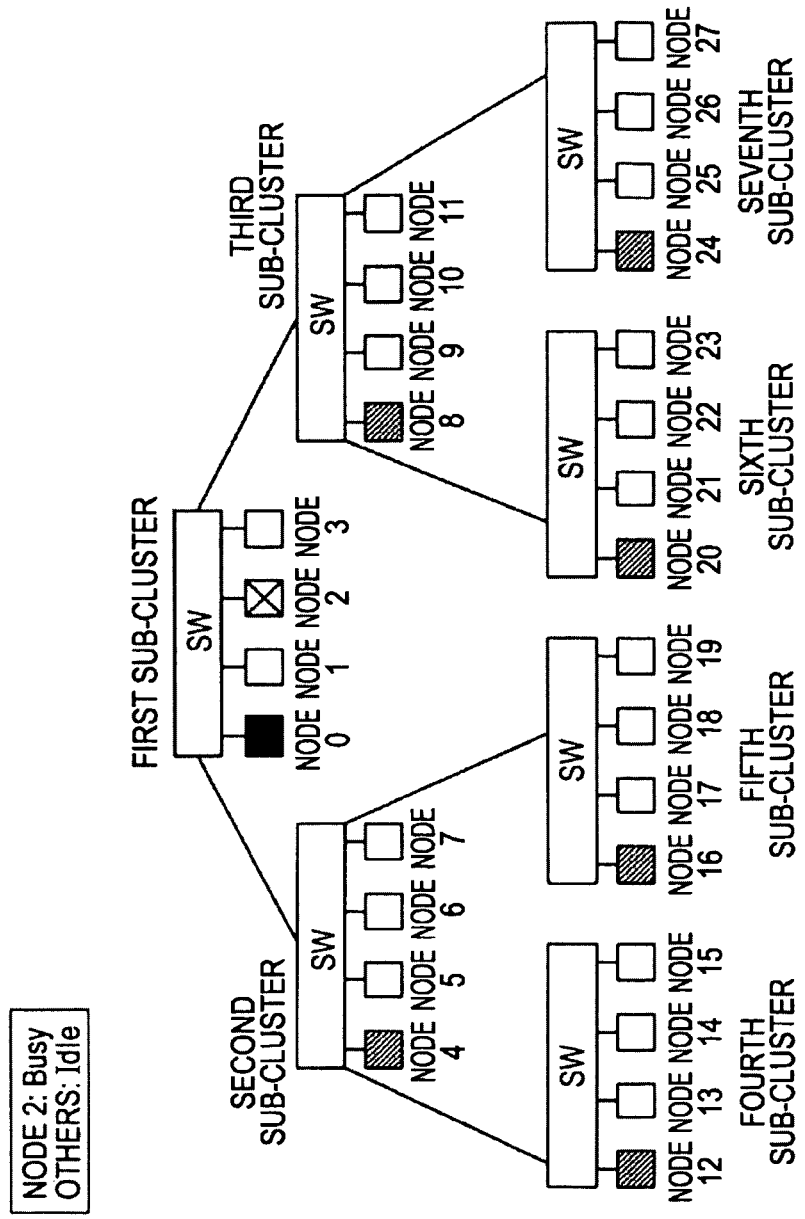

In the parallel process system illustrated in FIG. 12C, the main routine of the parallel program is being executed after the preprocessing described in the first embodiment. In this system, assume that only node 2 of the first sub-cluster is unusable (busy) and that the other nodes are usable (idle). Each master node holds the usage status of corresponding nodes in the form of the accommodated node information.

Upon detecting instructions described about the ten data sets illustrated in FIG. 12A during execution of the main routine of the parallel program, the original master node (node 0) according to the second embodiment stops execution of the main routine of the parallel program and extracts information described in the instructions. As illustrated in FIG. 12B, the instructions describe that the total number of data sets having a uniform size and used in the parallel process is 10, and that the group structure in which data communication is closed includes a first group (two data sets), a second group (three data sets), and a third group (five data sets).

The instructions are about grouping of the data sets to be used in the parallel process based on a calculation cost and a communication cost. Such instructions can be arbitrarily inserted by a user in the parallel program using the MPI.

Then, after extracting the information described in the instructions, the original master node (node 0) according to the second embodiment assigns the data sets in the same group described in the instructions so that a calculation cost and a communication cost can be saved.

Figure 13A:
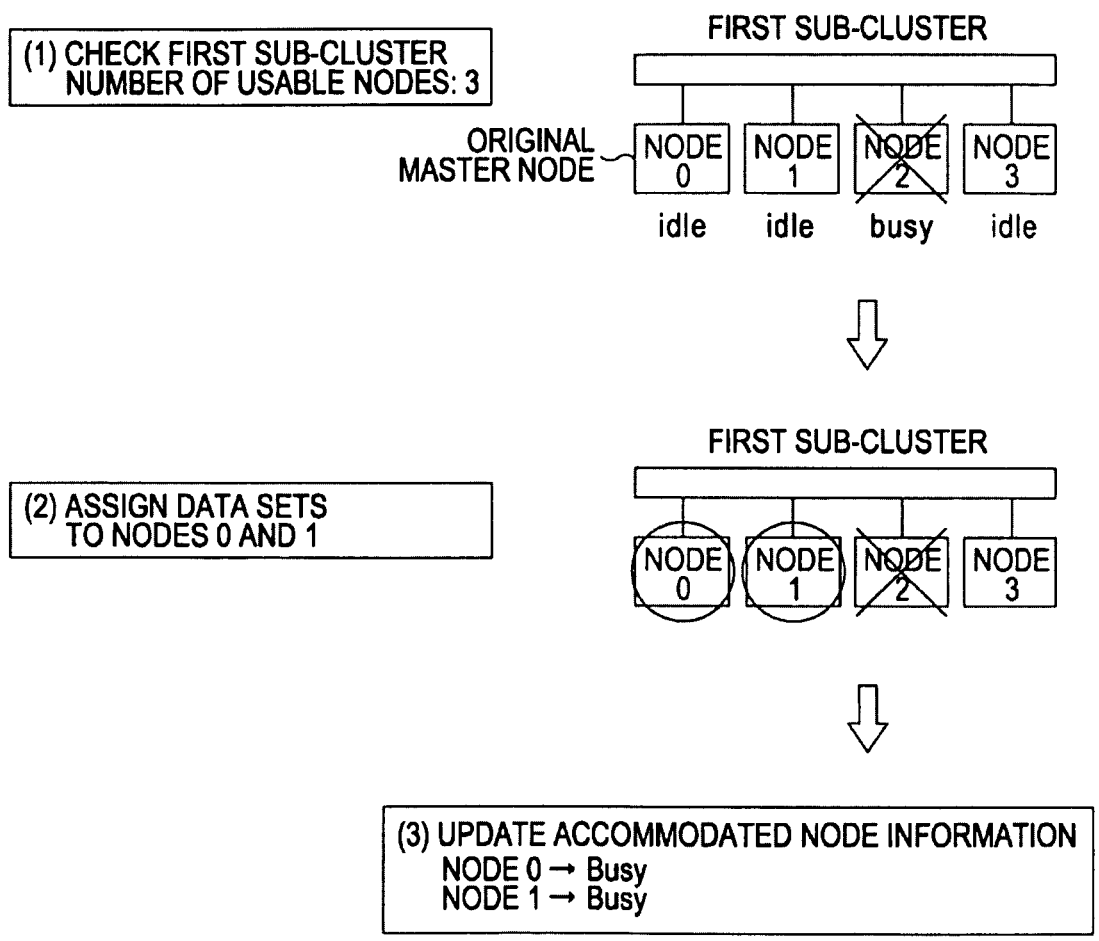
FIGS. 13A, 13B, and 13C illustrate the overview and feature of the node according to the second embodiment.

Referring to FIG. 13A, before assigning the data sets in the first group (two data sets A and B), the original master node (node 0) according to the second embodiment checks the first sub-cluster by referring to the accommodated node information held therein and detects that the number of usable nodes is 3 (see (1) in FIG. 13A). Since all the data sets in the first group can be assigned to the nodes of the first sub-cluster, the original master node assigns the data sets to node 0 and node 1 in numeric order (see (2) in FIG. 13A). Then, the original master node updates the information about nodes 0 and 1 in the accommodated node information held therein from "idle" to "busy" (see (3) in FIG. 13A).

Also, the original master node (node 0) according to the second embodiment assigns the data sets in the same group to the nodes of the same sub-cluster by referring to the master node connection information.

Figure 13B:
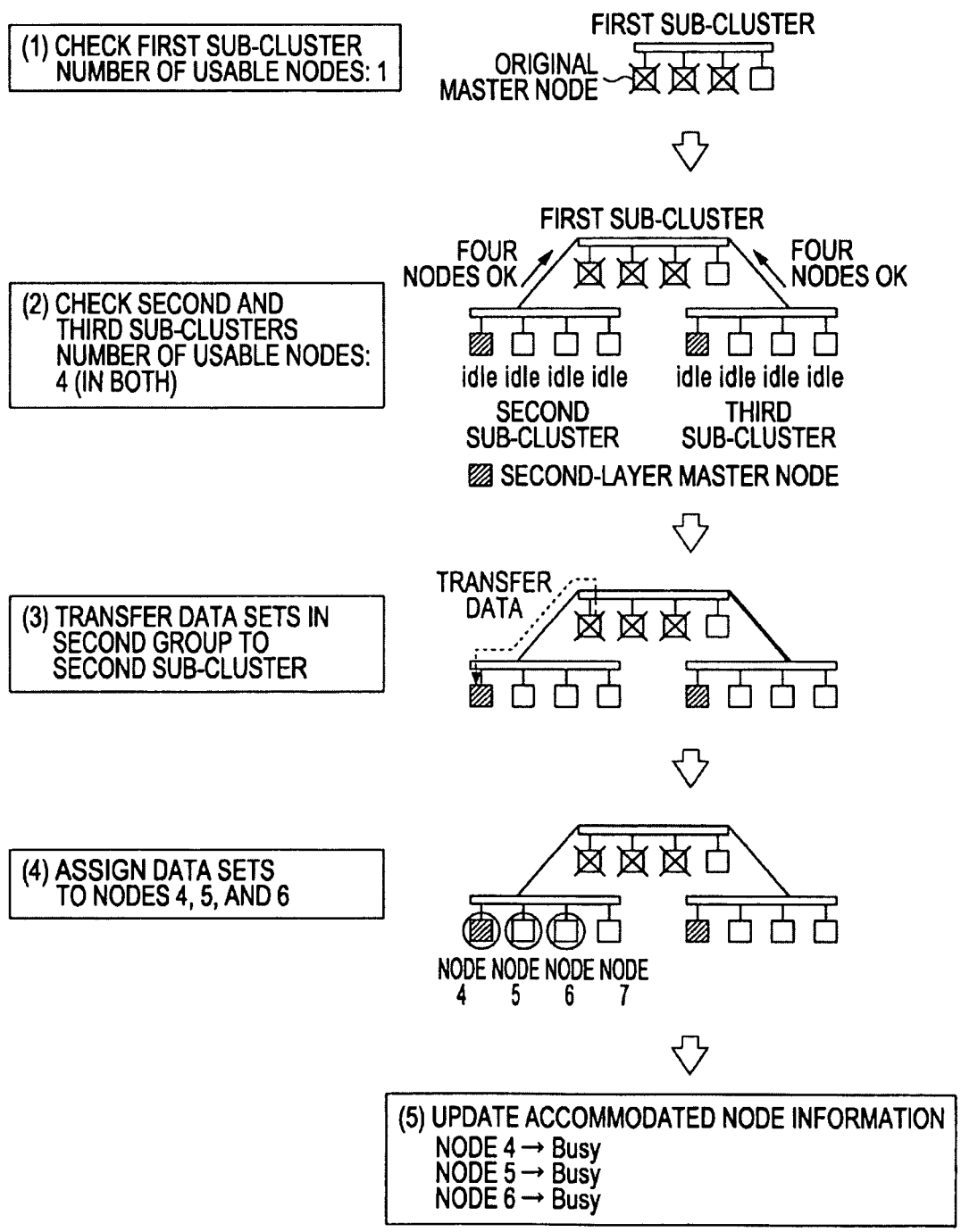

For example, as illustrated in FIG. 13B, before assigning the data sets in the second group (three data sets C, D, and E), the original master node (node 0) according to the second embodiment checks the first sub-cluster by referring to the accommodated node information held therein, detects that the number of usable nodes is 1 (see (1) in FIG. 13B), and determines that the data sets cannot be assigned to the first sub-cluster. Then, the original master node allows nodes 4 and 8 as lower-layer master nodes to check the second and third sub-clusters by referring to the master node connection information, and detects that the number of usable nodes is 4 in both sub-clusters (see (2) in FIG. 13B).

Since the data sets in the second group can be assigned to any of the second and third sub-clusters, the original master node (node 0) according to the second embodiment transfers the data sets in the second group to the sub-cluster on the left (second sub-cluster), for example (see (3) in FIG. 13B), and assigns the data sets to nodes 4, 5, and 6 in numerical order in the second sub-cluster (see (4) in FIG. 13B). Then, node 4, which is the master node of the second sub-cluster, updates the information about nodes 4, 5, and 6 in the accommodated node information held therein from "idle" to "busy" (see (5) in FIG. 13B).

If the original master node (node 0) according to the second embodiment can assign not all the data sets in the same group to the nodes of the same sub-cluster, the original master node assigns the data set that cannot be assigned to a node of one of the lower-layer sub-clusters.

Figure 13C:
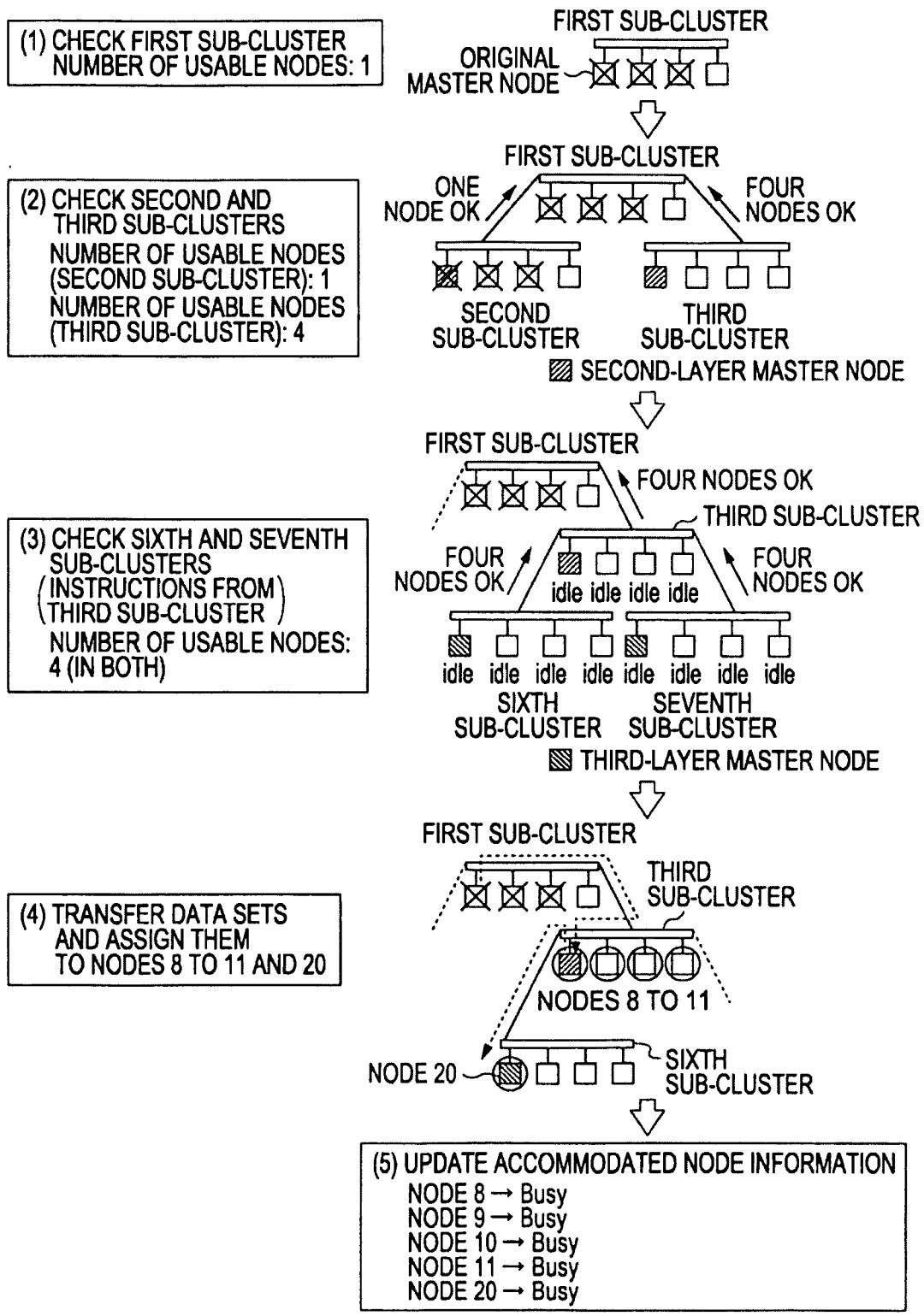

For example, as illustrated in FIG. 13C, before assigning the data sets in the third group (five data sets F, G, H, I, and J), the original master node (node 0) according to the second embodiment checks the first sub-cluster by referring to the accommodated node information held therein, detects that the number of usable nodes is 1 (see (1) in FIG. 13C), and determines that the data sets cannot be assigned to the first sub-cluster. Then, the original master node allows nodes 4 and 8 as the lower-layer master nodes to check the second and third sub-clusters by referring to the master node connection information, and detects that the number of usable nodes in the respective sub-clusters is 1 and 4 (see (2) in FIG. 13C). Furthermore, the original master node (node 0) according to the second embodiment allows node 8 of the third sub-cluster, having many usable nodes, to instruct nodes 20 and 24 as the lower-layer sub-clusters to check the number of usable nodes in the sixth and seventh sub-clusters. Accordingly, the original master node detects that the number of usable nodes is 4 in the respective sub-clusters (see (3) in FIG. 13C).

Here, the original master node (node 0) according to the second embodiment determines that the total number of usable nodes in the third sub-cluster and the sub-clusters below the third sub-cluster is 12 and that the data sets in the third group can be assigned thereto. However, only four of the five data sets can be assigned to the third sub-cluster, and thus the other data set is assigned to one of the nodes of the sub-clusters below the third sub-cluster. For example, the original master node determines that the other data set is to be assigned to node 20, having the earliest number in the sixth sub-cluster on the left, among the lower-layer sub-clusters. On the basis of this determination, the original master node (node 0) according to the second embodiment transfers the data sets in the third group to the third sub-cluster and the sixth sub-cluster and assigns the data sets to nodes 8 to 11 and 20 (see (4) in FIG. 13C). Then, node 8, which is the master node of the third sub-cluster, updates the information about nodes 8 to 11 in the accommodated node information held therein from "idle" to "busy". Also, node 20, which is the master node of the sixth sub-cluster, updates the information about node 20 in the accommodated node information held therein from "idle" to "busy" (see (5) in FIG. 13C).

In this embodiment, the sub-cluster on the left is selected and the data sets are assigned to the nodes therein in ascending order of node number. However, the present invention is not limited to this, but the sub-cluster on the right can be selected and the data sets can be assigned to the nodes therein in descending order of node number. Also, as illustrated in (3) in FIG. 13C, only the lower-layer master node of the sub-cluster having many usable nodes is allowed to instruct the lower-layer sub-clusters to check the number of usable nodes. However, the present invention is not limited to this, but the lower-layer master node of the sub-cluster having fewer usable nodes can be allowed to instruct the lower-layer sub-clusters to check the number of usable nodes. Then, the nodes to be used for assignment can be determined based on the results in both master nodes.

As described above, the node according to the second embodiment can assign the data sets that are grouped based on a calculation cost and a communication cost to the nodes in the highest-layer sub-cluster, so that an efficient parallel process can be performed.

<Configuration of Original Master Node According to Second Embodiment>

Figure 14:
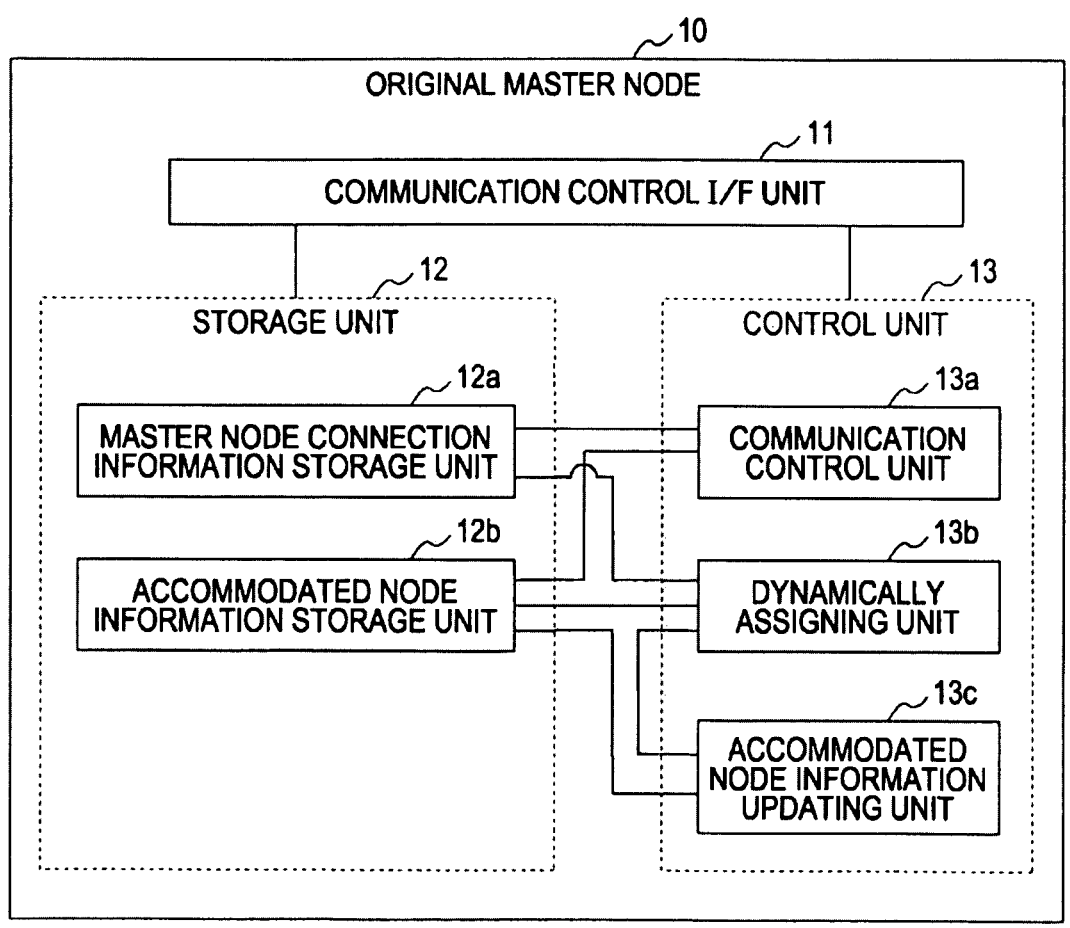
FIG. 14 is a block diagram illustrating a configuration of an original master node according to the second embodiment.
Figure 16:
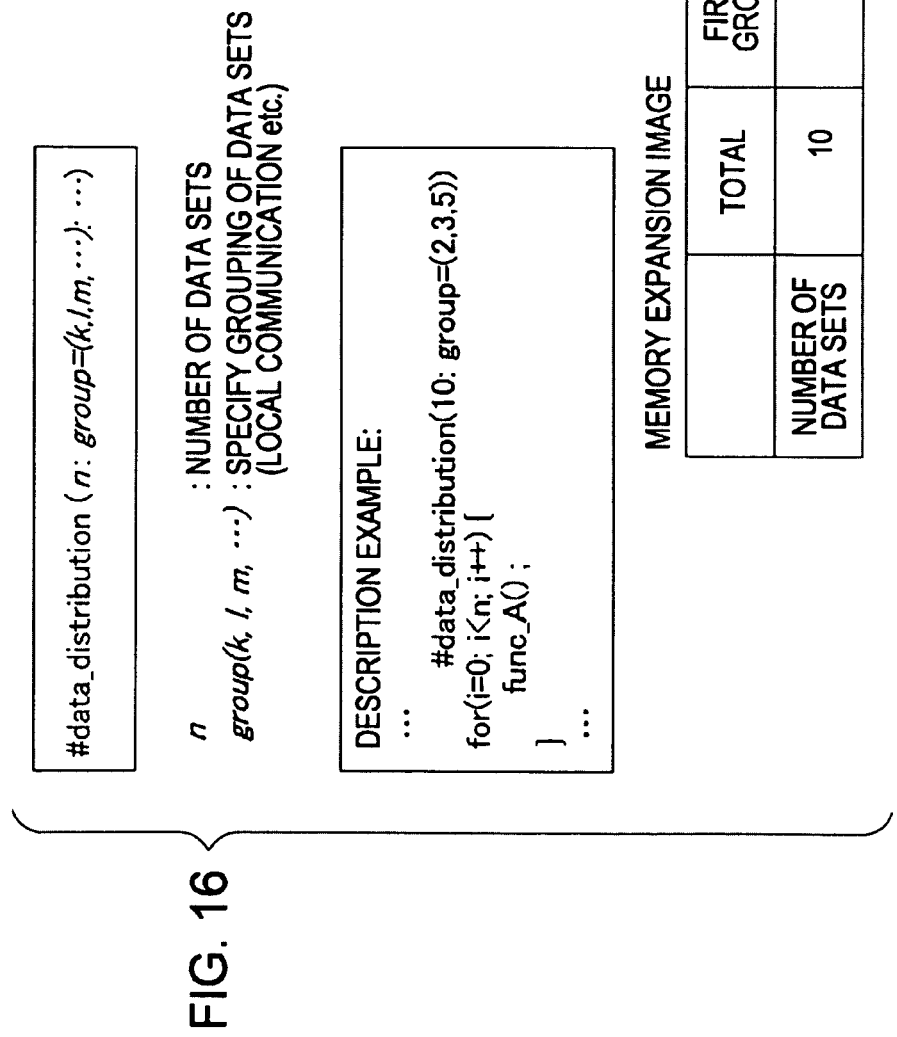
FIG. 16 illustrates instructions.

Hereinafter, the original master node according to the second embodiment is described with reference to FIGS. 14, 16, 17, and 18A. FIG. 14 is a block diagram illustrating a configuration of the original master node according to the second embodiment, FIG. 16 illustrates instructions, FIG. 17 illustrates a dynamically assigning command according to the second embodiment, and FIG. 18A illustrate an accommodated node information storage unit according to the second embodiment.

As illustrated in FIG. 14, the original master node 10 according to the second embodiment has basically the same configuration as that of the original master node 10 according to the first embodiment illustrated in FIG. 3. A difference is that a dynamically assigning unit 13b and an accommodated node information updating unit 13c are provided. Hereinafter, descriptions are given mainly about these two elements. The dynamically assigning unit 13b corresponds to the "assigning procedure" described in the claims.

When instructions to group the data sets to be used in the parallel process based on a calculation cost and a communication cost are detected in the program to perform the parallel process, the dynamically assigning unit 13b assigns the data sets in the same group described in the instructions to nodes so that the calculation cost and the communication cost can be saved. For example, as illustrated in FIG. 16, when instructions describing that the total number of data sets having a uniform size and used in the parallel process is 10 and that the group structure in which data communication is closed includes a first group (two data sets), a second group (three data sets), and a third group (five data sets) are detected during execution of the main routine of the parallel program and information described in the instructions is extracted, the dynamically assigning unit 13b stops execution of the main routine of the parallel program and assigns the data sets in the same group described in the instructions to nodes so that the calculation cost and the communication cost can be saved.

Figure 18A:
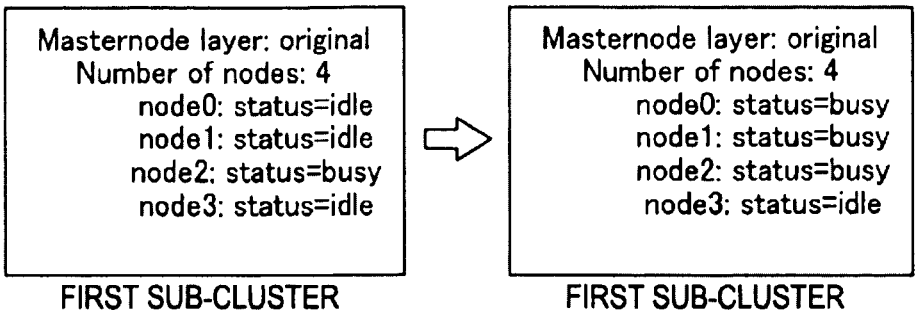
FIGS. 18A, 18B, 18C, and 18D illustrate an accommodated node information storage unit according to the second embodiment.

More specifically, before assigning the data sets in the first group (two data sets A and B), the dynamically assigning unit 13b checks the first sub-cluster by referring to a usage status indicated in the accommodated node information stored in the accommodated node information storage unit 12b illustrated on the left side in FIG. 18A and searches for usable nodes (executes command (A) in FIG. 17). Accordingly, the dynamically assigning unit 13b detects that the number of usable nodes is 3 (see (1) in FIG. 13A). Since all the data sets in the first group can be assigned to the first sub-cluster, the dynamically assigning unit 13b executes command (C) in FIG. 17 and assigns the data sets to nodes 0 and 1 in ascending order of node number (see (2) in FIG. 13A).

The accommodated node information updating unit 13c updates the usage status of the nodes, which has been changed by the dynamically assigning unit 13b. More specifically, the accommodated node information updating unit 13c updates the usage status of nodes 0 and 1 from "idle" to "busy" and stores the updated status in the accommodated node information storage unit 12b (see the right side in FIG. 18A). In FIGS. 18A to 18D, illustration of IP addresses is omitted.

Also, the dynamically assigning unit 13b assigns the data sets in the same group to the nodes of the same sub-cluster by referring to the master node connection information stored in the master node connection information storage unit 12a.

Specifically, before assigning the data sets in the second group (three data sets C, D, and E), the dynamically assigning unit 13b checks the first sub-cluster by referring to the usage status indicated in the accommodated node information stored in the accommodated node information storage unit 12b illustrated on the right side of FIG. 18A, searches for usable nodes (executes command (A) in FIG. 17), detects that the number of usable nodes is 1 (see (1) in FIG. 13B), and determines that the data sets in the second group cannot be assigned to the first sub-cluster. Then, the dynamically assigning unit 13b allows nodes 4 and 8 as lower-layer master nodes to check the second and third sub-clusters (executes command (B) in FIG. 17) by referring to the master node connection information stored in the master node connection information storage unit 12a, and detects that the number of usable nodes is 4 in both sub-clusters (see (2) in FIG. 13B).

Since the data sets in the second group can be assigned to any of the second and third sub-clusters, the dynamically assigning unit 13b executes command (D) in FIG. 17, that is, transfers the data sets in the second group to the second sub-cluster on the left (see (3) in FIG. 13B). Then, the dynamically assigning unit 13b instructs node 4, which is the lower-layer master node 20 in the second sub-cluster, to execute command (C) in FIG. 17. Accordingly, node 4 assigns the data sets to nodes 4, 5, and 6 in ascending order of node number in the second sub-cluster (see (4) in FIG. 13B).

As described below, node 4, which is the lower-layer master node 20 in the second sub-cluster, updates the information about nodes 4, 5, and 6 in the accommodated node information held therein from "idle" to "busy".

If not all the data sets in the same group can be assigned to the nodes of the same sub-cluster, the dynamically assigning unit 13b assigns the data set that cannot be assigned to one of the nodes of the lower-layer sub-clusters.

Specifically, before assigning the data sets in the third group (five data sets F, G, H, I, and J), the dynamically assigning unit 13b executes command (A) in FIG. 17 and detects that the number of usable nodes in the first sub-cluster is 1 (see (1) in FIG. 13C). Then, the dynamically assigning unit 13b executes command (B) in FIG. 17 and allows nodes 4 and 8, which are the lower-layer master nodes 20, to check the second and third sub-clusters by referring to the master node connection information stored in the master node connection information storage unit 12a, and detects that the number of usable nodes in the respective sub-clusters is 1 and 4 (see (2) in FIG. 13C).

Furthermore, the dynamically assigning unit 13b instructs node 8, which is the lower-layer master node 20 in the third sub-cluster having many usable nodes, to execute command (B) in FIG. 17, and allows node 8 to instruct nodes 20 and 24, which are the lower-layer master nodes, to check the number of usable nodes in the sixth and seventh sub-clusters. Accordingly, the dynamically assigning unit 13b detects that the number of usable nodes is 4 in both sub-clusters (see (3) in FIG. 13C).

In this case, the dynamically assigning unit 13b determines that the total number of usable nodes in the third sub-cluster and the lower-layer sub-clusters below the third sub-cluster is 12 and that the data sets in the third group can be assigned thereto. However, only four of the five data sets can be assigned to the third sub-cluster, and thus the other data set is assigned to one of the nodes of the sub-clusters below the third sub-cluster. For example, it is determined that the other data set is to be assigned to node 20, which has the earliest number in the sixth sub-cluster on the left among the lower-layer sub-clusters. On the basis of this determination, the dynamically assigning unit 13b transfers the data sets in the third group to the third sub-cluster (executes command (D) in FIG. 17). Furthermore, the dynamically assigning unit 13b instructs node 8, which is the lower-layer master node 20 of the third sub-cluster, to execute command (D) in FIG. 17, so as to transfer the other data set to node 20, which is the lower-layer master node 20 of the sixth sub-cluster.

At the same time, the dynamically assigning unit 13b instructs node 8, which is the lower-layer master node 20 of the third sub-cluster, to execute command (C) in FIG. 17, so as to allow node 8 to assign the data sets to nodes 8 to 11. Likewise, the dynamically assigning unit 13b instructs node 20, which is the lower-layer master node 20 of the sixth sub-cluster, to execute command (C) in FIG. 17, so as to allow node 20 to assign the data set to node 20.

As described below, node 8, which is the lower-layer master node 20 of the third sub-cluster, updates the information about nodes 8 to 11 in the accommodated node information held therein from "idle" to "busy". Likewise, node 20, which is the lower-layer master node 20 of the sixth sub-cluster, updates the information about node 20 in the accommodated node information held therein from "idle" to "busy".

<Configuration of Lower-Layer Master Node According to Second Embodiment>

Figure 15:
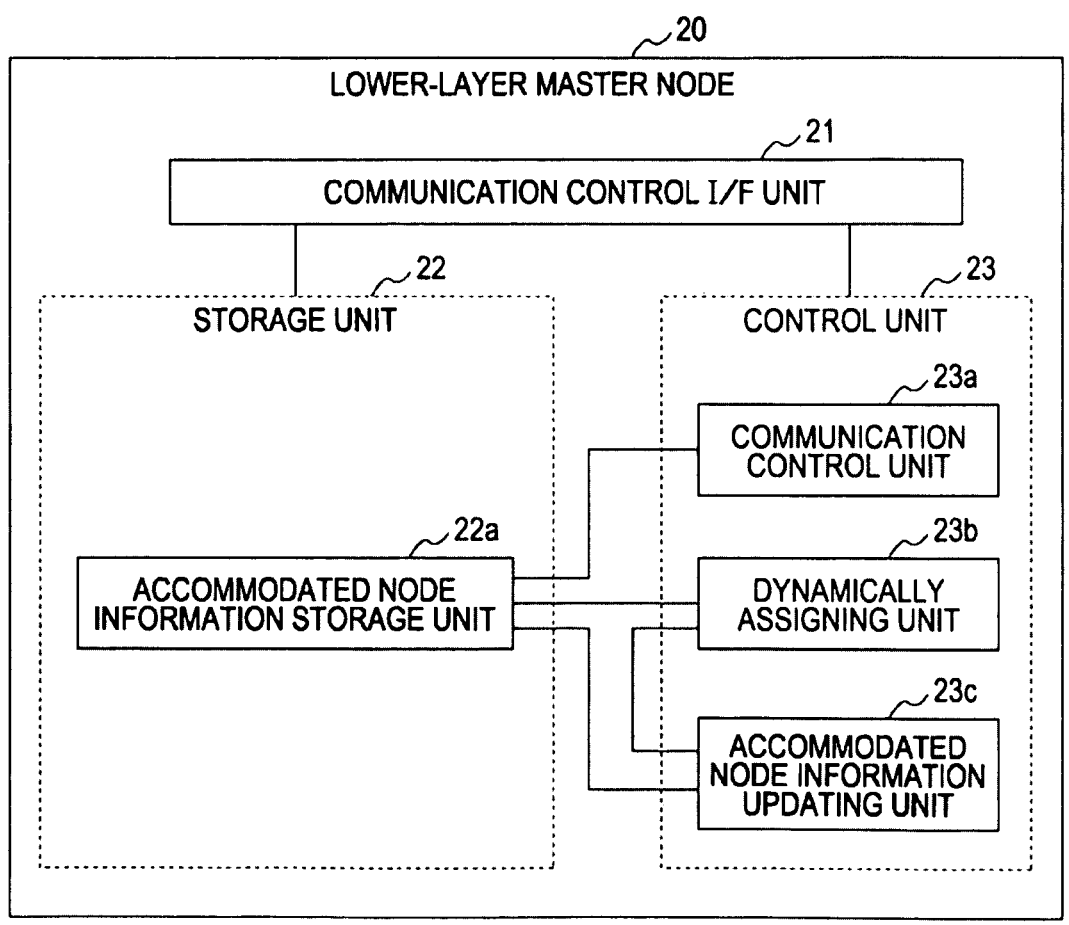
FIG. 15 is a block diagram illustrating a configuration of a lower-layer master node according to the second embodiment.
Figure 18B:
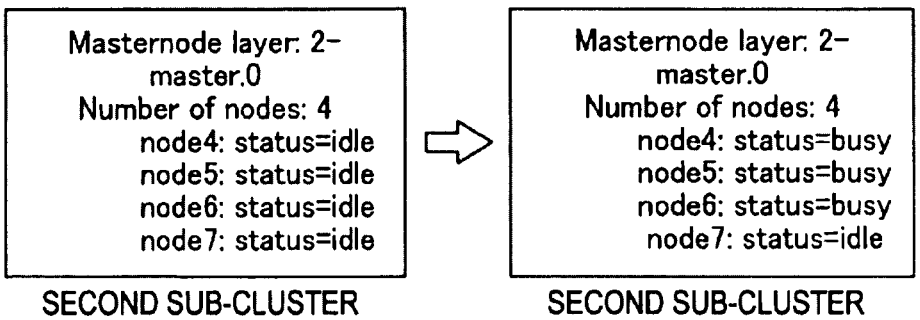
Figure 18C:
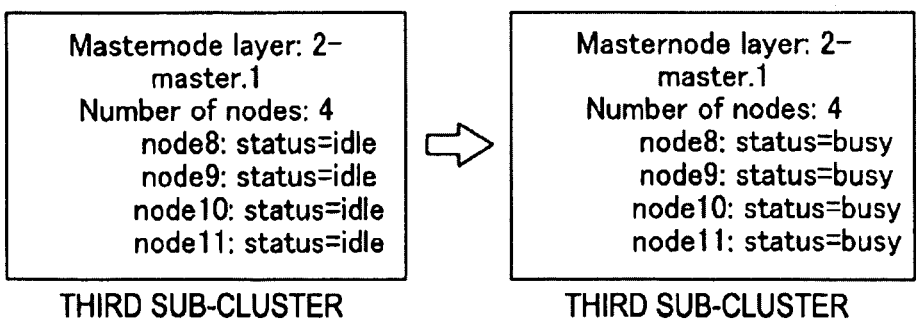
Figure 18D:
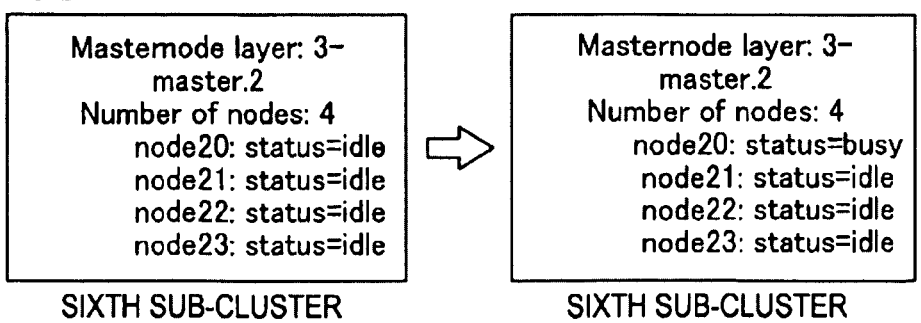

Next, the lower-layer master node according to the second embodiment is described with reference to FIGS. 15, 17, and 18B to 18D. FIG. 15 is a block diagram illustrating a configuration of the lower-layer master node according to the second embodiment, FIG. 17 illustrates the dynamically assigning command according to the second embodiment, and FIGS. 18B to 18D illustrate the accommodated node information storage unit according to the second embodiment.

As illustrated in FIG. 15, the lower-layer master node 20 according to the second embodiment is basically the same as the lower-layer master node 20 according to the first embodiment illustrated in FIG. 4. A difference is that a dynamically assigning unit 23b and an accommodated node information updating unit 23c are provided. Hereinafter, descriptions are given mainly about those elements.

The dynamically assigning unit 23b executes various processes based on instructions from the original master node 10. For example, based on instructions from the original master node 10, the dynamically assigning unit 23b executes command (C) in FIG. 17 so as to assign transferred data sets (see (4) in FIG. 13B), or executes command (B) in FIG. 17 so as to check lower-layer sub-clusters and search for usable nodes (see (3) in FIG. 13C), or executes command (D) in FIG. 17 so as to transfer the data sets to the lower-layer sub-clusters (e.g., transfer of the data set from the third sub-cluster to the sixth sub-cluster in (4) in FIG. 13C).

The accommodated node information updating unit 23c updates the usage status that has been changed by the dynamically assigning unit 23b. For example, the accommodated node information updating unit 23c of node 4, which is the lower-layer master node 20 of the second sub-cluster, updates the information about nodes 4 to 6 in the accommodated node information held therein from "idle" to "busy" and stores the updated information in the accommodated node information storage unit 22a (see the right side in FIG. 18B).

Also, the accommodated node information updating unit 23c of node 8, which is the lower-layer master node 20 of the third sub-cluster, updates the information about nodes 8 to 11 in the accommodated node information held therein from "idle" to "busy" and stores the updated information in the accommodated node information storage unit 22a (see the right side in FIG. 18C).

Also, the accommodated node information updating unit 23c of node 20, which is the lower-layer master node 20 of the sixth sub-cluster, updates the information about node 20 in the accommodated node information held therein from "idle" to "busy" and stores the updated information in the accommodated node information storage unit 22a (see the right side in FIG. 18D).

<Procedure of Process Performed by Original Master Node According to Second Embodiment>

Figure 19:
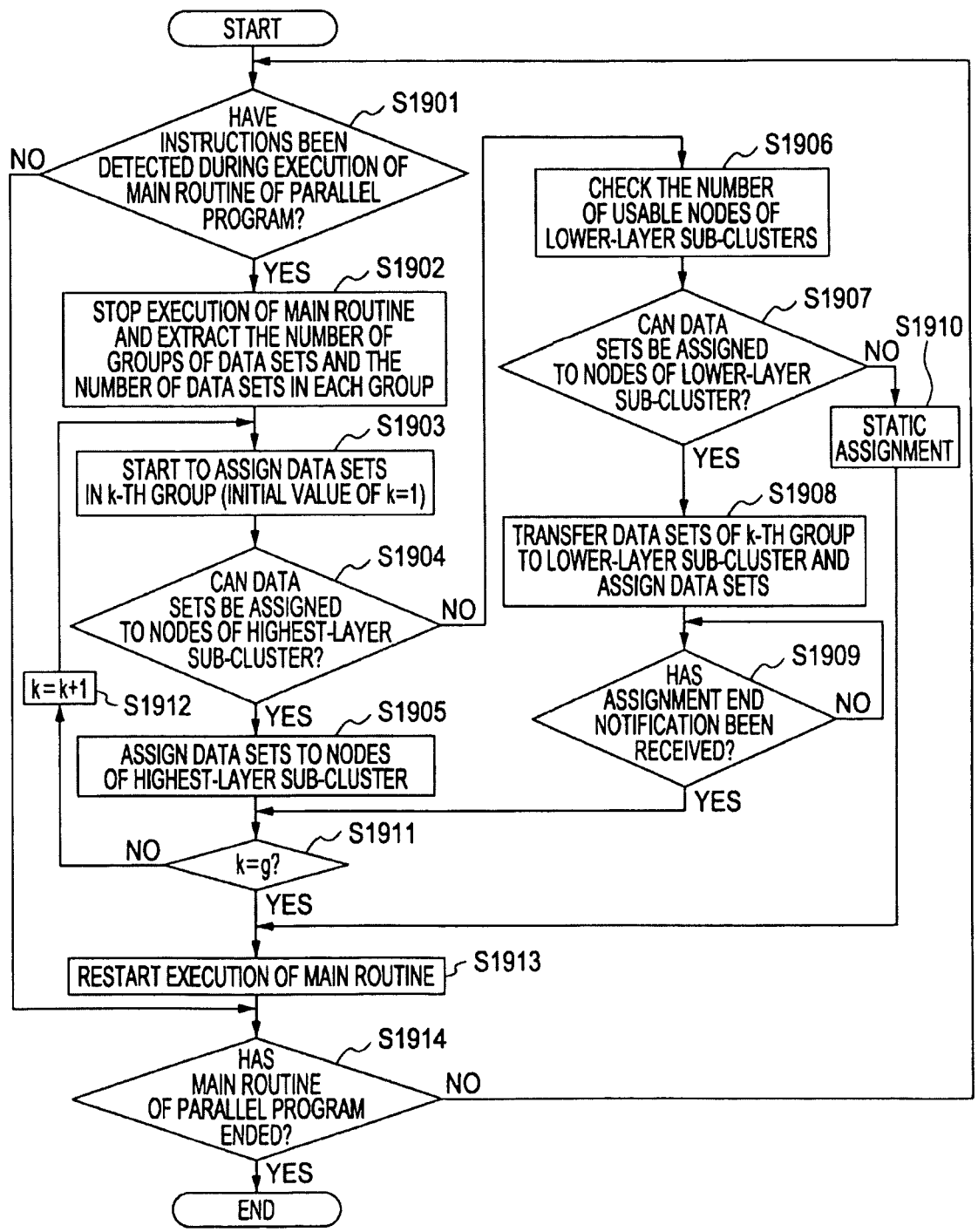
FIG. 19 illustrates a procedure of a process performed by the original master node according to the second embodiment.

Hereinafter, a process performed by the original master node according to the second embodiment is described with reference to FIG. 19. FIG. 19 illustrates a procedure of a process performed by the original master node according to the second embodiment.

When instructions are detected during execution of the main routine of the parallel program (YES in step S1901), the dynamically assigning unit 13b of the original master node 10 according to the second embodiment stops execution of the main routine and extracts the total number of groups of data sets and the number of data sets in each group described in the instructions (step S1902). For example, upon detecting the instructions illustrated in FIG. 16, the dynamically assigning unit 13b stops execution of the main routine and extracts information that the total number of data sets having a uniform size and used in the parallel process is 10 and that the group structure in which data communication is closed includes three groups (g=3), that is, a first group (two data set), a second group (three data sets), and a third group (five data sets).

Then, the dynamically assigning unit 13b starts assignment of the two data sets in the first group (step S1903), and determines whether the two data sets can be assigned to the nodes of the highest-layer (first) sub-cluster (step S1904). That is, the dynamically assigning unit 13b executes command (A) in FIG. 17 and determines whether the data sets can be assigned to the nodes of the highest-layer (first) sub-cluster.

If the dynamically assigning unit 13b determines that the data sets can be assigned to the nodes of the highest-layer (first) sub-cluster (YES in step S1904), the dynamically assigning unit 13b assigns the data sets to the nodes of the highest-layer sub-cluster (step S1905). For example, as illustrated in FIG. 13A, the two data sets in the first group can be assigned to the first sub-cluster, and thus the dynamically assigning unit 13b assigns the data sets to nodes 0 and 1 of the highest-layer sub-cluster (first sub-cluster).

On the other hand, if the dynamically assigning unit 13b determines that the data sets cannot be assigned to the nodes of the highest-layer (first) sub-cluster (NO in step S1904), the dynamically assigning unit 13b checks the number of usable nodes of lower-layer sub-clusters (step S1906).

For example, as illustrated in FIG. 13B, since the three data sets in the second group cannot be assigned to the first sub-cluster, the dynamically assigning unit 13b executes command (B) in FIG. 17 so as to check the number of usable nodes in lower-layer sub-clusters, and detects that the number of usable nodes is 4 both in the second and third sub-clusters. Also, since the five data sets in the third group cannot be assigned to the first sub-cluster, the dynamically assigning unit 13b executes command (B) in FIG. 17 so as to check the number of usable nodes in lower-layer sub-clusters. Furthermore, the dynamically assigning unit 13b instructs the lower-layer master node of the lower-layer sub-cluster to execute command (B) in FIG. 17 and detects that the total number of usable nodes in the third, sixth, and seventh sub-clusters is 12, as illustrated in (3) in FIG. 13C.

If the dynamically assigning unit 13b determines that the data sets can be assigned to the nodes of the lower-layer sub-cluster (YES in step S1907), the dynamically assigning unit 13b transfers the data sets in the group to the lower-layer sub-cluster so that the data sets are assigned therein (step S1908).

For example, since the three data sets in the second group can be assigned to any of the second and third sub-clusters, the dynamically assigning unit 13b executes command (D) in FIG. 17 and transfers the data sets in the second group to the second sub-cluster on the left (see (3) in FIG. 13B). Then, the dynamically assigning unit 13b instructs the lower-layer master node 20 of the second sub-cluster to execute command (C) in FIG. 17 and allows the master node to execute assignment. Also, since the five data sets in the third group can be assigned to the third, sixth, and seventh sub-clusters, the dynamically assigning unit 13b executes command (D) in FIG. 17, transfers the data sets in the third group to the third sub-cluster, and provides instructions to execute command (C) in FIG. 17 so that the four data sets are assigned. Furthermore, the dynamically assigning unit 13b instructs the lower-layer master node 20 of the third sub-cluster to execute command (D) in FIG. 17, allows the master node to transfer the other data set to the sixth sub-cluster, and provides instructions to execute command (C) in FIG. 17 so that the other data set is assigned.

Then, upon receiving an assignment end notification from the lower-layer master node (YES in step S1909), the dynamically assigning unit 13b ends assignment of the data sets in the group.

Then, the dynamically assigning unit 13b determines whether the data sets in all the groups have been assigned (step S1911). If the assignment has not ended (NO in step S1911), the dynamically assigning unit 13b determines to perform the process on the next group (step S1912) and starts assignment of the data sets in the next group (step S1903).

On the other hand, if assignment of the data sets in all the groups has ended (YES in step S1911), execution of the main routine of the parallel program is restarted (step S1913). After the main routine has ended (YES in step S1914), the post-processing in step S1002 in FIG. 10 is executed. If the main routine has not ended (NO in step S1914), the dynamically assigning unit 13b continuously detects instructions (step S1901).

If the dynamically assigning unit 13b determines that the data sets cannot be assigned to the nodes of the lower-layer sub-cluster (NO in step S1907), the dynamically assigning unit 13b assigns the data sets statically (step S1910) and restarts execution of the main routine (step S1913). If no instructions are detected during execution of the main routine of the parallel program (NO in step S1901), the dynamically assigning unit 13b waits until the main routine of the parallel program ends.

<Procedure of Process Performed by Lower-Layer Master Node According to Second Embodiment>

Figure 20:
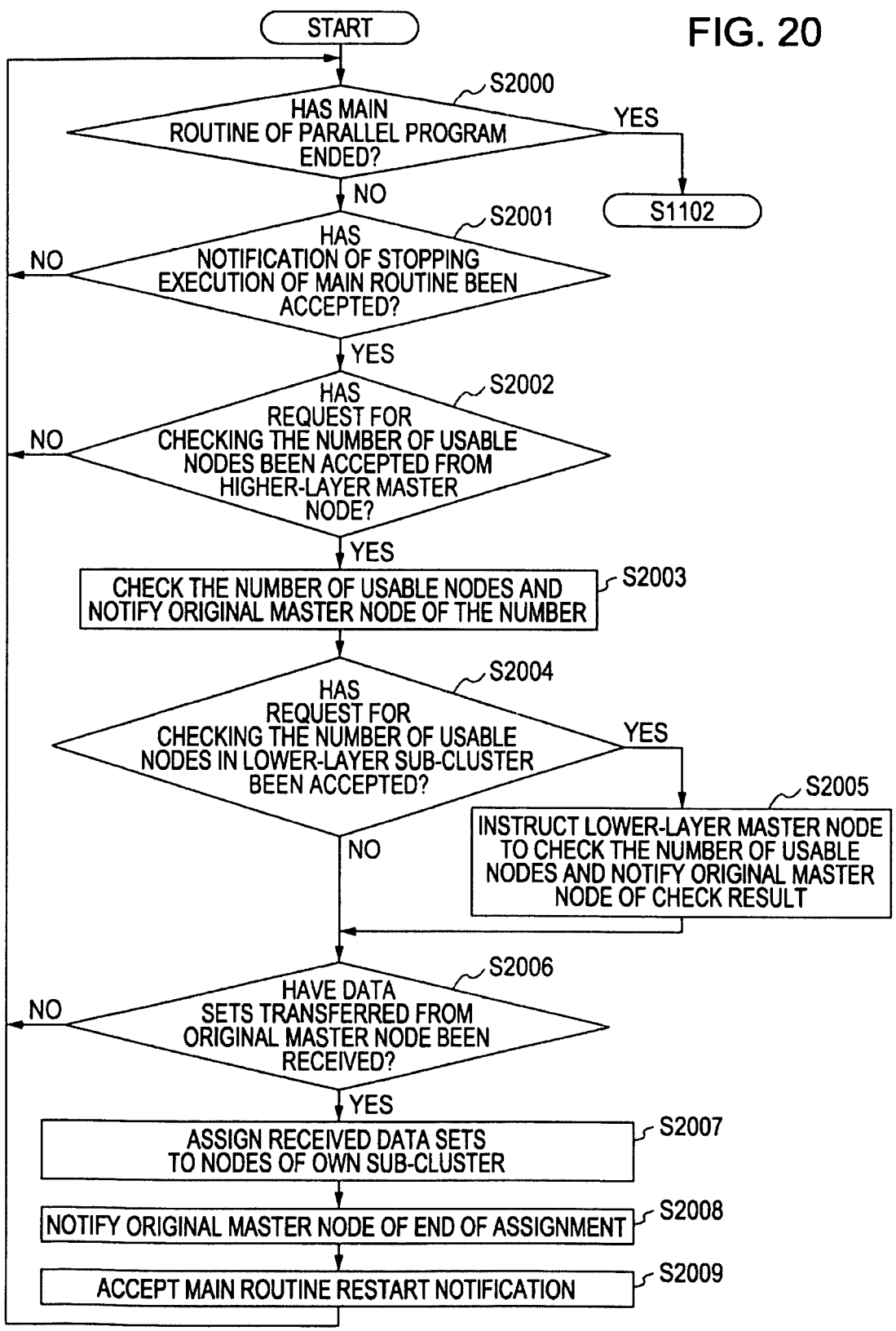
FIG. 20 illustrates a procedure of a process performed by the lower-layer master node according to the second embodiment.

Hereinafter, a process performed by the lower-layer master node according to the second embodiment is described with reference to FIG. 20. FIG. 20 illustrates a procedure of a process performed by the lower-layer master node according to the second embodiment.

First, the lower-layer master node 20 according to the second embodiment determines that the main routine of the parallel program has not ended (NO in step S2000) and accepts a notification of stopping execution of the main routine of the parallel program from the original master node 10 (YES in step S2001). Then, the dynamically assigning unit 23b waits until it accepts a request for checking the number of usable nodes from the master node in a higher layer than the lower-layer master node 20 in which the dynamically assigning unit 23b is included.

If the dynamically assigning unit 23b accepts the request for checking the number of usable nodes from the master node in the higher layer (YES in step S2002), the dynamically assigning unit 23b checks the number of usable nodes (command (A) in FIG. 17) by referring to the accommodated node information stored in the accommodated node information storage unit 22a and notifies the original master node 10 of the number of usable nodes (step S2003). On the other hand, if the dynamically assigning unit 23b does not accept the request for checking the number of usable nodes from the master node in the higher layer (NO in step S2002), the dynamically assigning unit 23b determines whether the main routine of the parallel program has ended (step S2000).

Then, if the dynamically assigning unit 23b accepts a request for checking the number of usable nodes in a lower-layer sub-cluster from the master node in a higher layer than the lower-layer master node 20 in which the dynamically assigning unit 23b is included (YES in step S2004), the dynamically assigning unit 23b instructs the master node of the lower-layer sub-cluster to check the number of usable nodes (command (B) in FIG. 17), notifies the original master node 10 of the check result (step S2005), and waits until accepting the data sets transferred from the original master node 10.

On the other hand, if the dynamically assigning unit 23b does not accept the request for checking the number of usable nodes in a lower-layer sub-cluster from the higher-layer master node (NO in step S2004), the dynamically assigning unit 23b waits until receiving the data sets transferred from the original master node 10.

After receiving the data sets transferred from the original master node 10 (YES in step S2006), the dynamically assigning unit 23b executes command (C) in FIG. 17 in accordance with the instructions from the original master node 10 and assigns the received data sets to the nodes of its own sub-cluster (step S2007).

On the other hand, if the dynamically assigning unit 23b does not receive the data sets transferred from the original master node 10 (NO in step S2006), the dynamically assigning unit 23b determines whether the main routine has ended (step S2000).

Furthermore, the dynamically assigning unit 23b notifies the original master node 10 that the assignment has ended (step S2008) and accepts a main routine restart notification of the parallel program from the original master node 10 (step S2009).

After the main routine of the parallel program has ended (YES in step S2000), the lower-layer master node 20 executes the post-processing in step S1102 illustrated in FIG. 11.

<Advantages of Second Embodiment>

As described above, according to the second embodiment, in a case where the node is set as the original master node 10, when instructions to group the data sets to be used in the parallel process based on a calculation cost and a communication cost are detected in the program to perform the parallel process, the data sets in the same group described in the instructions are assigned to nodes so that the calculation cost and the communication cost can be saved. Therefore, the data sets grouped based on the calculation cost and the communication cost can be assigned to the nodes of the first sub-cluster in the highest layer, so that the parallel process can be performed efficiently.

Also, according to the second embodiment, the data sets in the same group are assigned to the nodes of the same sub-cluster by referring to the master node connection information. Thus, the data sets grouped based on the calculation cost and the communication cost can be assigned to the nodes of the same sub-cluster, so that the parallel process can be efficiently performed.

According to the second embodiment, if not all the data sets in the same group can be assigned to the nodes of the same sub-cluster, the data set that cannot be assigned is assigned to one of the nodes of lower-layer sub-clusters. Thus, the data set that cannot be assigned to a node of the same sub-cluster can be assigned to a node of a lower-layer sub-cluster without excessive communication cost, so that the parallel process can be efficiently performed.

<Third Embodiment>

In the above-described second embodiment, data sets are assigned based on grouping described in instructions. On the other hand, in the third embodiment, data sets are assigned by further referring to a calculation cost of each node described in the accommodated node information held in the original master node and lower-layer master nodes.

<Overview and Feature of Node According to Third Embodiment>

Figure 21A:
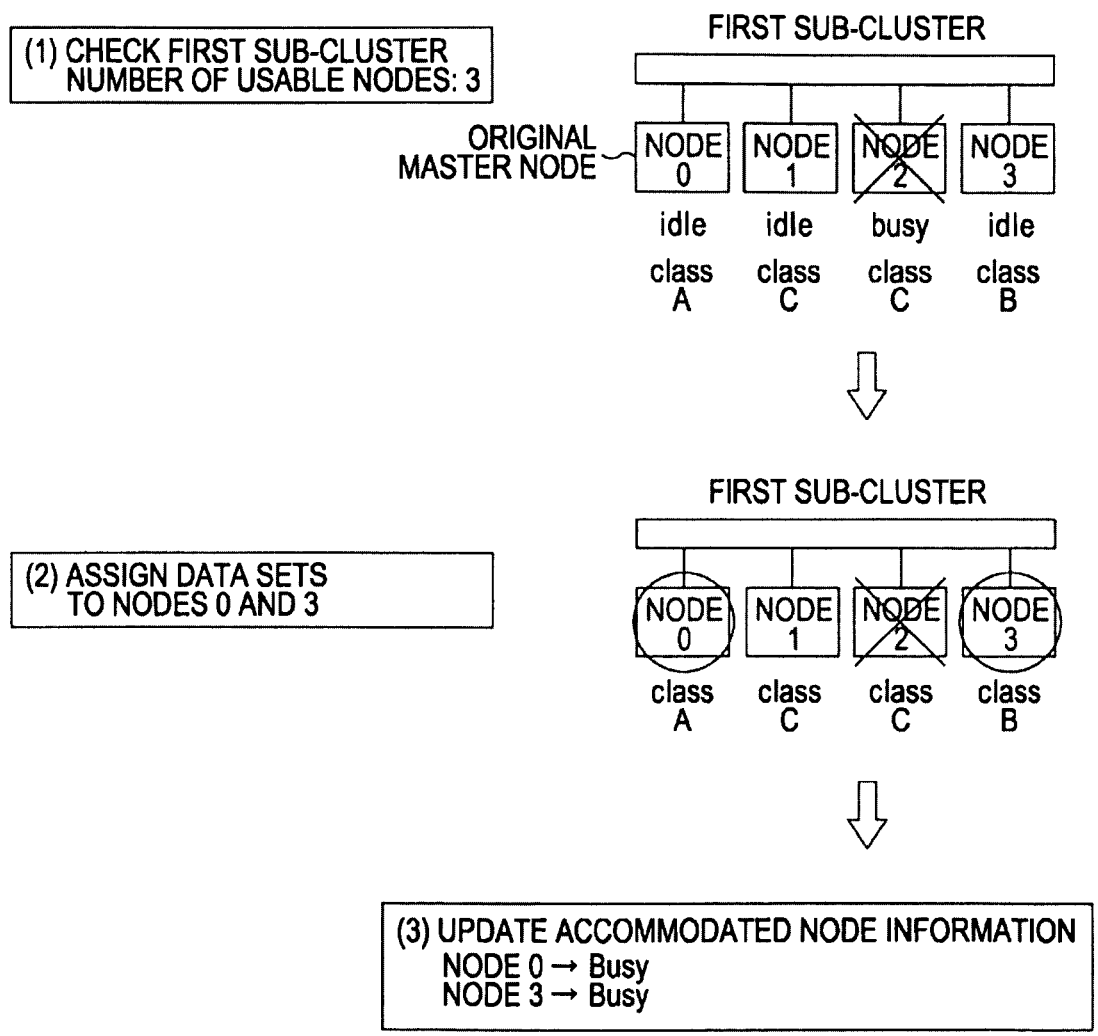
FIGS. 21A, 21B, and 21C illustrate an overview and a feature of a node according to a third embodiment.
Figure 21B:
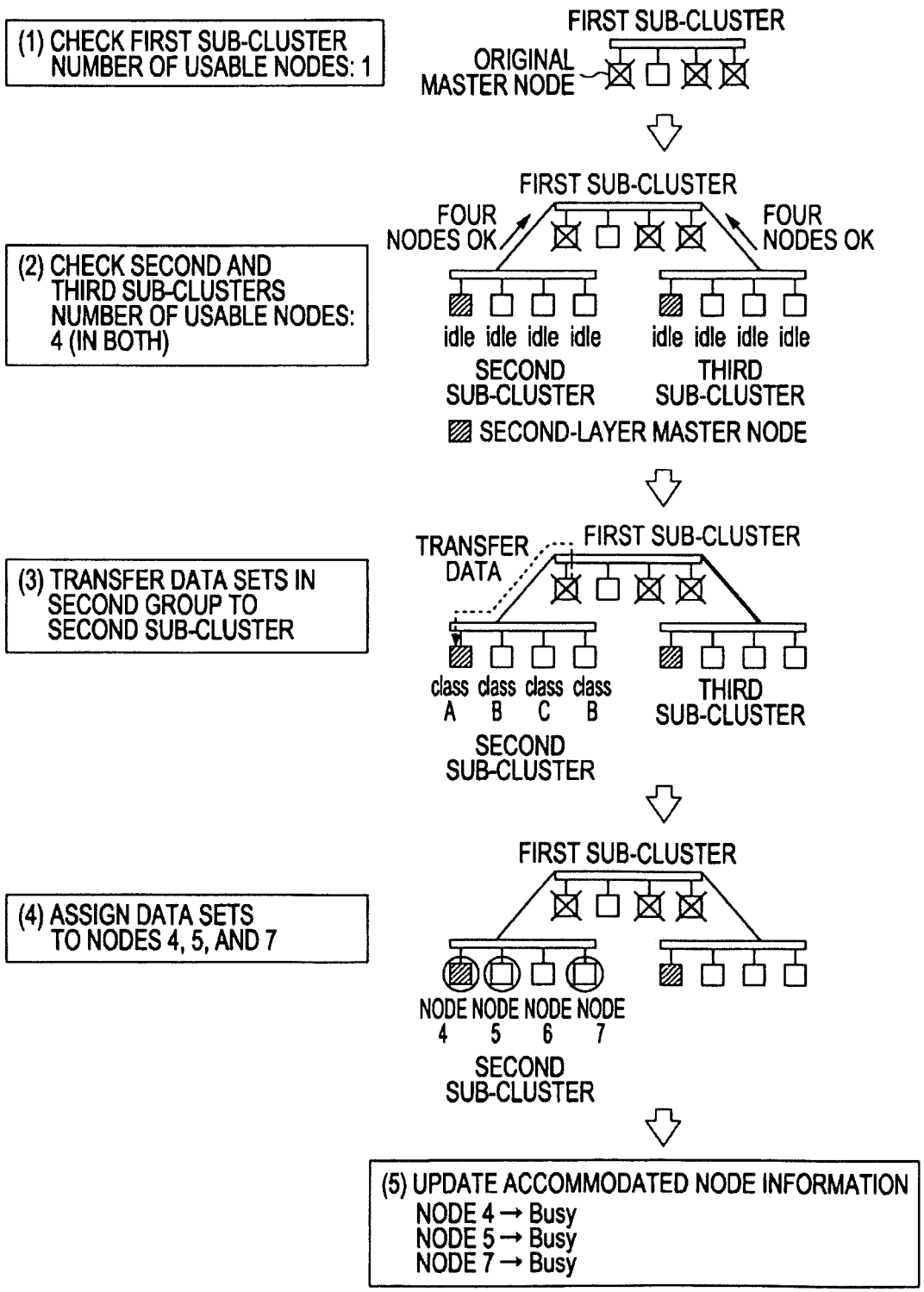
Figure 21C:
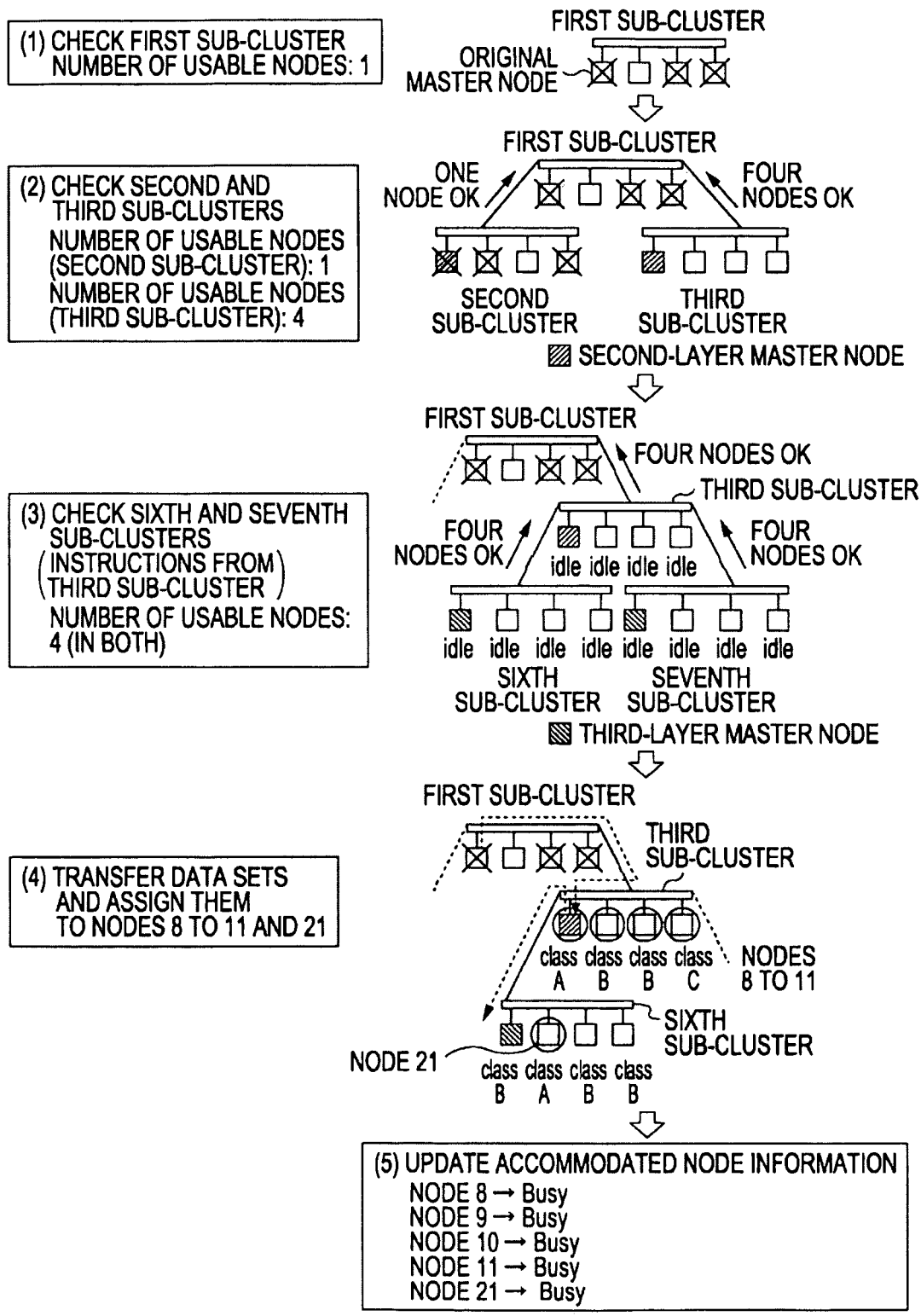

First, a main feature of the node according to the third embodiment is described in detail with reference to FIGS. 21A to 21C. FIGS. 21A to 21C illustrate an overview and a feature of the node according to the third embodiment.

Each master node according to the third embodiment further holds calculation costs of all the nodes accommodated in the sub-cluster. For example, as illustrated in FIG. 21A, node 0, which is the original master node of the first sub-cluster in the highest layer holds the accommodated node information including information of usable (idle) or unusable (busy) indicating a usage status and classification information determined based on the calculation costs in nodes 0 to 3, that is, node 0: Class A, node 1: Class C, node 2: Class C, and node 3: Class B. In this embodiment, the calculation cost is better in the order of Class A, Class B, and Class C.

In this embodiment, the data sets used in the parallel process are the same as those in the second embodiment. At the time when instructions are detected, only node 2 of the first sub-cluster is unusable (busy) and the other nodes are usable (idle), as in the second embodiment.

The original master node (node 0) according to the third embodiment assigns data sets in the same group by further referring to the classification information determined based on the calculation costs indicated in the accommodated node information.

That is, as in the second embodiment, when the original master node (node 0) according to the third embodiment detects instructions described about the ten data sets illustrated in FIG. 16 during execution of the main routine of the parallel program, the original master node stops execution of the main routine of the parallel program, extracts information described in the instructions, and assigns the data sets in the first group (two data sets A and B). At that time, the original master node checks the first sub-cluster by referring to the accommodated node information held therein, detects that the number of usable nodes is 3 (see (1) in FIG. 21A), and determines that all the data sets in the first group can be assigned to the first sub-cluster. Note that, in the third embodiment, the original master node assigns the data sets to nodes 0 and 3 by further referring to the classification determined based on the calculation cost of each node (see (2) in FIG. 21A). Then, the original node updates the information about nodes and 3 in the accommodated node information held therein from "idle" to "busy" (see (3) in FIG. 21A).

As illustrated in FIG. 21B, before assigning the data sets in the second group (three data sets C, D, and E), the original master node (node 0) according to the third embodiment checks the first sub-cluster by referring to the accommodated node information held therein, detects that the number of usable nodes is 1 (see (1) in FIG. 21B), and determines that the data sets in the second group cannot be assigned to the first sub-cluster. Then, the original master node allows nodes 4 and 8, which are lower-layer master nodes, to check the second and third sub-clusters by referring to the master node connection information, and detects that the number of usable nodes is 4 in the both sub-clusters (see (2) in FIG. 21B).

Since the original master node (node 0) according to the third embodiment can assign the data sets in the second group to any of the second and third sub-clusters, the original master node transfers the data sets in the second group to the second sub-cluster on the left (see (3) in FIG. 21B) and assigns the data sets thereto. Note that, unlike in the second embodiment, the original master node assigns the data sets to nodes 4, 5, and 7 by referring to the classification of the calculation cost held by node 4, which is the lower-layer master node of the second sub-cluster (see (4) in FIG. 21B). Then, node 4, which is the master node of the second sub-cluster, updates the information about nodes 4, 5, and 7 in the accommodated node information held therein from "idle" to "busy" (see (5) in FIG. 21B).

Also, as illustrated in FIG. 21C, before assigning the data sets in the third group (five data sets F, G, H, I, and J), the original master node (node 0) according to the third embodiment checks the first sub-cluster by referring to the accommodated node information held therein, detects that the number of usable nodes is 1 (see (1) in FIG. 21C), and determines that the data sets in the third group cannot be assigned to the first sub-cluster. Then, the original master node allows nodes 4 and 8, which are lower-layer master nodes, to check the second and third sub-clusters by referring to the master node connection information, and detects that the number of usable nodes is 1 and 4 in the second and third sub-clusters (see (2) in FIG. 21C). Furthermore, the original master node (node 0) according to the third embodiment allows node 8 of the third sub-cluster, having many usable nodes, to instruct nodes 20 and 24 in the lower-layer sub-clusters to check the number of usable nodes in the sixth and seventh sub-clusters. Accordingly, the original master node detects that the number of usable nodes in the respective sub-clusters is 4 (see (3) in FIG. 21C).

Here, the total number of usable nodes in the third sub-cluster and the lower-layer sub-clusters below the third sub-cluster is 12, so that the original master node (node 0) according to the third embodiment determines that the data sets in the third group can be assigned thereto. However, only four of the five data sets can be assigned to the third sub-cluster, and thus the other data set is assigned to one of the nodes of the sub-clusters below the third sub-cluster.

At this time, the original master node (node 0) according to the third embodiment determines that the other data set is to be assigned to the sixth sub-cluster on the left among the lower-layer sub-clusters, transfers the data sets in the third group to the third and sixth sub-clusters, and assigns the data sets thereto (see (4) in FIG. 21C). As in the second embodiment, the four data sets are assigned to nodes 8 to 11 of the third sub-cluster. In the sixth sub-cluster, however, the other data set is assigned to node 21 with reference to the classification of the calculation costs held by node 20 serving as a master node, unlike in the second embodiment (see (4) in FIG. 21C). Then, node 8, which is the master node of the third sub-cluster, updates the information about nodes 8 to 11 in the accommodated node information held therein from "idle" to "busy". Also, node 20, which is the master node of the sixth sub-cluster, updates the information about node 21 in the accommodated node information held therein from "idle" to "busy" (see (5) in FIG. 21C).

In this embodiment, assignment is performed by further referring to the classification determined based on calculation costs. However, the present invention is not limited to this. Alternatively, assignment can be performed by further referring to classification determined based on communication costs or classifications determined based on both calculation costs and communication costs.

In this way, according to the node in the third embodiment, data sets classified based on calculation costs can be assigned to nodes of better calculation cost in a sub-cluster, so that the parallel process can be performed efficiently.

<Configuration of Original Master Node According to Third Embodiment>

Figure 23A:
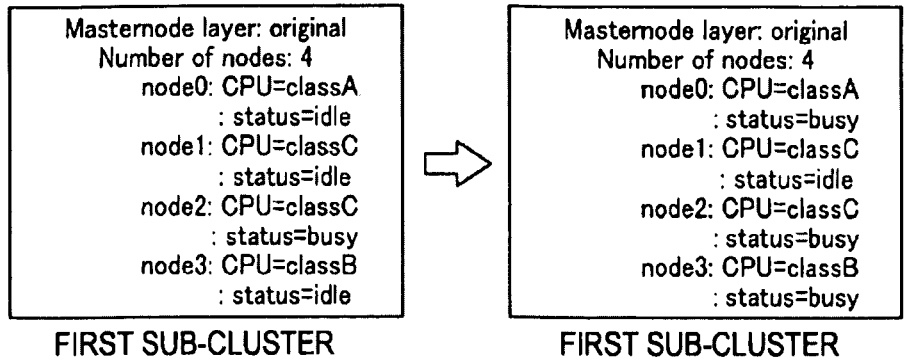
FIGS. 23A, 23B, 23C, and 23D illustrate an accommodated node information storage unit according to the third embodiment.

Next, the original master node according to the third embodiment is described with reference to FIGS. 14, 22, and 23A. FIG. 14 is a block diagram illustrating a configuration of the original master node according to the second embodiment, FIG. 22 illustrates a dynamically assigning unit according to the third embodiment, and FIG. 23A illustrate an accommodated node information storage unit according to the third embodiment.

As illustrated in FIG. 14, the original master node 10 according to the third embodiment is basically the same as the original master node 10 according to the second embodiment. However, the information stored in the accommodated node information storage unit 12*b* and the process performed by the dynamically assigning unit 13*b* are different. Hereinafter, descriptions are given mainly about those different points.

The accommodated node information storage unit 12*b* holds information to uniquely identify the master node and all the slave nodes controlled by the master node accommodated in the highest-layer sub-cluster and further holds classification information determined based on the calculation costs of all the nodes. More specifically, as illustrated on the left side in FIG. 23A, the accommodated node information storage unit 12*b* holds classification information determined based on the calculation costs of four nodes: node 0, set as the original master node 10 of the first sub-cluster (the sub-cluster in the highest layer of the tree structure) and slave nodes (nodes 1 to 3) controlled by node 0 (node 0: Class A, node 1: Class C, node 2: Class C, and node 3: Class B). In FIG. 23A, illustration of IP addresses is omitted.

The dynamically assigning unit 13*b* assigns the data sets in the same group by further referring to the classification information determined based on the calculation costs indicated in the accommodated node information. More specifically, the dynamically assigning unit 13*b* according to the third embodiment further executes command (E) illustrated in FIG. 22 before assigning the data sets, detects the classification information determined based on the calculation costs stored in the accommodated node information storage unit 12*b*, and further executes command (C) in FIG. 22 by referring to the classification information so as to assign the data sets (see (2) in FIG. 21A).

Also, when allowing the lower-layer master node 20 of a lower-layer sub-cluster to execute command (B) in FIG. 22, the dynamically assigning unit 13*b* instructs the lower-layer master node 20 to execute command (E) in FIG. 22, and provides instructions about assignment based on the detected classification information determined based on the calculation costs (see (4) in FIG. 21B).

Also, when instructing the lower-layer master node 20 of the lower-layer sub-cluster to allow the lower-layer master node 20 of a further lower-layer sub-cluster to execute command (B) in FIG. 22, the dynamically assigning unit 13*b* instructs the lower-layer master node 20 to execute command (E) in FIG. 22, and provides instructions about assignment based on the detected classification information determined based on the calculation costs (see (4) in FIG. 21C).

The accommodated node information updating unit 13*c* updates the usage status of the nodes that has been changed by the dynamically assigning unit 13*b*. That is, the accommodated node information updating unit 13*c* updates the usage status of nodes 0 and 3 from "idle" to "busy" and stores the updated information in the accommodated node information storage unit 12*b* (see the right side in FIG. 23A).

<Configuration of Lower-Layer Master Node According to the Third Embodiment>

Figure 23B:
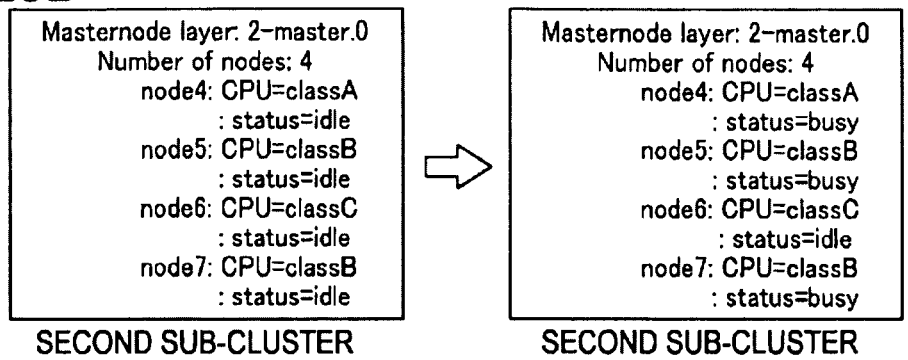
Figure 23C:
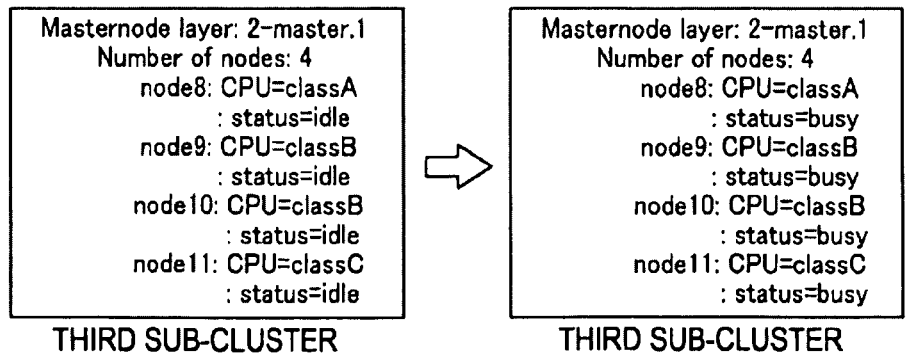
Figure 23D:
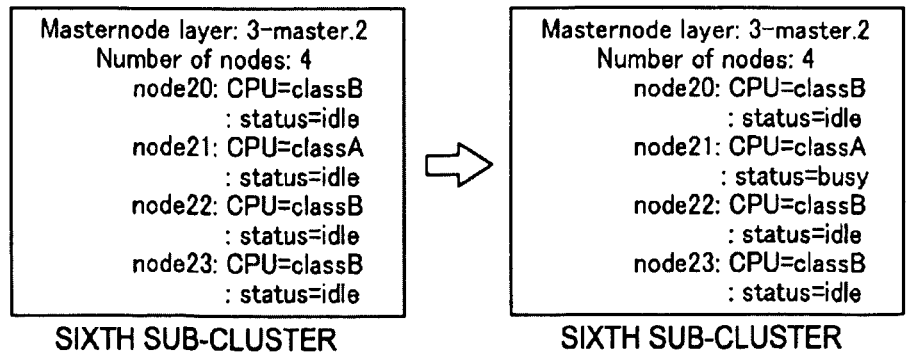

Next, the lower-layer master node according to the third embodiment is described with reference to FIGS. 15, 22, and 23B to 23D. FIG. 15 is a block diagram illustrating the configuration of the lower-layer master node according to the second embodiment, FIG. 22 illustrates the dynamically assigning command according to the third embodiment, and FIGS. 23B to 23D illustrate the accommodated node information storage unit according to the third embodiment.

As illustrated in FIG. 15, the lower-layer master node 20 according to the third embodiment is basically the same as the lower-layer master node 20 according to the second embodiment. However, the information stored in the accommodated node information storage unit 22*a* and the process performed by the dynamically assigning unit 23*b* are different. Hereinafter, descriptions are given mainly about those different points.

The accommodated node information storage unit 22*a* holds information to uniquely identify the lower-layer master node 20 and all the slave nodes controlled by the lower-layer master node 20 accommodated in each lower-layer sub-cluster, and further holds calculation costs of all the nodes. For example, as illustrated on the left side in FIG. 23B, the accommodated node information storage unit 22*a* of node 4, which is the lower-layer master node 20 of the second sub-cluster, holds classification information determined based on the calculation costs of four nodes: node 4 set as the lower-layer master node 20 and slave nodes 5 to 7 controlled by node 4

(node 4: Class A, node 5: Class B, node 6: Class C, and node 7: Class B). In FIGS. 23B to 23D, illustration of IP addresses is omitted.

As in the second embodiment, the dynamically assigning unit 23b executes various processes based on instructions from the original master node 10. However, unlike in the second embodiment, the dynamically assigning unit 23b detects classification based on the calculation costs of the nodes accommodated in their own sub-cluster and notifies the original master node 10 of the classification. That is, the dynamically assigning unit 23b according to the third embodiment executes command (E) in FIG. 22 based on the instructions from the original master node 10, detects classification based on the calculation costs of the nodes accommodated in their own sub-cluster, and notifies the original master node 10 of the classification.

The accommodated node information updating unit 23c updates the usage status of the nodes changed by the dynamically assigning unit 23b. For example, the accommodated node information updating unit 23c of node 4, which is the lower-layer master node 20 of the second sub-cluster, updates the information about nodes 4, 5, and 7 in the accommodated node information held therein from "idle" to "busy" and stores the updated information in the accommodated node information storage unit 22a (see the right side in FIG. 23B).

Also, the accommodated node information updating unit 23c of node 8, which is the lower-layer master node 20 of the third sub-cluster, updates the information about nodes 8 to 11 in the accommodated node information held therein from "idle" to "busy" and stores the updated information in the accommodated node information storage unit 22a (see the right side in FIG. 23C).

Also, the accommodated node information updating unit 23c of node 20, which is the lower-layer master node 20 of the sixth sub-cluster, updates the information about node 21 in the accommodated node information held therein from "idle" to "busy" and stores the updated information in the accommodated node information storage unit 22a (see the right side in FIG. 23D).

<Procedure of Process Performed by Original Master Node According to Third Embodiment>

Next, a process performed by the original master node according to the third embodiment is described with reference to FIG. 19. FIG. 19 illustrates the procedure of the process performed by the original master node according to the second embodiment.

The procedure of the process performed by the original master node 10 according to the third embodiment is basically the same as that in the second embodiment. However, steps S1905 and S1908 are different. Hereinafter, descriptions are given mainly about the different point.

If the dynamically assigning unit 13b determines that the data sets can be assigned to the nodes of the highest-layer (first) sub-cluster (YES in step S1904), the dynamically assigning unit 13b assigns the data sets to the nodes of the highest-layer sub-cluster (step S1905). At that time, the dynamically assigning unit 13b assigns the data sets by detecting the classification based on the calculation costs of the nodes held in the accommodated node information and referring to the detected classification.

If the dynamically assigning unit 13b determines that the data sets can be assigned to the nodes of the lower-layer sub-cluster (YES in step S1907), the dynamically assigning unit 13b transfers the data sets in the group to the lower-layer sub-cluster and allows assignment of the data sets to be executed (step S1908). At that time, the dynamically assigning unit 13b allows execution of assignment of the data sets by detecting the classification based on the calculation costs of the nodes held in the accommodated node information of the lower-layer sub-cluster and referring to the detected classification.

<Procedure of Process Performed by Lower-Layer Master Node According to Third Embodiment>

Next, a process performed by the lower-layer master node according to the third embodiment is described with reference to FIG. 20. FIG. 20 illustrates the procedure of the process performed by the lower-layer master node according to the second embodiment.

The procedure of the process performed by the lower-layer master node 20 according to the third embodiment is basically the same as that in the second embodiment. However, steps S2003 and S2005 are different. Hereinafter, descriptions are given mainly about the different point.

If the dynamically assigning unit 23b accepts a request for checking the number of usable nodes from a master node in a higher layer than the lower-layer master node 20 including the dynamically assigning unit 23b (YES in step S2002), the dynamically assigning unit 23b checks the number of usable nodes by referring to the accommodated node information stored in the accommodated node information storage unit 22a (command (A) in FIG. 17) and notifies the original master node 10 of the number of usable nodes (step S2003). At that time, the dynamically assigning unit 23b executes command (E) in FIG. 22 in accordance with instructions from the original master node 10, detects the classification based on the calculation costs of the nodes stored in the accommodated node information storage unit 22a, and notifies the original master node 10 of the detected classification information.

If the dynamically assigning unit 23b accepts a request for checking the number of usable nodes in a lower-layer sub-cluster from the higher-layer master node (YES in step S2004), the dynamically assigning unit 23b instructs the lower-layer master node 20 of the lower-layer sub-cluster to check the number of usable node (command (B) in FIG. 17) and notifies the original master node 10 of a check result (step S2005). At that time, the original master node 10 provides instructions to execute command (E) in FIG. 22 also to the lower-layer master node 20 of the lower-layer sub-cluster. Thus, the original master node 10 is notified of the classification information based on the calculation costs of the nodes stored in the accommodated node information storage unit 22a of the lower-layer master node 20 of the lower-layer sub-cluster.

<Advantages of Third Embodiment>

As described above, according to the third embodiment, classification information based on the calculation costs of all the nodes accommodated in each sub-cluster is further held. The original master node 10 assigns data sets in the same group by further referring to the classification information based on the calculation costs of each sub-cluster. Thus, the data sets that are classified based on a calculation cost and/or a communication cost can be assigned to nodes having a better calculation cost in the sub-cluster, so that the parallel process can be efficiently performed.

<Fourth Embodiment>

In the above-described third embodiment, data sets are assigned by further referring to the calculation cost of each node indicated in the accommodated node information held in the original master node and each of the lower-layer master nodes. In the fourth embodiment, data sets are assigned by further referring to communication performance between sub-clusters indicated in the master node connection information of the original master node.

<Overview and Feature of Node According to Fourth Embodiment>

Figure 24A:
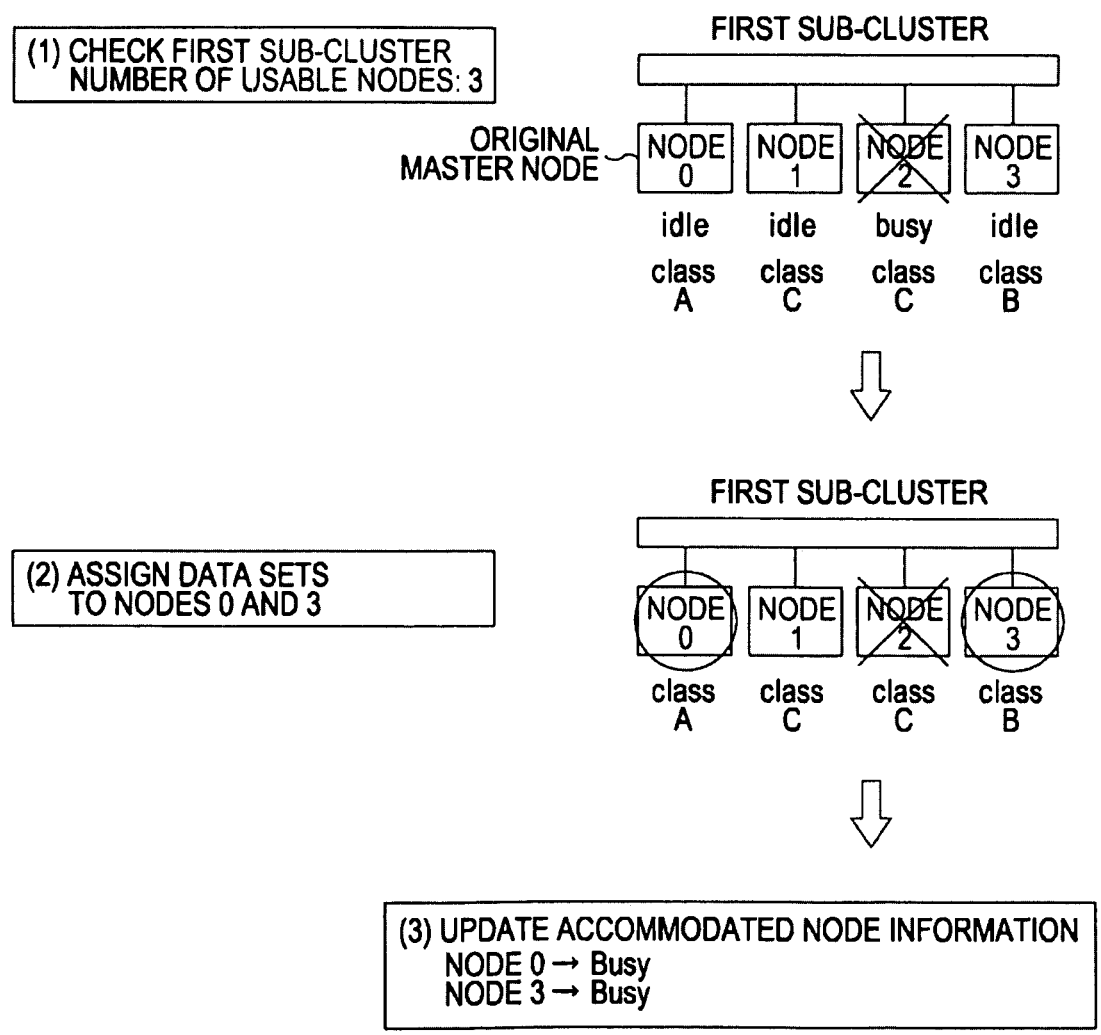
FIGS. 24A, 24B, and 24C illustrate an overview and a feature of a node according to a fourth embodiment.
Figure 24B:
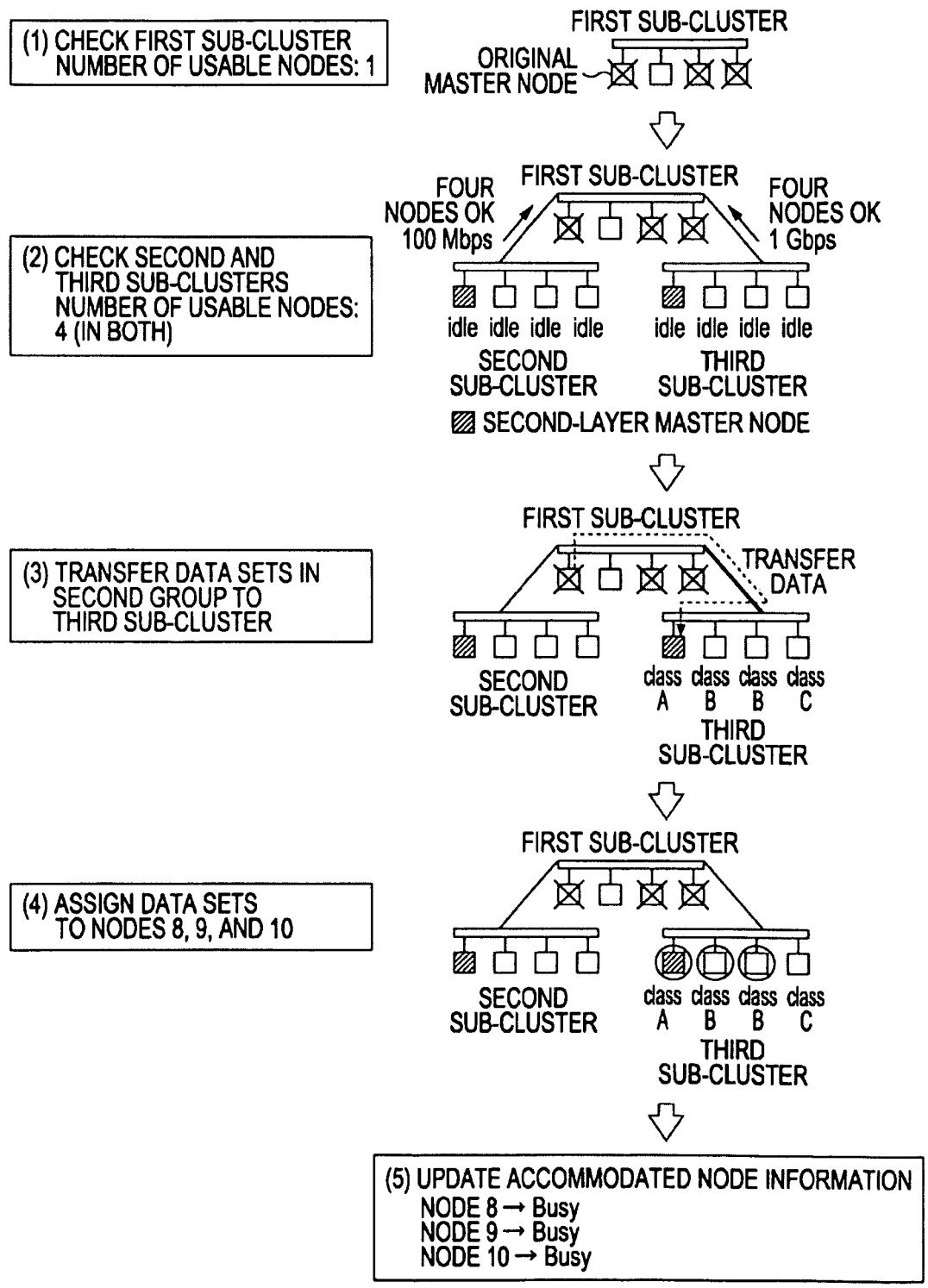
Figure 24C:
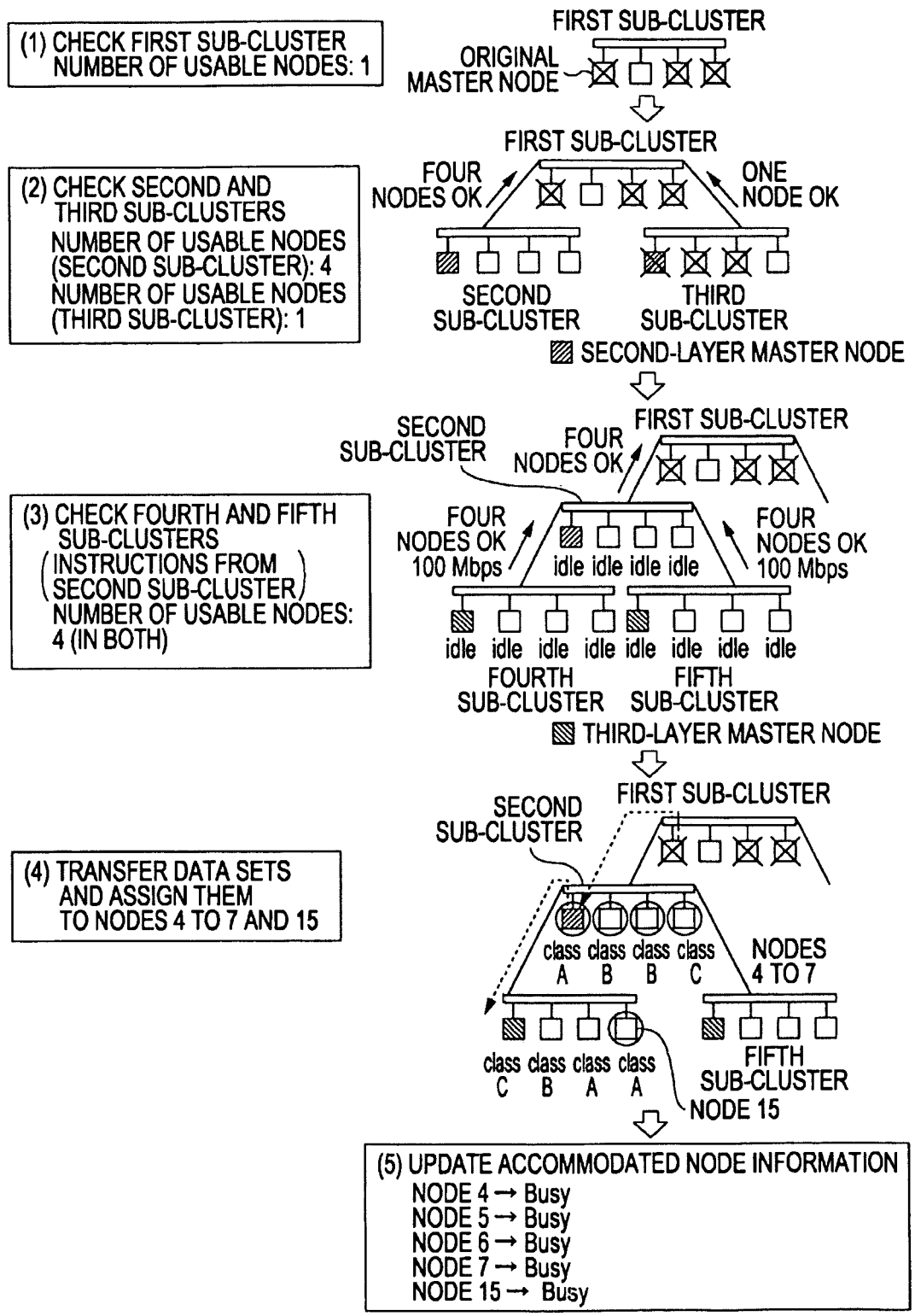

First, a main feature of the node according to the fourth embodiment is described with reference to FIGS. 24A to 24C. FIGS. 24A to 24C illustrate an overview and a feature of the node according to the fourth embodiment.

The original master node according to the fourth embodiment further holds communication performance between respective sub-clusters as the master node connection information, which is information about the connection between the original master node and the lower-layer master nodes set in the lower-layer sub-clusters. For example, as illustrated in FIG. 24B, the original master node further holds information indicating that the communication performance between the first and second sub-clusters is 100 Mbps and that the communication performance between the first and third sub-clusters is 1 Gbps. In this embodiment, the communication performance between sub-clusters is 100 Mbps, except between the first and third sub-clusters.

In this embodiment, the data sets used in the parallel process are the same as those in the second embodiment. As in the second embodiment, only node 2 of the first sub-cluster is unusable (busy) and the other nodes are usable (idle) at the time when instructions are detected. Also, as in the third embodiment, each of the master nodes further holds classification information based on the calculation costs of all the nodes accommodated in the sub-cluster as the accommodated node information.

As in the second embodiment, upon detecting the instructions describing the ten data sets illustrated in FIG. 16 during execution of the main routine of the parallel program, the original master node (node 0) according to the fourth embodiment stops execution of the main routine of the parallel program, extracts information described in the instructions, and assigns the data sets in the first group (two data sets A and B). The procedure of the assignment illustrated in (1) to (3) in FIG. 24A is the same as that illustrated in (1) to (3) in FIG. 21A, and thus the corresponding description is omitted.

The original master node according to the fourth embodiment assigns data sets in the same group by further referring to the communication performance between the respective sub-clusters.

More specifically, as illustrated in FIG. 24B, before assigning the data sets in the second group (three data sets C, D, and E), the original master node (node 0) according to the fourth embodiment checks the first sub-cluster by referring to the accommodated node information held therein, detects that the number of usable nodes is 1 (see (1) in FIG. 24B), and determines that the data sets cannot be assigned to the first sub-cluster. Then, the original master node allows nodes 4 and 8, which are lower-layer master nodes, to check the second and third sub-clusters by referring to the master node connection information, and detects that the number of usable nodes is 4 in each of the sub-clusters (see (2) in FIG. 24B).

Unlike in the second and third embodiments, the original master node (node 0) according to the fourth embodiment refers to the communication performance, transfers the data sets in the second group to the third sub-cluster, which has a communication performance of 1 Gbps (see (3) in FIG. 24B), and assigns the data sets. At that time, as in the third embodiment, the original master node assigns the data sets to nodes 8, 9, and 10 by referring to the classification of the calculation cost held by node 8, which is the lower-layer master node of the third sub-cluster (see (4) in FIG. 24B). Then, node 8, which is the master node of the third sub-cluster, updates the information about nodes 8, 9, and 10 in the accommodated node information held therein from "idle" to "busy" (see (5) in FIG. 24B).

As illustrated in FIG. 24C, before assigning the data sets in the third group (five data sets F, G, H, I, and J), the original master node (node 0) according to the fourth embodiment checks the first sub-cluster by referring to the accommodated node information held therein, detects that the number of usable nodes is 1 (see (1) in FIG. 24C), and determines that the data sets in the third group cannot be assigned to the first sub-cluster. Then, the original master node allows nodes 4 and 8, which are lower-layer master nodes, to check the second and third sub-clusters by referring to the master node connection information, and detects that the number of usable nodes is 4 and 1 in the respective sub-clusters (see (2) in FIG. 24C). Furthermore, the original master node (node 0) according to the fourth embodiment allows node 4 of the second sub-cluster having many usable nodes to instruct nodes 12 and 16 as lower-layer master nodes to check the number of usable nodes in the fourth and fifth sub-clusters, and detects that the number of usable nodes is 4 in each of the sub-clusters (see (3) in FIG. 24C).

Here, the original master node (node 0) according to the fourth embodiment determines that the total number of usable nodes in the second sub-cluster and the lower-layer sub-clusters controlled by the second sub-cluster is 12 and that the data sets in the third group can be assigned thereto. However, only four of the five data sets can be assigned to the second sub-cluster, and thus the other data set is assigned to one of the nodes of the sub-clusters below the second sub-cluster.

At this time, the original master node (node 0) according to the fourth embodiment refers to the master node connection information. Since the communication performance between the second and fourth sub-clusters and that between the second and fifth sub-clusters are the same, that is, 100 Mbps, the original master node determines that the other data set is to be assigned to the fourth sub-cluster on the left, transfers the data sets in the third group to the second and fourth sub-clusters, and assigns the data sets thereto (see (4) in FIG. 24C). The original master node assigns the four data sets to nodes 4 to 7 of the second sub-cluster. In the fourth sub-cluster, the original master node assigns the other data set to node 15 by referring to the classification of the calculation costs held in node 12, which is the lower-layer master node of the sub-cluster, as in the third embodiment (see (4) in FIG. 24C). Then, node 4, which is the lower-layer master node of the second sub-cluster, updates the information about nodes 4 to 7 in the accommodated node information held therein from "idle" to "busy". Likewise, node 12, which is the lower-layer master node of the fourth sub-cluster, updates the information about node 15 in the accommodated node information held therein from "idle" to "busy" (see (5) in FIG. 24C).

In this way, the node according to the fourth embodiment can assign the data set that cannot be assigned to a node of the same sub-cluster to a node of a lower-layer sub-cluster without excessive communication cost. Accordingly, the parallel process can be efficiently performed.

<Configuration of Original Master Node According to Fourth Embodiment>

Figure 25:
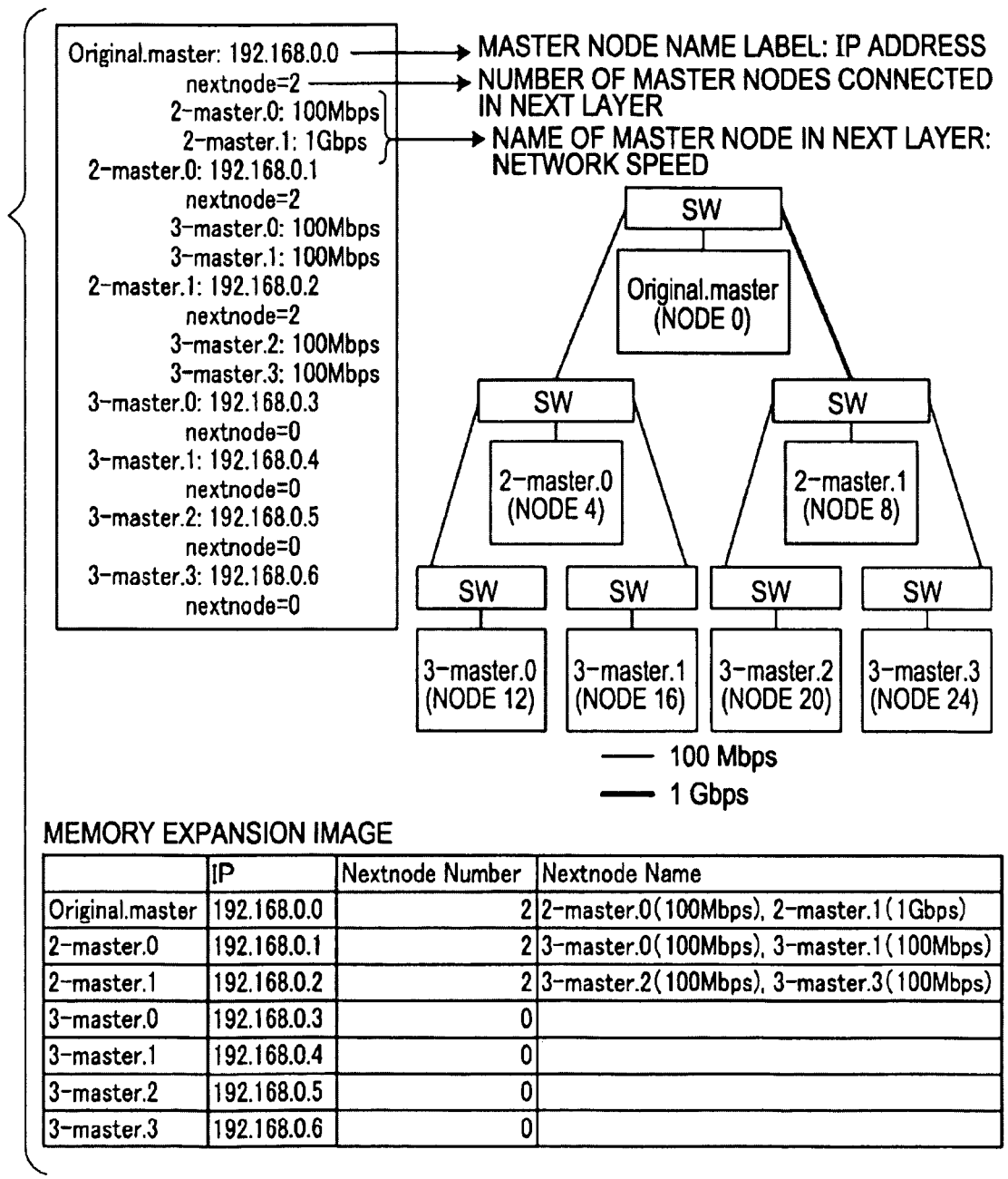
FIG. 25 illustrates a master node connection information storage unit according to the fourth embodiment.
Figure 27A:
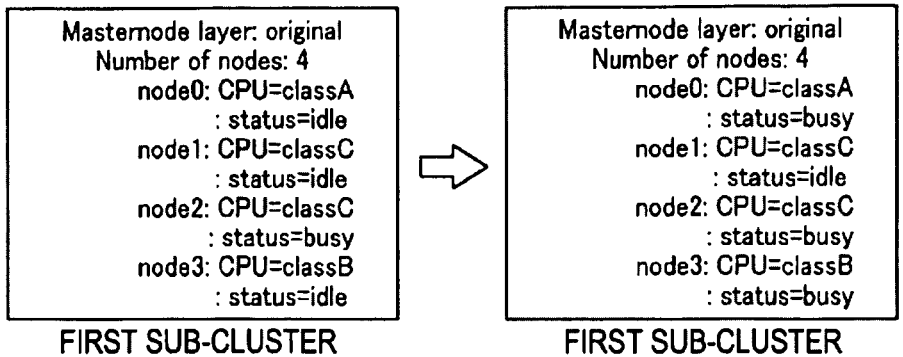
FIGS. 27A, 27B, 27C, and 27D illustrate an accommodated node information storage unit according to the fourth embodiment.

Next, the original master node according to the fourth embodiment is described with reference to FIGS. 14, 25, 26, and 27A. FIG. 14 is a block diagram illustrating the configuration of the original master node according to the second embodiment, FIG. 25 illustrates the master node connection information storage unit according to the fourth embodiment, FIG. 26 illustrates the dynamically assigning command according to the fourth embodiment, and FIG. 27A illustrate the accommodated node information storage unit according to the fourth embodiment.

As illustrated in FIG. 14, the original master node 10 according to the fourth embodiment is basically the same as the original master node according to the second and third embodiments. However, the information stored in the master node connection information storage unit 12a and the process performed by the dynamically assigning unit 13b are different from those in the third embodiment. Hereinafter, descriptions are given mainly about the different point.

The master node connection information storage unit 12a further holds the communication performance between the respective sub-clusters as the master node connection information, which is information about the connection between the original master node 10 and the lower-layer master nodes 20 set in the lower-layer sub-clusters. For example, as illustrated in FIG. 25, the information indicating that the communication performance between the first and third sub-clusters is 1 Gbps and that the communication performance between the other sub-clusters is 100 Mbps is held in addition to the information illustrated in FIG. 5. As illustrated in FIG. 25, the communication performance is 100 Mbps except between the first and third sub-clusters.

The dynamically assigning unit 13b assigns the data sets in the same group by further referring to the communication performance between the respective sub-clusters stored in the master node connection information storage unit 12a. That is, the dynamically assigning unit 13b executes command (F) in FIG. 26 and detects the communication performance between the respective sub-clusters before assigning the data sets, and then assigns the data sets to the lower-layer sub-cluster connected via a network of a better communication performance in accordance with the detected information. For example, as illustrated in FIG. 24B, when the data sets in the second group are to be assigned, the dynamically assigning unit 13b transfers the data sets to the third sub-cluster having a communication performance of 1 Gbps, not to the second sub-cluster having a communication performance of 100 Mbps, and assigns the data sets thereto (see (3) in FIG. 24B).

The dynamically assigning unit 13b executes commands (A) to (E) illustrated in FIG. 26. These commands are the same as those executed by the dynamically assigning unit 13b according to the third embodiment ((A) to (E) illustrated in FIG. 22), and thus the corresponding description is omitted.

The accommodated node information updating unit 13c updates the usage status of the nodes changed by the dynamically assigning unit 13b. That is, the accommodated node information updating unit 13c updates the usage status of nodes 0 and 3 from "idle" to "busy" and stores the updated information in the accommodated node information storage unit 12b. More specifically, the accommodated node information updating unit 13c updates the information illustrated on the left side in FIG. 27A to the information illustrated on the right side in FIG. 27A.

<Configuration of Lower-Layer Master Node According to Fourth Embodiment>

Figure 27B:
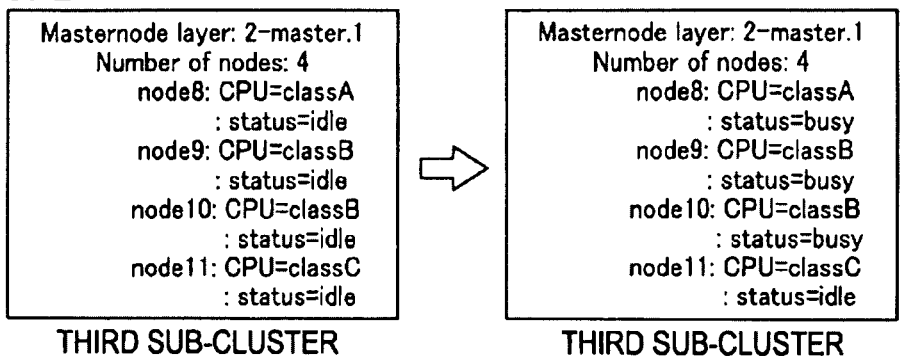

Next, the lower-layer master node according to the fourth embodiment is described with reference to FIGS. 15 and 27B to 27D. FIG. 15 is a block diagram illustrating the configuration of the lower-layer master node according to the second embodiment, and FIGS. 27B to 27D illustrate the accommodated node information storage unit according to the fourth embodiment.

As illustrated in FIG. 15, the lower-layer master node 20 according to the fourth embodiment is the same as that according to the third embodiment, and thus a specific description is omitted. However, in the embodiment illustrated in FIGS. 24A to 24C, the information updated by the accommodated node information updating unit 23c is different from that according to the third embodiment. Hereinafter, descriptions are given about the different point.

The accommodated node information updating unit 23c updates the usage status of the nodes changed by the dynamically assigning unit 23b. For example, in the case of assignment of the data sets in the second group illustrated in FIG. 24B, the accommodated node information updating unit 23c of node 8, which is the lower-layer master node 20 of the third sub-cluster, updates the information illustrated on the left side in FIG. 27B to the information illustrated on the right side in FIG. 27B.

Figure 27C:
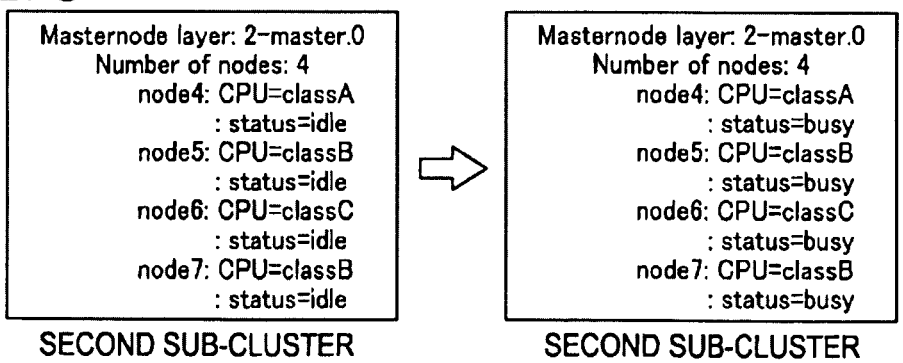
Figure 27D:
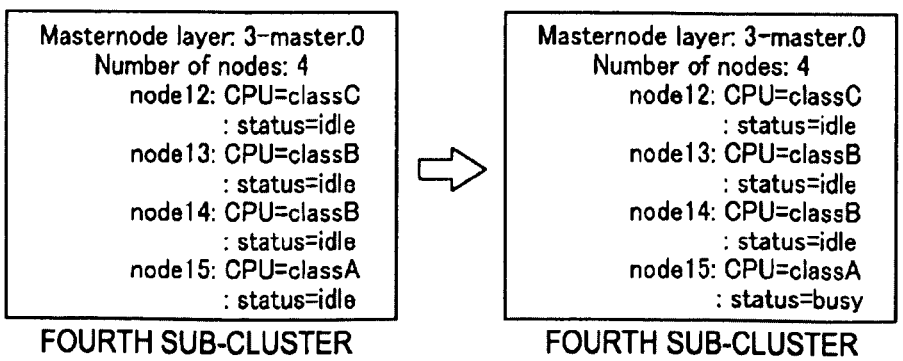

Also, in the case of assignment of the data sets in the third group illustrated in FIG. 24C, the accommodated node information updating unit 23c of node 4, which is the lower-layer master node 20 of the second sub-cluster, updates the information illustrated on the left side in FIG. 27C to the information illustrated on the right side in FIG. 27C.

Also, in the case of assignment of the data sets in the third group illustrated in FIG. 24C, the accommodated node information updating unit 23c of node 12, which is the lower-layer master node 20 of the fourth sub-cluster, updates the information illustrated on the left side in FIG. 27D to the information illustrated on the right side in FIG. 27D.

<Procedure of Process Performed by Original Master Node According to Fourth Embodiment>

Next, a process performed by the original master node according to the fourth embodiment is described with reference to FIG. 19. FIG. 19 illustrates the procedure of the process performed by the original master node according to the second embodiment.

The procedure of the process performed by the original master node 10 according to the fourth embodiment is basically the same as that according to the third embodiment, but step S1908 is different. Hereinafter, descriptions are given mainly about the different point.

If the dynamically assigning unit 13b determines that the data sets can be assigned to the nodes of the lower-layer sub-cluster (YES in step S1907), the dynamically assigning unit 13b transfers the data sets to the lower-layer sub-cluster and allows assignment to be executed (step S1908). At that time, the dynamically assigning unit 13b detects the classification based on the calculation cost of each node held in the accommodated node information of the lower-layer sub-cluster and also detects the communication performance between the respective sub-clusters stored in the master node connection information storage unit 12a, and then the data sets are assigned with reference to the detected information.

The procedure of the process performed by the lower-layer master node according to the fourth embodiment is the same as that according to the third embodiment, and thus the corresponding description is omitted.

<Advantages of Fourth Embodiment>

As described above, according to the fourth embodiment, the master node connection information storage unit 12a further holds the communication performance between the respective sub-clusters as the master node connection information, and the data sets in the same group are assigned with reference to the communication performance between the respective sub-clusters. Thus, the data sets classified based on the calculation cost and the communication cost can be assigned to the nodes in the sub-cluster connected via a network of a higher communication performance, so that the parallel process can be efficiently performed.

<Fifth Embodiment>

In the above-described second to fourth embodiments, the data sets are assigned by the original master node and the lower-layer master nodes. On the other hand, in the fifth embodiment, after data sets have been assigned and a process has been executed, the calculation cost required in the process by each node is calculated.

<Overview and Feature of Node According to Fifth Embodiment>

Figure 28:
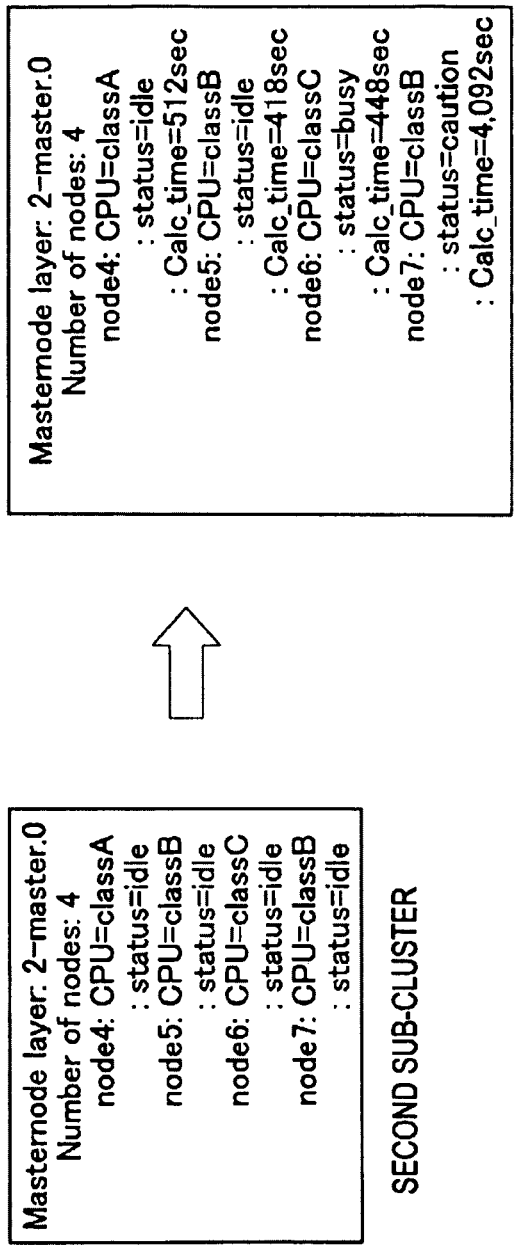
FIG. 28 illustrates an overview and a feature of a node according to a fifth embodiment.

First, a main feature of the node according to the fifth embodiment is described with reference to FIG. 28. FIG. 28 illustrates an overview and a feature of the node according to the fifth embodiment.

Each node according to the fifth embodiment calculates the calculation cost required for a process after the process on the data set assigned thereto has ended. For example, node 4 accommodated in the second sub-cluster calculates the calculation cost required for a process, that is, the time required for the calculation (Calc_time=512 sec) after a run in a section specified by instructions has ended.

Then, each node according to the fifth embodiment notifies the master node of the sub-cluster in which the node is accommodated of the calculated calculation cost.

The master node according to the fifth embodiment updates the accommodated node information based on the calculation costs transmitted from all the nodes accommodated in the sub-cluster controlled by the master node and holds the updated information. For example, as illustrated in FIG. 28, the master node (node 4) of the second sub-cluster receives the calculation costs calculated by nodes 4 to 7, updates the accommodated node information based on the calculation costs, and holds the updated information. That is, the master node receives "Calc_time=512 sec" from node 4, "Calc_time=418 sec" from node 5, "Calc_time=448 sec" from node 6, and "Calc_time=4092 sec" from node 7, and updates the accommodated node information by adding those pieces of information.

If a high calculation cost (long execution time) is detected as in node 7, the status of the node can be changed to "caution". Furthermore, setting may be made so that node 7 with "caution" is not used when instructions of the program are detected and dynamic assignment is changed next time.

Accordingly, the node according to the fifth embodiment can use the updated calculation cost of each node at the next assignment of data sets, for example, use of a node having an increased calculation cost can be avoided. Thus, the parallel process can be efficiently performed.

<Configuration of Original Master Node According to Fifth Embodiment>

Next, the original master node according to the fifth embodiment is described with reference to FIGS. 14 and 29. FIG. 14 is a block diagram illustrating the configuration of the original master node according to the second embodiment, and FIG. 29 illustrates the dynamically assigning command according to the fifth embodiment.

As illustrated in FIG. 14, the original master node 10 according to the fifth embodiment is basically the same as that according to the second to fourth embodiments. However, the process performed by the dynamically assigning unit 13b and the accommodated node information updating unit 13c is different from that in the second to fourth embodiments. Hereinafter, descriptions are given mainly about the different point.

When the dynamically assigning unit 13b receives the calculation cost calculated by each node accommodated in the highest-layer sub-cluster after run in the section specified by the instructions ends, the dynamically assigning unit 13b executes command (G) in FIG. 29 on the accommodated node information updating unit 13c.

The accommodated node information updating unit 13c updates the accommodated node information stored in the accommodated node information storage unit 12b in accordance with the received calculation cost of each node based on the command from the dynamically assigning unit 13b and stores the updated information.

The dynamically assigning unit 13b also executes commands (A) to (F) illustrated in FIG. 29. These commands are the same as those performed by the dynamically assigning unit 13b according to the fourth embodiment ((A) to (F) illustrated in FIG. 26), and thus the corresponding description is omitted.

<Configuration of Lower-Layer Master Node According to Fifth Embodiment>

Next, the lower-layer master node according to the fifth embodiment is described with reference to FIGS. 15 and 29. FIG. 15 is a block diagram illustrating the configuration of the lower-layer master node according to the second embodiment, and FIG. 29 illustrates the dynamically assigning command according to the fifth embodiment.

As illustrated in FIG. 15, the lower-layer master node 20 according to the fifth embodiment is basically the same as that according to the second to fourth embodiments. However, the process performed by the dynamically assigning unit 23b and the accommodated node information updating unit 23c is different from that in the second to fourth embodiments. Hereinafter, descriptions are given mainly about the different point.

When the dynamically assigning unit 23b receives the calculation cost calculated by each node accommodated in the lower-layer sub-cluster controlled by the lower-layer master node 20 after a run in the section specified by the instructions ends, the dynamically assigning unit 23b executes command (G) in FIG. 29 on the accommodated node information updating unit 23c.

The accommodated node information updating unit 23c updates the accommodated node information stored in the accommodated node information storage unit 22a in accordance with the received calculation cost of each node based on the command from the dynamically assigning unit 23b and stores the updated information.

The dynamically assigning unit 23b also executes commands (A) to (F) illustrated in FIG. 29. These commands are the same as those performed by the dynamically assigning unit 23b according to the fourth embodiment ((A) to (F) illustrated in FIG. 26), and thus the corresponding description is omitted.

<Procedure of Process Performed by Master Node According to Fifth Embodiment>

Figure 30:
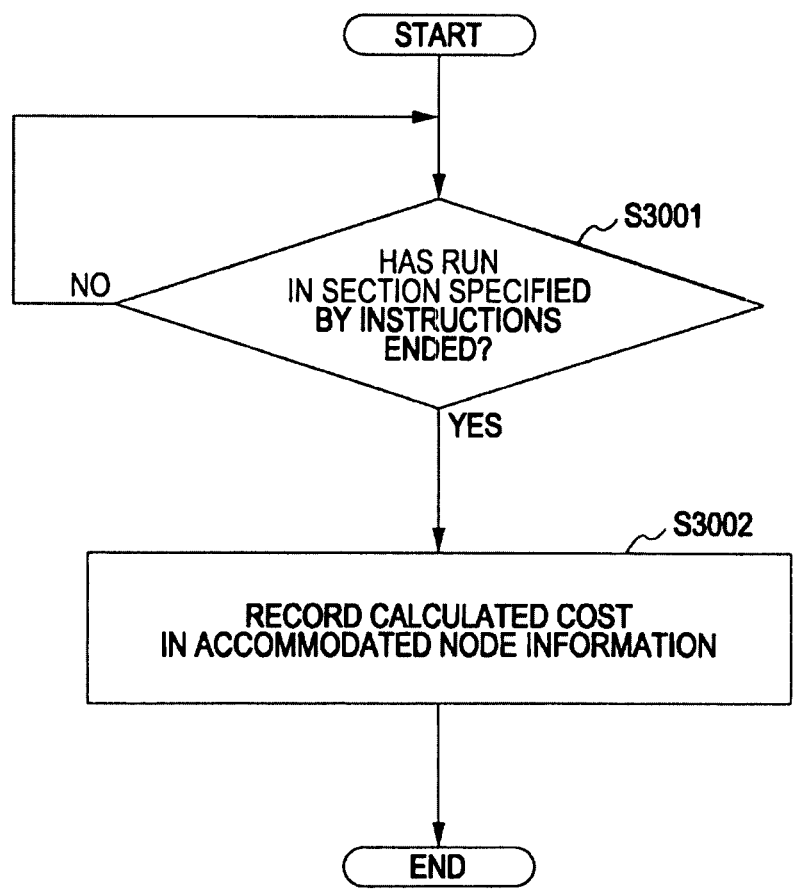
FIG. 30 illustrates a procedure of a process performed by a master node according to the fifth embodiment.

Next, a process performed by the master node according to the fifth embodiment is described with reference to FIG. 30. FIG. 30 illustrates a procedure of a process performed by the master node according to the fifth embodiment. The procedures of the processes performed by the original master node 10 and the lower-layer master node 20 are the same.

If the master node according to the fifth embodiment (the original master node 10 or the lower-layer master node 20) detects end of run in the section specified by the instructions (YES in step S3001), the master node records the cost calculated by each node in their own accommodated node information (step S3002) and ends the process.

For example, if the original master node 10 receives the calculation cost calculated by each node accommodated in the highest-layer sub-cluster after run in the section specified by the instructions ends, the original master node 10 executes command (G) in FIG. 29 on the accommodated node information updating unit 13c. In accordance with the command, the accommodated node information updating unit 13c updates the accommodated node information stored in the accommodated node information storage unit 12b in accordance with the received calculation cost of each node and stores the updated information.

<Advantages of Fifth Embodiment>

As described above, according to the fifth embodiment, after a process on an assigned data set has ended in each node, the calculation cost required for the process is calculated, and each master node updates the calculation costs of all the nodes and holds the updated information. The updated calculation cost of each node can be used at the next assignment of data sets, for example, use of a node having an increased calculation cost can be avoided. Thus, the parallel process can be efficiently performed.

<Sixth Embodiment>

In the above-described fifth embodiment, each node calculates the calculation cost required for the process. On the other hand, in the sixth embodiment, each node calculates a calculation cost and a communication cost required for the process.

<Overview and Feature of Node According to Sixth Embodiment>

Figure 31:
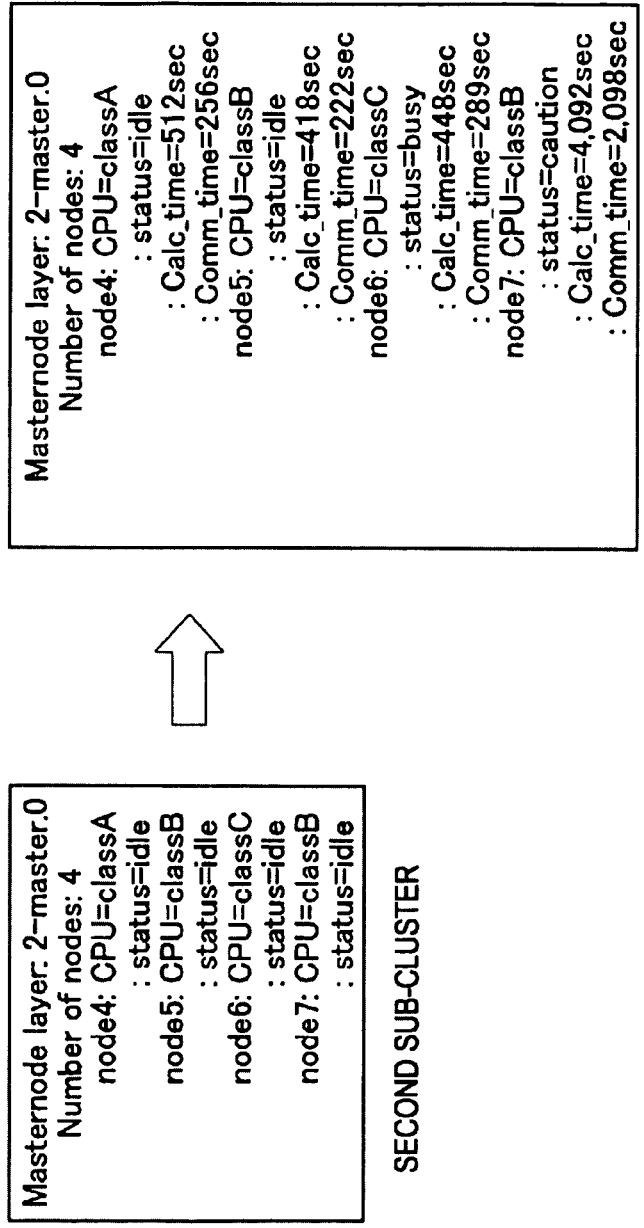
FIG. 31 illustrates an overview and a feature of a node according to a sixth embodiment.

First, a main feature of the node according to the sixth embodiment is described with reference to FIG. 31. FIG. 31 illustrates an overview and a feature of the node according to the sixth embodiment.

Each node according to the sixth embodiment calculates a calculation cost and a communication cost required for a process after the process on the data set assigned to the node has ended. For example, after a run in the section specified by the instructions, node 4 accommodated in the second sub-cluster calculates a calculation cost required for the process, that is, calculation time (Calc_time=512 sec), and also calculates a communication cost required for the process, that is, communication time (Comm_time=256 sec).

Then, each node according to the sixth embodiment notifies the master node of the own sub-cluster of the calculated calculation and communication cost.

The master node according to the sixth embodiment updates the accommodated node information in accordance with the calculation cost and communication cost transmitted from each of the nodes accommodated in the sub-cluster controlled by the master node, and holds the updated information. For example, as illustrated in FIG. 31, the master node of the second sub-cluster (node 4) detects the calculation costs calculated by nodes 4 to 7, updates the accommodated node information in accordance with the calculation and communication costs, and holds the updated information.

More specifically, the master node detects "Calc_time=512 sec and Comm_time=256 sec" from node 4, "Calc_time=418 sec and Comm_time=222 sec" from node 5, "Calc_time=448 sec and Comm_time=289 sec" from node 6, and "Calc_time=4092 sec and Comm_time=2098 sec" from node 7, and updates the accommodated node information by adding those pieces of information thereto.

If high calculation and communication costs (long communication time) are detected as in node 7, the status of the node can be changed to "caution". Alternatively, a setting may be made so that node 7 with "caution" is not used when instructions of the program are detected and dynamic assignment is changed next time.

Accordingly, the node according to the sixth embodiment can use the updated calculation and communication costs of each node at the next assignment of data sets, for example, use of a node having an increased communication cost can be avoided. Thus, the parallel process can be efficiently performed.

The configuration and process of the original master node and lower-layer master node according to the sixth embodiment are the same as those in the fifth embodiment except that a communication cost is also received and updated, and thus the corresponding description is omitted.

<Advantages of Sixth Embodiment>

As described above, according to the sixth embodiment, calculation and communication costs required for a process are calculated in each node after the process on the data set assigned to the node has ended, and each master node updates the calculation and communication costs of all the nodes and holds the updated information. Accordingly, the updated calculation and communication costs of each node can be used at the next assignment of data sets, for example, use of a node having an increased communication cost can be avoided. Thus, the parallel process can be efficiently performed.

<Seventh Embodiment>

In the above-described first to sixth embodiments, a case where each node is set as a master node or a slave node has been described. In the seventh embodiment, a case where the node is set as a management node is described.

<Overview and Feature of Node According to Seventh Embodiment>

Figure 32A:
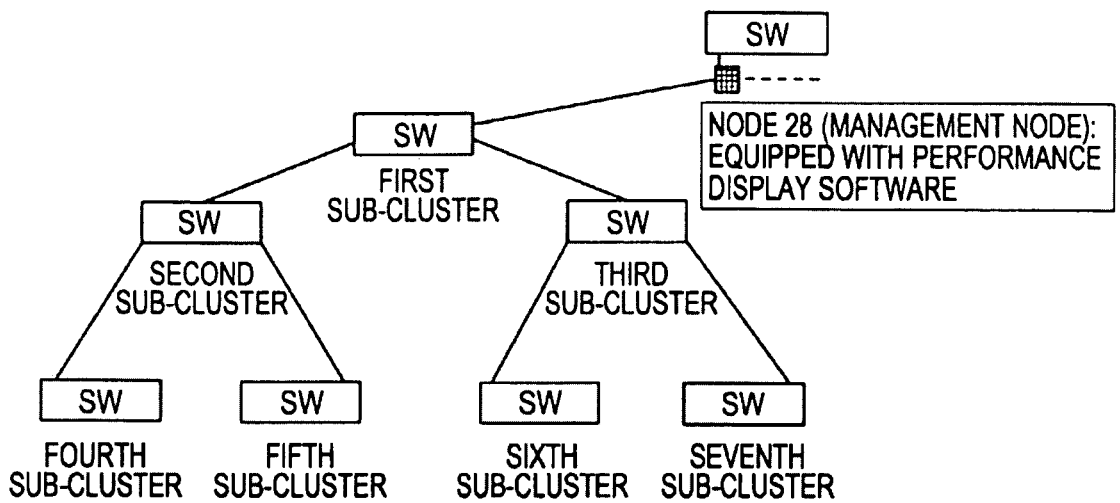
FIGS. 32A and 32B illustrate an overview and a feature of a node according to a seventh embodiment.
Figure 32B:
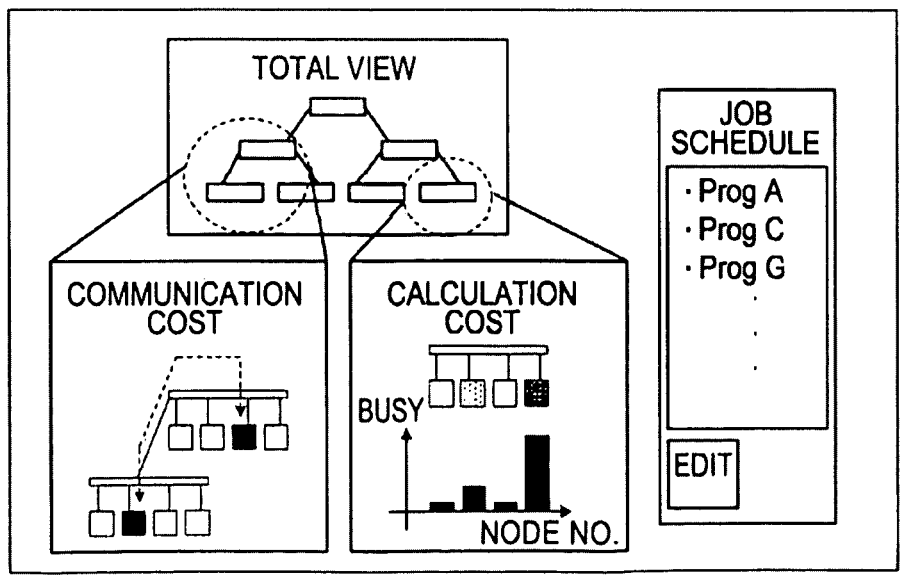

First, a main feature of the node according to the seventh embodiment is described in detail with reference to FIGS. 32A and 32B. FIGS. 32A and 32B illustrate an overview and a feature of the node according to the seventh embodiment.

When the node according to the seventh embodiment is set as a management node in the sub-clusters of the tree structure, the management node outputs the performance of all the nodes in the sub-clusters of the tree structure to a predetermined output unit. For example, as illustrated in FIG. 32A, assume that node 28 is set as a management node equipped with performance display software in the sub-clusters of the tree structure.

Node 28, which is set as a management node in the seventh embodiment, displays the status of each node during a series of processes in the above-described first to sixth embodiments on a screen in real time in accordance with a performance display request from a user. For example, as illustrated in FIG. 32B, node 28 graphically displays information including the status and performance (calculation cost and communication cost) of each node.

Accordingly, when the node according to the seventh embodiment is set as a management node, a person who executes the parallel program can quickly evaluate the performance of each node, for example, by referring to the status of each node displayed on the screen of the management node and detecting a node having a decreased processing ability. Thus, the parallel process can be efficiently performed.

<Configuration of Management Node According to Seventh Embodiment>

Figure 33:
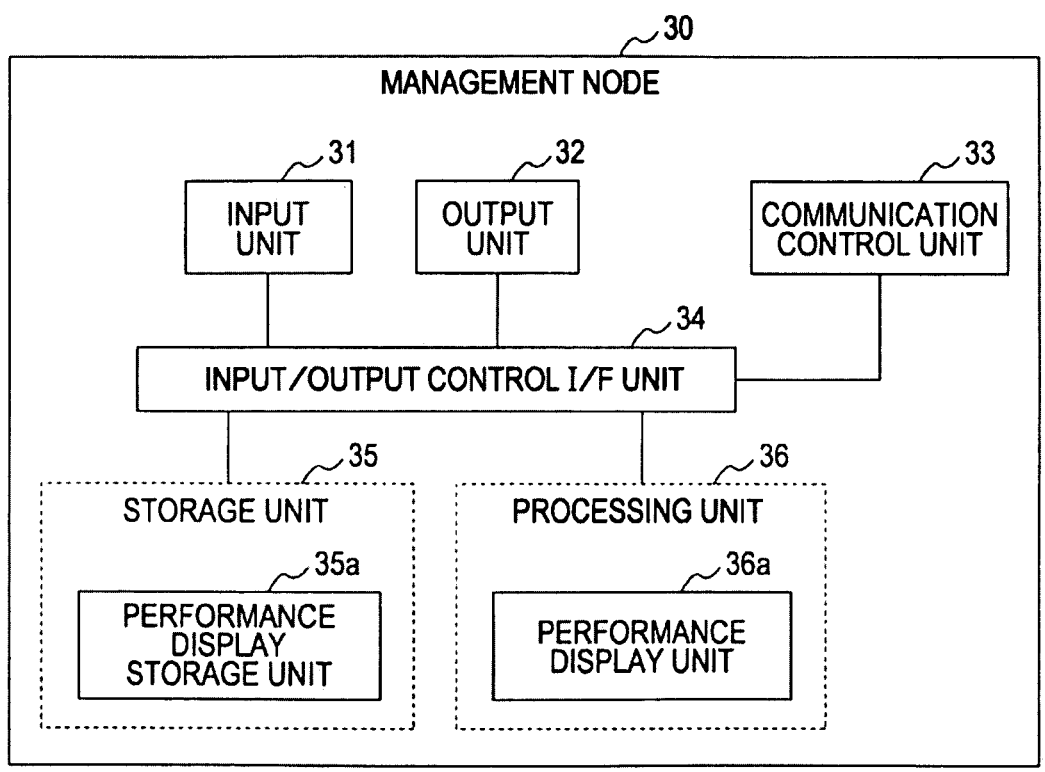
FIG. 33 is a block diagram illustrating a configuration of a management node according to the seventh embodiment.

Next, the management node according to the seventh embodiment is described with reference to FIG. 33. FIG. 33 is a block diagram illustrating a configuration of the management node according to the seventh embodiment.

As illustrated in FIG. 33, the management node 30 according to the seventh embodiment includes an input unit 31, an output unit 32, a communication control unit 33, an input/output control I/F unit 34, a storage unit 35, and a processing unit 36.

The input unit 31 accepts a performance display request from a person who executes the parallel program and includes a keyboard and a touch panel.

The output unit 32 outputs a processing result generated by a performance display unit 36a (described below) and includes a monitor or the like.

The communication control unit 33 receives "status" transmitted from each node in accordance with the performance display request accepted by the input unit 31 and stores the received "status" in a performance display storage unit 35a (described below).

The input/output control I/F unit 34 controls data transfer from/to the input unit 31, the output unit 32, and the communication control unit 33 to/from the storage unit 35 and the processing unit 36.

The storage unit 35 stores data to be used in a process performed by the processing unit 36. As an element closely related to the present invention, the storage unit 35 includes the performance display storage unit 35a, as illustrated in FIG. 33.

The performance display storage unit 35a stores the calculation cost and communication cost of each node transferred from the input/output control I/F unit 34.

The processing unit 36 executes a process in accordance with the performance display request transferred from the input/output control I/F unit 34. As an element closely related to the present invention, the processing unit 36 includes the performance display unit 36a as illustrated in FIG. 33. The performance display unit 36a corresponds to the "performance output procedure" described in claims.

The performance display unit 36a converts the information of calculation and communication costs of each node stored in the performance display storage unit 35a to a graphic image as illustrated in FIG. 32B in accordance with the performance display request, and outputs the image.

<Procedure of Process Performed by Management Node According to Seventh Embodiment>

Figure 34:
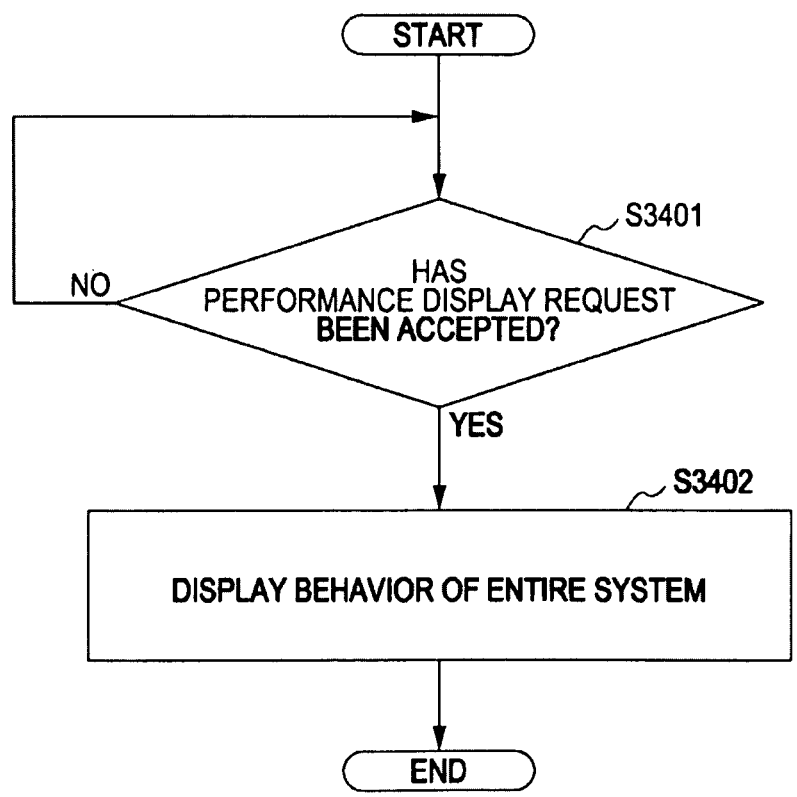
FIG. 34 illustrates a procedure of a process performed by the management node according to the seventh embodiment.

Hereinafter, a process performed by the management node according to the seventh embodiment is described with reference to FIG. 34. FIG. 34 illustrates a procedure of a process performed by the management node according to the seventh embodiment.

After accepting a performance display request via the keyboard or the touch panel (YES in step S3401), the management node 30 according to the seventh embodiment displays the behavior of the entire system (step S3402), and the process ends.

That is, the performance display unit 36a converts the calculation and communication costs of each node stored in the performance display storage unit 35a to the graphic image illustrated in FIG. 32B in accordance with the performance display request, and outputs the image.

<Advantages of Seventh Embodiment>

As described above, according to the seventh embodiment, when the node is set as a management node in the sub-clusters of the tree structure, the management node outputs the performance of all the nodes in the sub-clusters of the tree structure to the predetermined output unit. Thus, a person who executes the parallel program can quickly evaluate the performance of each node, for example by referring to the status of each node displayed on the screen and detecting a node having a decreased processing ability. Accordingly, the parallel process can be efficiently performed.

<Eighth Embodiment>

The nodes according to the first to seventh embodiments have been described above. The present invention can be carried out in various forms other than the above-described embodiments. Hereinafter, various embodiments are described in (1) to (3) about a parallel process control system according to an eighth embodiment.

(1) Dynamic Assignment

In the second to fourth embodiments, the original master node 10 collectively determines dynamic assignment based on the information from the lower-layer master node 20. However, the present invention is not limited to this. If the original master node 10 determines that the data sets cannot be assigned to the highest-layer sub-cluster, the original master node 10 may transfer the data sets to the lower-layer master node 20 and the lower-layer master node 20 may determine the assignment to a lower-layer sub-cluster. In other words, the lower-layer master node 20 may have a redundant function as the original master node 10.

(2) System Configuration

Among the processes described in the above-described embodiments, all or part of the manually performed processes can be automatically performed (for example, the performance display request can be automatically generated at predetermined time intervals, instead of accepting the performance display request via the keyboard or the touch panel). Also, all or part of the automatically performed processes can be manually performed in a known method. Furthermore, the procedures of processes, specific names, and information including various data and parameters described in the specification or drawings can be arbitrarily changed unless otherwise specified (for example, steps S802 and S803 illustrated in FIG. 8 can be performed in parallel).

The respective elements of each device illustrated in the drawings are functional and conceptual, and need not always be physically configured as illustrated in the drawings. That is, a specific form of distribution or integration of respective processing units and storage units (e.g., the form illustrated in FIG. 14) is not limited to that illustrated in the drawings, and all or part of the units can be functionally or physically distributed or integrated in arbitrary units in accordance with various loads and usage status. For example, the dynamically assigning unit 13b and the accommodated node information updating unit 13c can be integrated. Furthermore, whole or an arbitrary part of each processing function executed in each device can be realized by a CPU and a program analyzed and executed by the CPU, or realized as hardware by wired logic.

(3) Parallel Process Control Program

Figure 35:
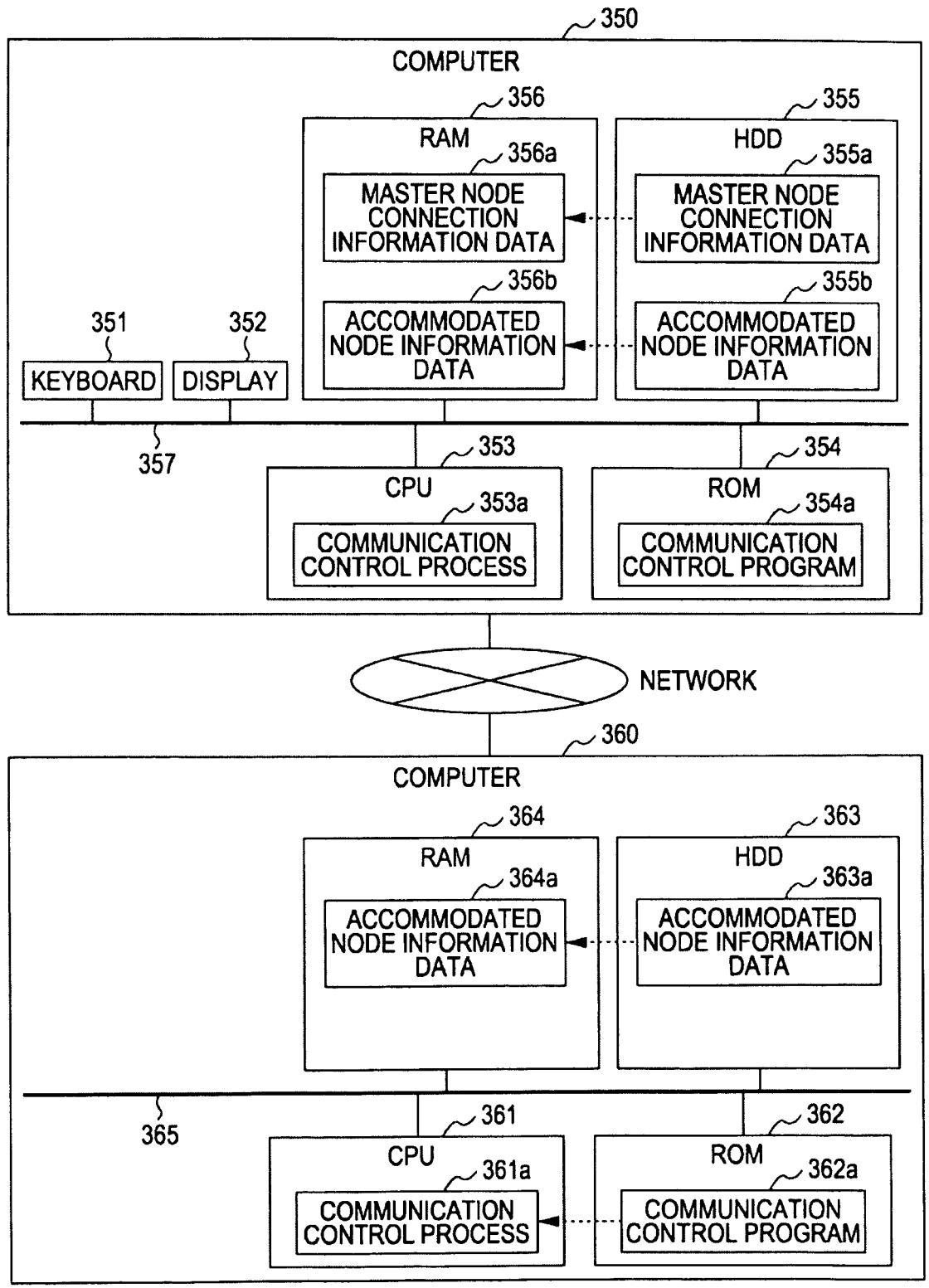
FIG. 35 illustrates computers to execute a parallel process control program according to the first embodiment.
Figure 36A:
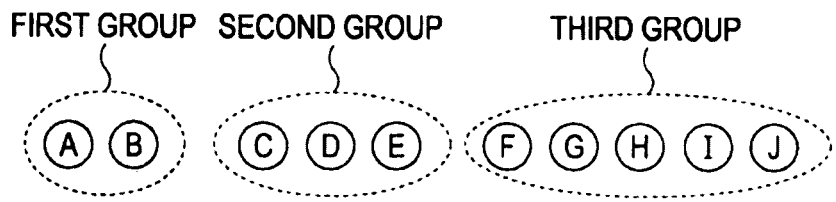
FIGS. 36A, 36B, and 36C illustrate a problem in a related art.
Figure 36B:
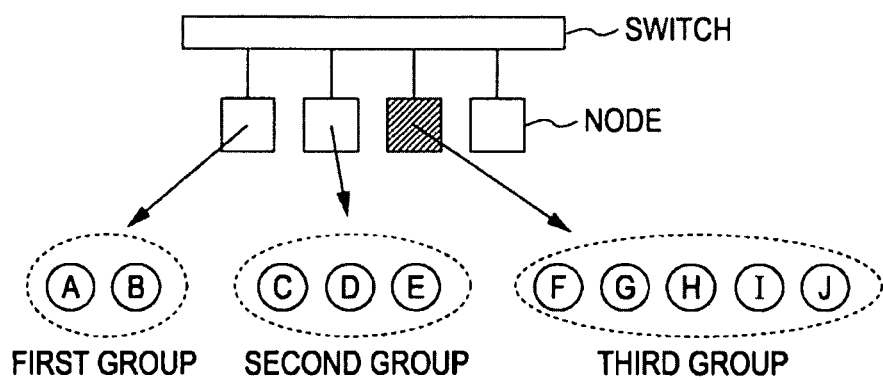
Figure 36C:
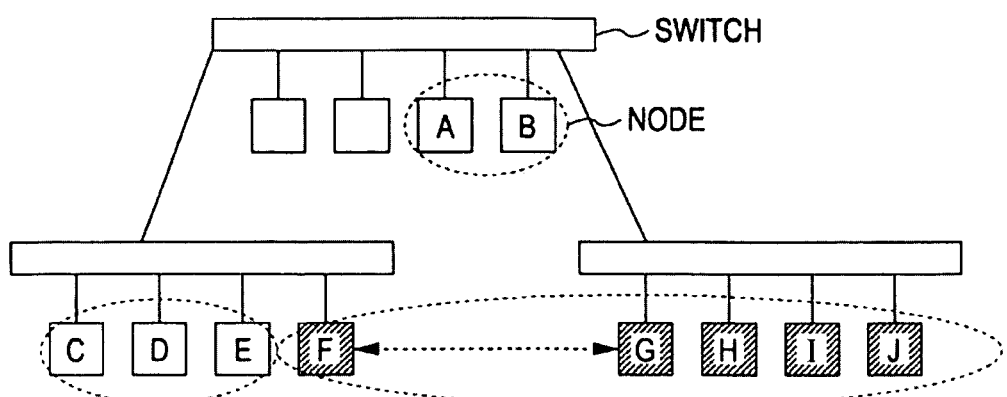

In the first to seventh embodiments, the various processes are realized by hardware logic. However, the present invention is not limited to this, and a prepared program can be executed by a computer. Hereinafter, an example of a computer to execute a parallel process control program having the same function as that of each node described in the first embodiment is described with reference to FIG. 35. FIG. 35 illustrates the computer to execute the parallel process control program according to the first embodiment.

As illustrated in FIG. 35, computers 350 and 360, each serving as an information processing apparatus, are mutually connected via a network and perform the above-described parallel process control according to the first embodiment.

As illustrated in FIG. 35, the computer 350 serving as an information processing apparatus includes a keyboard 351, a display 352, a CPU 353, a ROM 354, an HDD 355, and a RAM 356, which are mutually connected via a bus 357 or the like.

The ROM 354 stores the parallel process control program having the same function as that of the original master node 10 described in the first embodiment, that is, a communication control program 354a, as illustrated in FIG. 35. The program 354a may be appropriately integrated or distributed, as the respective elements of the original master node 10 illustrated in FIG. 3.

When the CPU 353 reads the program 354a from the ROM 354 and executes it, the program 354a functions as a communication control process 353a, as illustrated in FIG. 35. The process 353a corresponds to the communication control unit 13a illustrated in FIG. 3.

The HDD 355 is provided with master node connection information data 355a and accommodated node information data 355b, as illustrated in FIG. 35. The CPU 353 registers master node connection information data 356a to the master node connection information data 355a, registers accommodated node information data 356b to the accommodated node information data 355b, and executes parallel process control based on the master node connection information data 356a and the accommodated node information data 356b.

The above-described program 354a need not always be originally stored in the ROM 354. For example, the program may be stored in a portable physical medium inserted into the computer 350, such as a flexible disk (FD), a CD-ROM, an MO disc, a DVD, a magneto-optical disc, and an IC card; a fixed physical medium provided inside or outside the computer 350, such as an HDD; or another computer (or a server) connected to the computer 350 via a public line, the Internet, a LAN, or a WAN. Then, the computer 350 may read the program from these media and execute the program.

As illustrated in FIG. 35, the computer 360 serving as an information processing apparatus includes a CPU 361, a ROM 362, an HDD 363, and a RAM 364, which are mutually connected via a bus 365 or the like.

The ROM 362 stores a parallel process control program having the same function as that of the lower-layer master node 20 described in the first embodiment, that is, a communication control program 362a, as illustrated in FIG. 35. The program 362a may be appropriately integrated or distributed as the elements of the lower-layer master node 20 illustrated in FIG. 4.

When the CPU 361 reads the program 362a from the ROM 362 and executes it, the program 362a functions as a communication control process 361a, as illustrated in FIG. 35. The communication control process 361a corresponds to the communication control unit 23a illustrated in FIG. 4.

The HDD 363 is provided with accommodated node information data 363a, as illustrated in FIG. 35. The CPU 361 registers accommodated node information data 364a to the accommodated node information data 363a, and executes parallel process control based on the accommodated node information data 364a.

The above-described program 362a need not always be originally stored in the ROM 362. For example, the program may be stored in a portable physical medium inserted into the computer 360, such as a flexible disk (FD), a CD-ROM, an MO disc, a DVD, a magneto-optical disc, and an IC card; a fixed physical medium provided inside or outside the computer 360, such as an HDD; or another computer (or a server) connected to the computer 360 via a public line, the Internet, a LAN, or a WAN. Then the computer 360 may read the program from these media and execute the program.

What is claimed is:

1. A non-transitory computer-readable storage medium containing a program allowing a computer serving as each node to execute a parallel process control method for controlling a parallel process in a parallel process system including sub-clusters connected in a tree structure, each sub-cluster including a plurality of nodes, the program allowing the computer to execute:

an accommodated node information holding procedure of holding accommodated node information, which is information to uniquely identify a master node and slave nodes controlled by the master node accommodated in the sub-cluster when one of the nodes is set as the master node of each of the sub-clusters;

a master node connection information holding procedure of holding master node connection information, which is information about connection between a highest-layer master node in a highest-layer sub-cluster and lower-layer master nodes set in lower-layer sub-clusters when one of the nodes is set as the highest-layer master node in the highest-layer sub-cluster of the tree structure;

a highest-layer master node communication control procedure of the highest-layer master node performing (i) preprocessing of the parallel process including establishing communication between the highest-layer master node and all the slave nodes accommodated in the highest-layer sub-cluster by referring to the accommodated node information held by the accommodated node information holding procedure and establishing communication between the highest-layer master node and the lower-layer master nodes by referring to the master node connection information held by the master node connection information holding procedure and (ii) post-processing of the parallel process including detecting end of process in all the nodes accommodated in the highest-layer sub-cluster and ending the communication after detecting process end notifications from all the lower-layer master nodes; and a lower-layer master node communication control procedure of each of the lower-layer master nodes performing (i) preprocessing of the parallel process including, after communication between the lower-layer master node and the highest-layer master node has been established, establishing communication between the slave nodes accommodated in the lower-layer sub-cluster and the highest-layer master node by referring to the accommodated node information held by the accommodated node information holding procedure and (ii) post-processing of the parallel process including detecting end of process in all the nodes accommodated in the lower-layer sub-cluster and notifying the higher-layer master node of the end of the process.

2. The non-transitory computer-readable storage medium according to claim 1, the program allowing the computer to further execute:

an assigning procedure of assigning data sets in the same group described in instructions to nodes so that a calculation cost and/or a communication cost can be saved after the instructions to group the data sets to be used in the parallel process based on the calculation cost and/or the communication cost have been detected in the program to execute the parallel process.

3. The non-transitory computer-readable storage medium according to claim 2, wherein the assigning procedure assigns the data sets in the same group to nodes in the same sub-cluster by referring to the master node connection information held by the master node connection information holding procedure.

4. The non-transitory computer-readable storage medium according to claim 3, wherein, if the assigning procedure can assign not all the data sets in the same group to the nodes in the same sub-cluster, the assigning procedure assigns the data set that cannot be assigned to one of the nodes of the lower-layer sub-clusters.

5. The non-transitory computer-readable storage medium according to claim 4,
wherein the accommodated node information holding procedure further holds the calculation cost and/or the communication cost of all the nodes accommodated in each of the sub-clusters, and
wherein the assigning procedure assigns the data sets in the same group by further referring to the calculation cost and/or the communication cost held by the accommodated node information holding procedure.

6. The non-transitory computer-readable storage medium according to claim 5,
wherein the master node connection information holding procedure further holds communication performance between the respective sub-clusters as the master node connection information, and
wherein the assigning procedure assigns the data sets in the same group by further referring to the communication performance between the respective sub-clusters held by the master node connection information holding procedure.

7. The non-transitory computer-readable storage medium according to claim 2, the program allowing the computer to further execute:
a cost calculating procedure of calculating the calculation cost and/or the communication cost required for a process after the process on the data set assigned to each node has ended,
wherein the accommodated node information holding procedure updates the calculation cost and/or the communication cost of all the nodes based on the calculation performed by the cost calculating procedure and holds the updated cost.

8. The non-transitory computer-readable storage medium according to claim 1, the program allowing the computer to further execute:
a performance output procedure of outputting performance of all the nodes in the sub-clusters of the tree structure to a predetermined output unit when the node is set as a management node in the sub-clusters of the tree structure.

9. A parallel process control system in which each node controls a parallel process in a parallel process system including sub-clusters connected in a tree structure, each sub-cluster including a plurality of nodes, the parallel process control system comprising:
processors;
a memory holding accommodated node information, wherein the accommodated node information is information to uniquely identify a master node and slave nodes controlled by the master node accommodated in the sub-cluster when the node is set as the master node of each of the sub-clusters;
the memory holding master node connection information, which is information about connection between a highest-layer master node in a highest-layer sub-cluster and lower-layer master nodes set in lower-layer sub-clusters when the node is set as the highest-layer master node in the highest-layer sub-cluster of the tree structure;
highest-layer master node communication controller for the highest-layer master node performing (i) preprocessing of the parallel process including establishing communication between the highest-layer master node and all the slave nodes accommodated in the highest-layer sub-cluster by referring to the accommodated node information held by the memory and establishing communication between the highest-layer master node and the lower-layer master nodes by referring to the master node connection information held by the memory and (ii) post-processing of the parallel process including detecting end of process in all the nodes accommodated in the highest-layer sub-cluster and ending the communication after detecting process end notifications from all the lower-layer master nodes; and
lower-layer master node communication controller for each of the lower-layer master nodes performing (i) preprocessing of the parallel process including, after communication between the lower-layer master node and the highest-layer master node has been established, establishing communication between the slave nodes accommodated in the lower-layer sub-cluster and the highest-layer master node by referring to the accommodated node information held by the memory and (ii) post-processing of the parallel process including detecting end of process in all the nodes accommodated in the lower-layer sub-cluster and notifying the higher-layer master node of the end of the process.

10. A parallel process control method, implemented by computers, for controlling a parallel process by each node in a parallel process system including sub-clusters connected in a tree structure, each sub-cluster including a plurality of nodes, the parallel process control method comprising:
an accommodated node information holding step of holding accommodated node information, which is information to uniquely identify a master node and slave nodes controlled by the master node accommodated in the sub-cluster when the node is set as the master node of each of the sub-clusters;
a master node connection information holding step of holding master node connection information, which is information about connection between a highest-layer master node in a highest-layer sub-cluster and lower-layer master nodes set in lower-layer sub-clusters with respect to the node set as the highest-layer master node in the highest-layer sub-cluster of the tree structure;
a highest-layer master node communication control step of a central processing unit of the highest-layer master node performing (i) preprocessing of the parallel process including establishing communication between the highest-layer master node and all the slave nodes accommodated in the highest-layer sub-cluster by referring to the accommodated node information held in the accommodated node information holding step and establishing communication between the highest-layer master node and the lower-layer master nodes by referring to the master node connection information held in the master node connection information holding step and (ii) post-processing of the parallel process including detecting end of process in all the nodes accommodated in the highest-layer sub-cluster and ending the communication after detecting process end notifications from all the lower-layer master nodes; and
a lower-layer master node communication control step of each of the lower-layer master nodes performing (i) preprocessing of the parallel process including, after communication between the lower-layer master node and the highest-layer master node has been established, establishing communication between the slave nodes accommodated in the lower-layer sub-cluster and the highest-layer master node by referring to the accommodated node information held in the accommodated node information holding step and (ii) post-processing of the parallel process including detecting end of process in all the nodes accommodated in the lower-layer sub-cluster and notifying the higher-layer master node of the end of the process.

* * * * *